(12) United States Patent
Kuboki et al.

(10) Patent No.: US 10,210,996 B2
(45) Date of Patent: Feb. 19, 2019

(54) ELECTRICAL STORAGE MODULE

(71) Applicants: AUTONETWORKS TECHNOLOGIES, LTD., Yokkaichi, Mie (JP); SUMITOMO WIRING SYSTEMS, LTD., Yokkaichi, Mie (JP); SUMITOMO ELECTRIC INDUSTRIES, LTD., Osaka-shi, Osaka (JP)

(72) Inventors: Hideyuki Kuboki, Yokkaichi (JP); Hiroki Hirai, Yokkaichi (JP); Tomoyuki Sakata, Yokkaichi (JP); Makoto Higashikozono, Yokkaichi (JP); Kenji Nakagawa, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/327,278

(22) PCT Filed: Jul. 29, 2015

(86) PCT No.: PCT/JP2015/071482
§ 371 (c)(1),
(2) Date: Jan. 18, 2017

(87) PCT Pub. No.: WO2016/017683
PCT Pub. Date: Feb. 4, 2016

(65) Prior Publication Data
US 2017/0207023 A1    Jul. 20, 2017

(30) Foreign Application Priority Data
Jul. 30, 2014   (JP) .................................. 2014-155247

(51) Int. Cl.
*H01M 2/10*      (2006.01)
*H01M 2/20*      (2006.01)
(Continued)

(52) U.S. Cl.
CPC ................. *H01G 2/16* (2013.01); *H01G 2/04* (2013.01); *H01G 11/12* (2013.01); *H01G 11/16* (2013.01);
(Continued)

(58) Field of Classification Search
None
See application file for complete search history.

(56) References Cited

U.S. PATENT DOCUMENTS

| 6,152,776 A | 11/2000 | Ikeda et al. |
| 2011/0244283 A1 | 10/2011 | Seto et al. |

(Continued)

FOREIGN PATENT DOCUMENTS

| EP | 0 892 450 A2 | 1/1999 |
| JP | 2002-222626 A | 8/2002 |

(Continued)

OTHER PUBLICATIONS

Jul. 25, 2017 Search Report issued in European Patent Application No. 15828322.6.
(Continued)

*Primary Examiner* — Maria Laios
(74) *Attorney, Agent, or Firm* — Oliff PLC

(57) ABSTRACT

An electrical storage module 10 includes: an electrical storage element group 11 in which a plurality of electrical storage elements 12 are stacked on one another, each electrical storage element having lead terminals 13 that protrude from a side edge of the electrical storage element; and fuses 45 that are electrically connected to the lead terminals 13.
(Continued)

Detection terminals 50 for detecting a state of the electrical storage elements 12 are directly connected to the fuses 45.

2 Claims, 59 Drawing Sheets

(51) Int. Cl.
    *H01M 2/30*     (2006.01)
    *H01M 2/34*     (2006.01)
    *H01M 10/48*     (2006.01)
    *H01G 2/04*     (2006.01)
    *H01G 2/16*     (2006.01)
    *H01G 11/12*     (2013.01)
    *H01G 11/16*     (2013.01)
    *H01G 11/76*     (2013.01)
    *H01G 11/82*     (2013.01)
(52) U.S. Cl.
    CPC ............ *H01G 11/76* (2013.01); *H01G 11/82* (2013.01); *H01M 2/1077* (2013.01); *H01M 2/206* (2013.01); *H01M 2/305* (2013.01); *H01M 2/348* (2013.01); *H01M 10/482* (2013.01); *H01M 2200/103* (2013.01); *H01M 2220/20* (2013.01); *Y02E 60/13* (2013.01); *Y02T 10/7022* (2013.01)

(56) References Cited

U.S. PATENT DOCUMENTS

2011/0248719 A1* 10/2011 Aoki .................. H01M 10/482
                                                                                  324/426
2014/0134464 A1     5/2014  Jang et al.

FOREIGN PATENT DOCUMENTS

| | | |
|---|---|---|
| JP | 2006-190529 A | 7/2006 |
| JP | 2012-195305 A | 10/2012 |
| JP | 2013-106400 A | 5/2013 |
| JP | 2014-093218 A | 5/2014 |

OTHER PUBLICATIONS

Nov. 2, 2015 International Search Report issued in Patent Application No. PCT/JP2015/071482.

* cited by examiner

FIG. 51
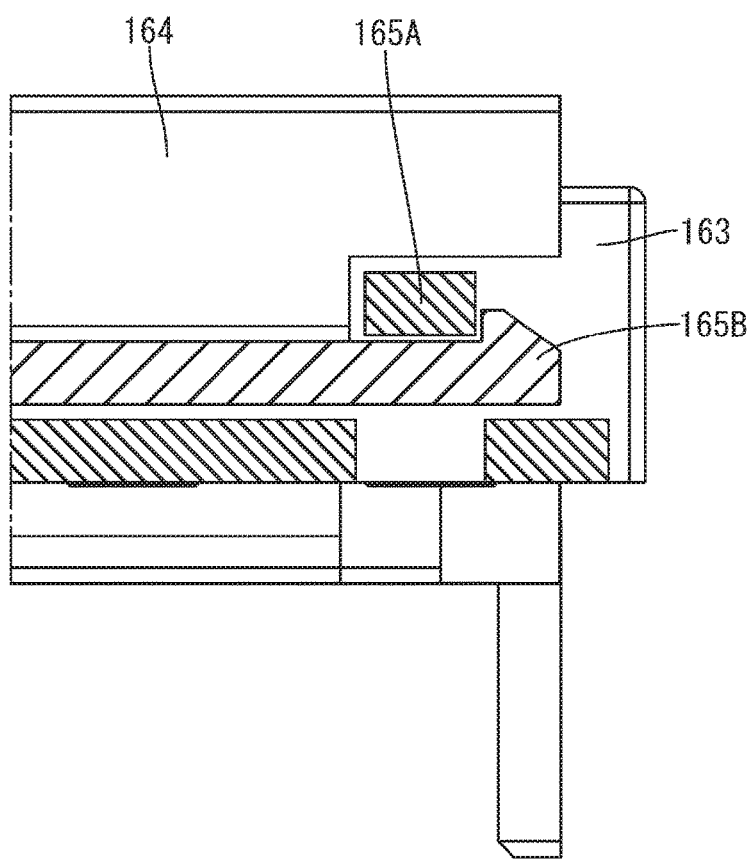
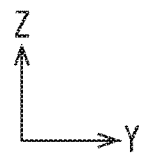

ELECTRICAL STORAGE MODULE

TECHNICAL FIELD

The present invention relates to an electrical storage module.

BACKGROUND ART

In general, battery modules mounted on, for example, electric cars or hybrid vehicles are constituted by connecting multiple electric cells in series or parallel with each other via busbars (see Patent Document 1, for example). Such a battery module includes detection terminals for detecting a state of the electric cells, and detection electric wires connected to the detection terminals.

CITATION LIST

Patent Document

Patent Document 1: JP 2013-106400A

SUMMARY

Technical Problem

In the battery module of Patent Document 1, fuses are connected to the detection electric wires, and if the detection electric wires are shorted, the fuses will be melted down to prevent the electric cells from being shorted. Because this battery module includes a resin protector in which the detection electric wires are housed, and a fuse block that is separate from the resin protector, there is a limit in downsizing.

An object of preferred embodiments is to downsize an electrical storage module provided with fuses.

Solution to Problem

According to preferred embodiments, an electrical storage module includes: an electrical storage element group in which a plurality of electrical storage elements are stacked on one another, each electrical storage element having lead terminals that protrude from a side edge of the electrical storage element; and fuses that are electrically connected to the lead terminals, wherein detection terminals for detecting a state of the electrical storage elements are directly connected to the fuses.

According preferred embodiments, the electrical storage module includes the fuses that are electrically connected to the lead terminals of the electrical storage elements, and the detection terminals are directly connected to the fuses. Thus, according to preferred embodiments, there is no need for fuse blocks for connecting the fuses and the detection terminals, or members for connecting the fuses and the detection terminals. Accordingly, it is possible to realize downsizing and to reduce the number of the components as compared with that of a conventional case.

As a result, according to preferred embodiments, it is possible to downsize the electrical storage module provided with the fuses.

Variously disclosed preferred embodiments may have a configuration in which holding members that hold the lead terminals and fuse connecting busbars that electrically connect the fuses and the lead terminals, each holding member being provided with a fuse mounting part on which a fuse is mounted, and a terminal housing part in which a detection terminal is housed, wherein the fuses are electrically connected to the detection terminals and the electrical storage elements, by putting the electrical storage module into a state in which the fuses are mounted on the fuse mounting parts, the detection terminals are housed in the terminal housing parts, and the fuse connecting busbars and the lead terminals are connected to each other.

With such a configuration, only by obtaining the state in which the fuses are mounted on the fuse mounting parts of the holding members, the detection terminals are housed in the terminal housing parts thereof, and the fuse connecting busbars and the lead terminals are connected to each other, it is possible to electrically connect the detection terminals and the electrical storage elements to the fuses, thus achieving the excellent operability of the connecting operation.

The detection terminals may be connected to busbars via relay terminals.

With such a configuration, it is possible to downsize the routing space as compared with the case where electric wires are connected to the detection terminals. Furthermore, since it is possible to process the plurality of busbars into predetermined shapes in the same process, the manufacturing process can be simplified.

Advantageous Effects

According to preferred embodiments disclosed herein, it is possible to downsize an electrical storage module provided with fuses.

BRIEF DESCRIPTION OF DRAWINGS

FIG. 51 is a cross-sectional view taken along a line P-P of FIG. 50.

DESCRIPTION OF EMBODIMENTS

Embodiment 1

Figure 1:
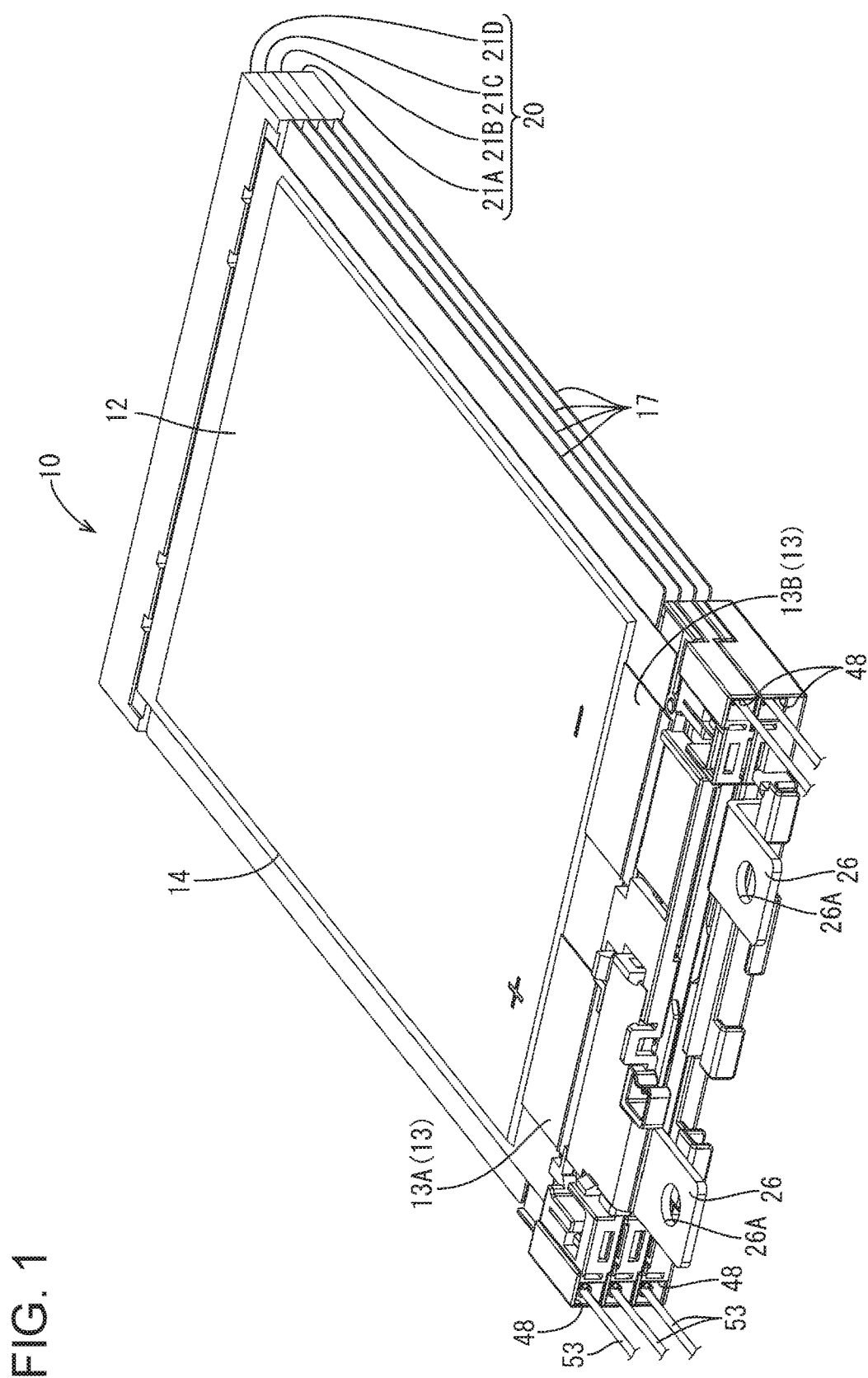
FIG. 1 is a perspective view illustrating an electrical storage module according to Embodiment 1.

An electrical storage module 10 according to Embodiment 1 will be described with reference to FIGS. 1 to 34. In the drawings, there may be cases where reference signs are given to only one of a plurality of the same members and are not given to the remaining members. In the following description, "front" and "rear" respectively refer to the left side and right side of FIG. 2.

The electrical storage module 10 of the present embodiment includes: an electrical storage element group 11 in which a plurality of (four in the present embodiment) electrical storage elements 12 are stacked on one another, each electrical storage element having lead terminals 13 that protrude from a side edge of the electrical storage element; and fuses 45 that are electrically connected to the lead terminals 13. In the present embodiment, the electrical storage module 10 further includes: holding members 30 that are respectively attached to the side edges at which the lead terminals 13 are provided, and hold the electrical storage elements 12; and fuse connecting busbars 40 that are connected to the lead terminals 13 and to the fuses 45.

In the present embodiment, any electrical storage elements 12 such as secondary batteries, capacitors, and condensers may be used as needed as the electrical storage elements 12 constituting the electrical storage element group 11. According to the present embodiment, secondary batteries are used as the electrical storage elements 12.

As shown in FIG. 1, the electrical storage module 10 according to the present embodiment includes: a stacked body 20 that is made of a stack of four electrical storage units 21 each obtained by placing the electrical storage element 12 on a heat transfer member 17 to which the holding members 30 are attached; and a case that is not shown.

Electrical Storage Unit 21

The four electrical storage units 21 that constitute the stacked body 20 are a first electrical storage unit 21A, a second electrical storage unit 21B, a third electrical storage unit 21C, and a fourth electrical storage unit 21D in the stated order from the bottom. Each of the electrical storage units 21 includes the holding members 30 attached to both ends in its longitudinal direction, the heat transfer member 17, and the electrical storage element 12.

Heat Transfer Member 17

The heat transfer member 17 is a plate-shaped member made of a heat conductive material. In the present embodiment, aluminum or an aluminum alloy, which has excellent heat conductivity, is used as the heat conductive material. The holding members 30 made of an insulating resin material are attached to both ends in the longitudinal direction of the heat transfer member 17, and the electrical storage element 12 is placed on the upper surface of the heat transfer member 17.

Electrical Storage Element 12

Figure 2:
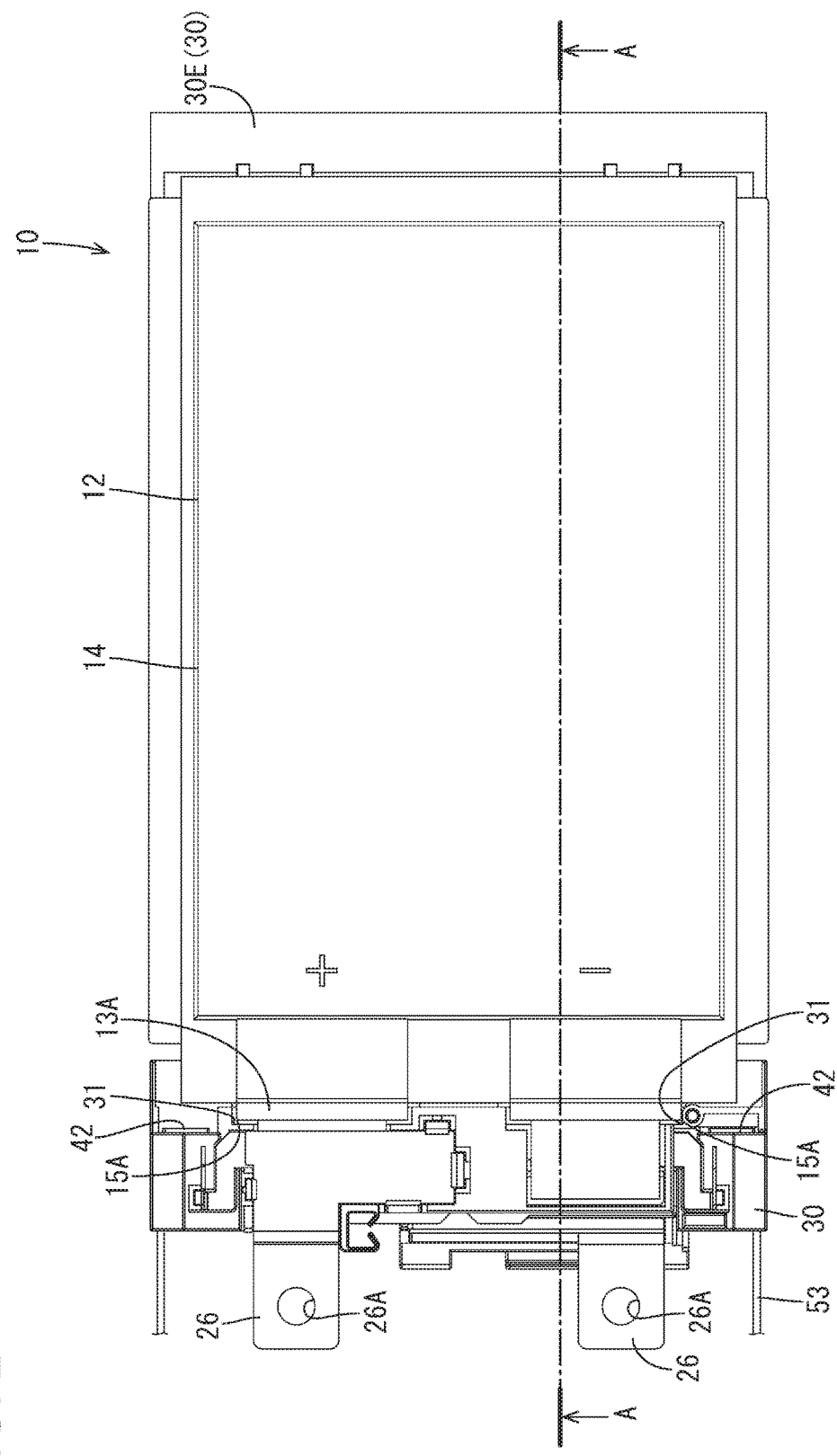
FIG. 2 is a plan view illustrating the electrical storage module.

As shown in FIG. 2, the electrical storage element 12 is substantially rectangular when viewed from above. The electrical storage element 12 includes: a container 14 obtained by welding side edges of a pair of substantially rectangular laminate films; an electrical storage component that is not shown and is contained in the inside of the container 14; and the lead terminals 13 that are connected to the electrical storage component inside the container 14 and are drawn from a side edge of the container 14 to the outside. In the present embodiment, the lead terminals 13 of positive and negative polarities are drawn from one side edge (front side edge) of the container 14.

On the side edge of the electrical storage element 12, corner parts 15A at protruding ends of the lead terminals 13 are fitted to electrical storage element holding parts 31 of the holding member 30, so that displacement of the electrical storage element 12 is restricted.

Figure 3:
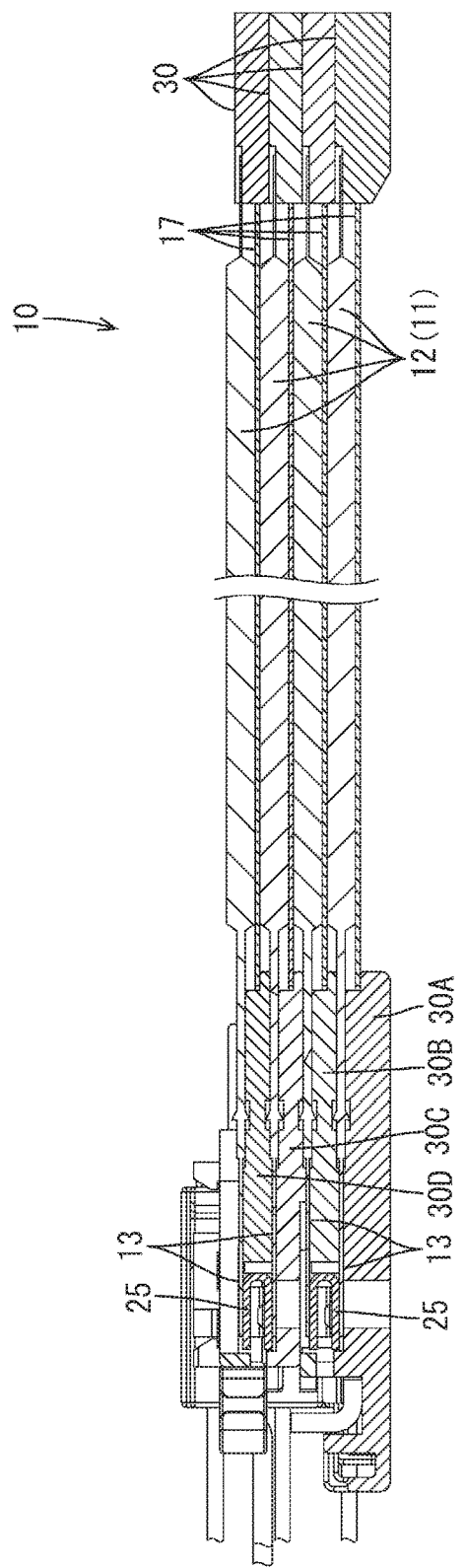
FIG. 3 is a cross-sectional view taken along a line A-A of FIG. 2.

In the present embodiment, as shown in FIG. 3, busbars 25 are connected by welding to the ends of the lead terminals 13 that are adjacent to each other in a stacking direction (vertical direction in FIG. 3), and the electrical storage elements 12 are electrically connected to each other via the busbars 25. Furthermore, external connection busbars 26 for connection to external devices are connected to the lead terminal 13 of the electrical storage element 12 of the first electrical storage unit 21A (electrical storage unit 21 in the lowermost stage), and to the lead terminal 13 of the electrical storage element 12 of the fourth electrical storage unit 21D (electrical storage unit 21 in the uppermost stage).

In the present embodiment, the electrical storage elements 12 that are overlaid in the stacking direction are connected in series to each other by connecting the lead terminals 13 having opposite polarities to each other via the busbars 25. The lead terminals 13 include a positive lead terminal 13A and a negative lead terminal 13B.

Metal fuse connecting busbars 40 to connect the fuses 45 and the lead terminals 13 are connected by welding to the lead terminals 13. The lead terminals 13 are made of aluminum or an aluminum alloy.

In the first electrical storage unit 21A, the negative lead terminal 13B of the electrical storage element 12 is overlaid directly on and joined by welding to a first fuse connecting busbar 40A and the external connection busbar 26, which are arranged side by side on the holding member 30. Furthermore, in the first electrical storage unit 21A, the positive lead terminal 13A of the electrical storage element 12 is overlaid directly on and joined by welding to a second fuse connecting busbar 40B arranged on the holding member 30, and is joined by welding to the busbar 25 overlaid on this positive lead terminal 13A.

Figure 17:
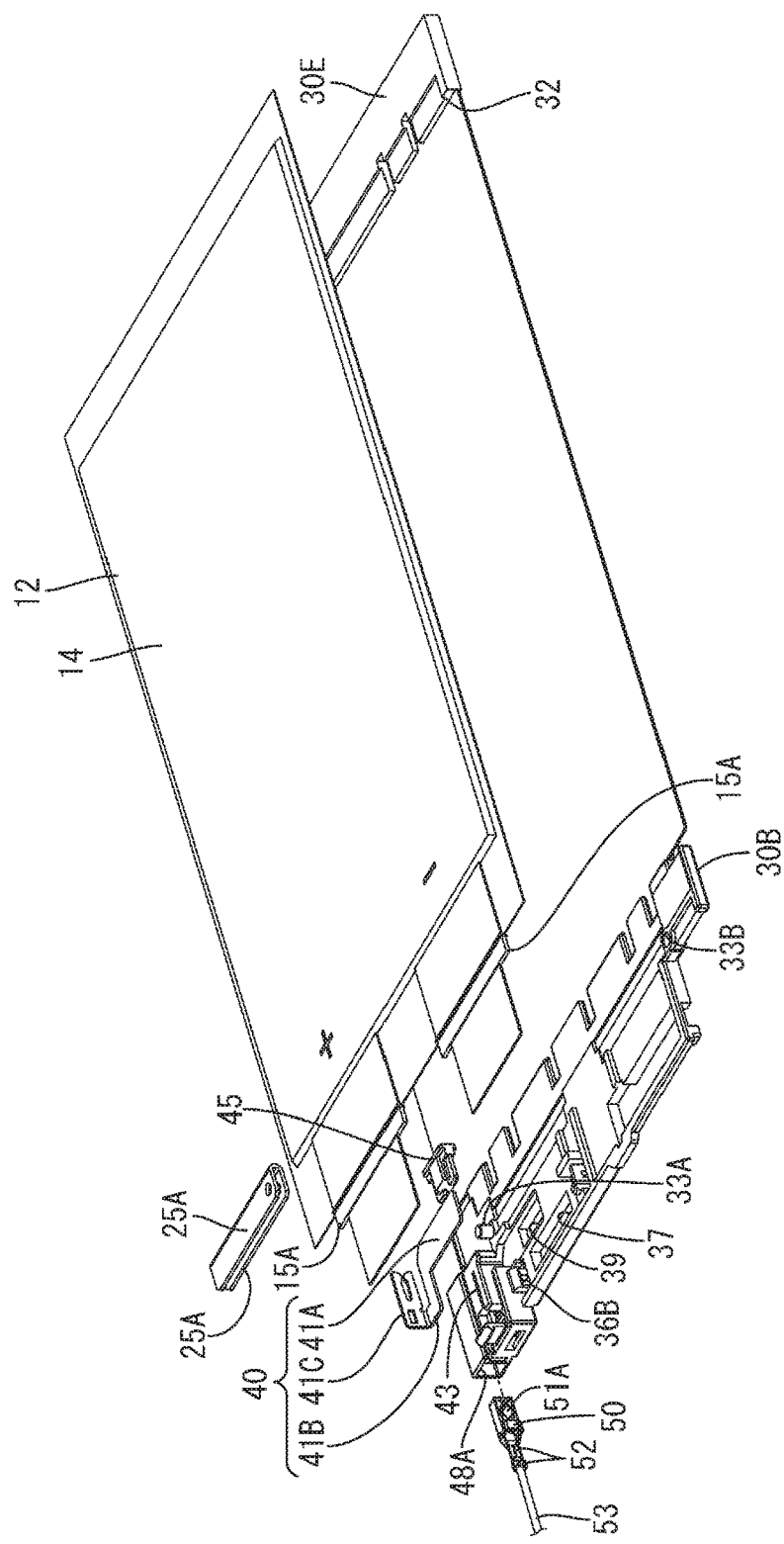
FIG. 17 is an exploded perspective view of the second electrical storage unit.
Figure 24:
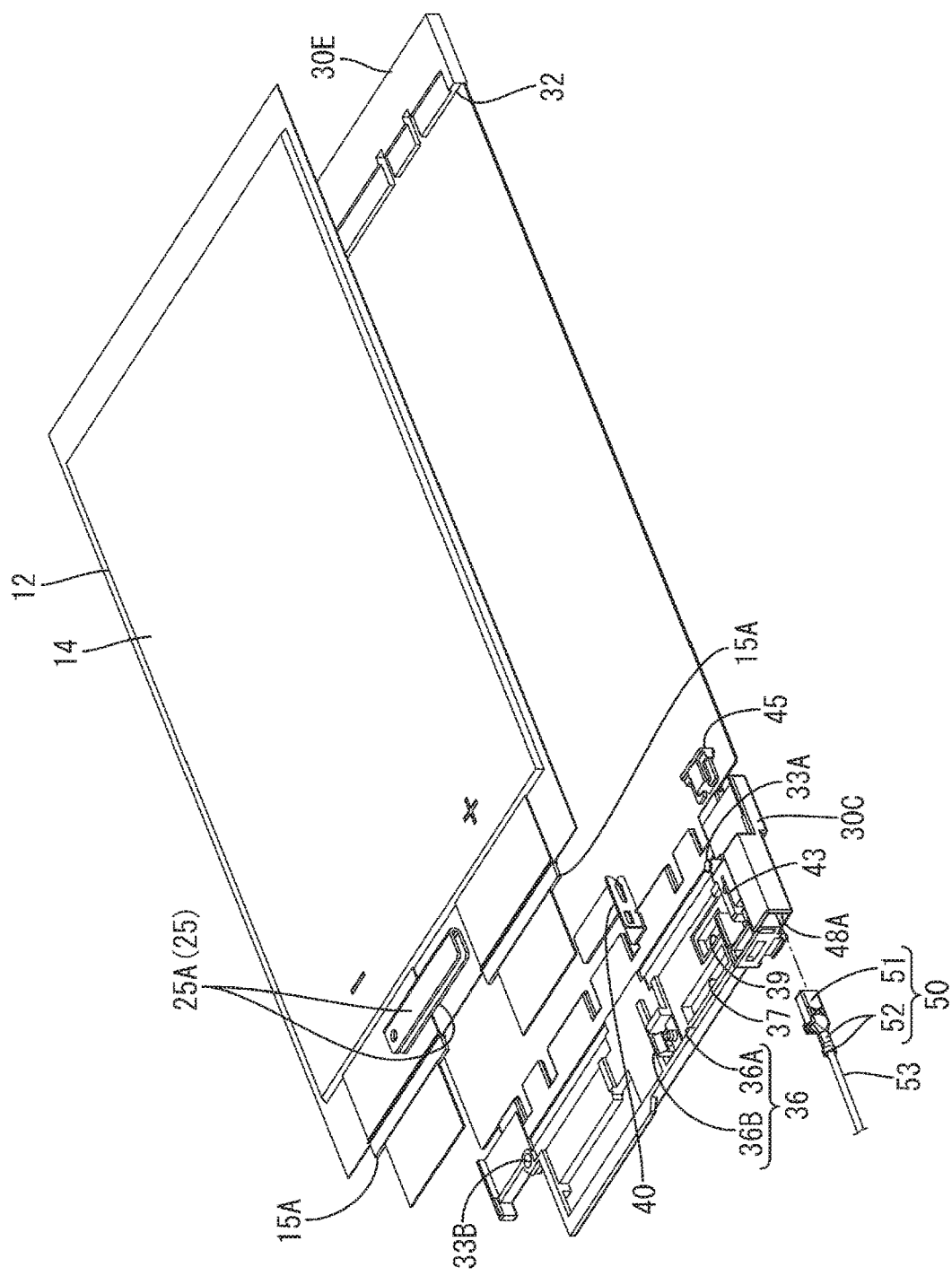
FIG. 24 is an exploded perspective view of the third electrical storage unit.

In the second electrical storage unit 21B (electrical storage unit 21 in the second stage from the bottom) and the third electrical storage unit 21C (electrical storage unit 21 in the third stage from the bottom), the positive lead terminal 13A of the electrical storage element 12 is overlaid directly on and joined by welding to the fuse connecting busbar 40 arranged on the holding member 30, and is joined by welding to the busbar 25 overlaid on this positive lead terminal 13A (see FIGS. 17 and 24).

Figure 30:
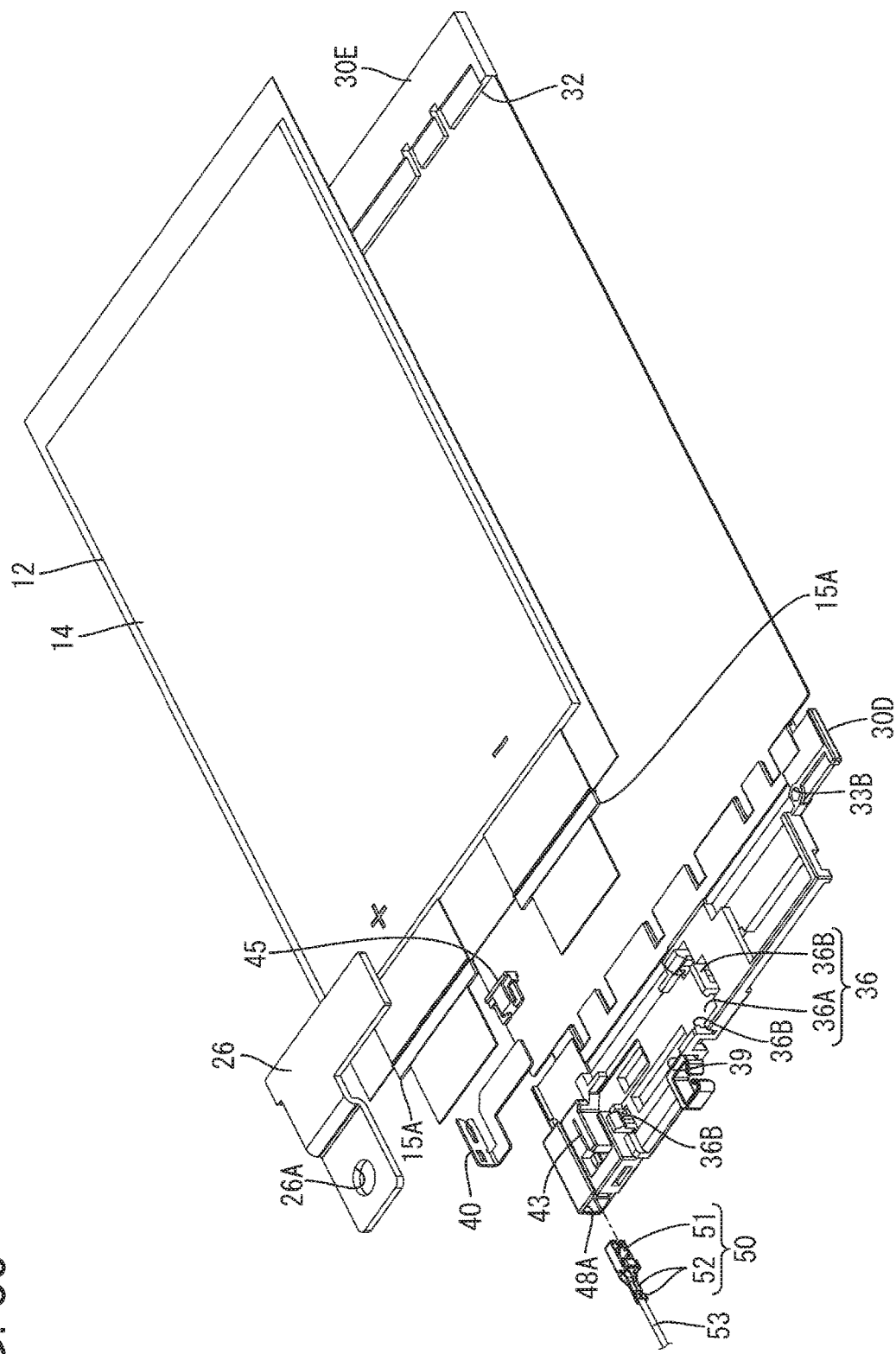
FIG. 30 is an exploded perspective view of the fourth electrical storage unit.

In the fourth electrical storage unit 21D, the positive lead terminal 13A of the electrical storage element 12 is overlaid directly on and joined by welding to a third fuse connecting busbar 40C arranged sideways on the holding member 30, and is joined by welding to the external connection busbar 26 overlaid on this positive lead terminal 13A (see FIG. 30).

Examples of the welding method include a laser welding method, an ultrasonic welding method, and the like.

Holding Member 30

A holding member 30 of each electrical storage unit 21 is provided with electrical storage element holding parts 31 that are recessed and into which the corner parts 15A of the lead terminals 13 of the electrical storage element 12 are fitted. This electrical storage element holding parts 31 restrict the displacement of the lead terminals 13 (electrical storage element 12).

In the present embodiment, five types of holding members 30 are used. Of the two holding members 30 constituting (i.e. part of) the first electrical storage unit 21A, the holding member 30 arranged on the front side is a first holding member 30A (see FIGS. 4 and 12), and the holding member 30 arranged on the rear side is a fifth holding member 30E (see FIG. 4).

Figure 13:
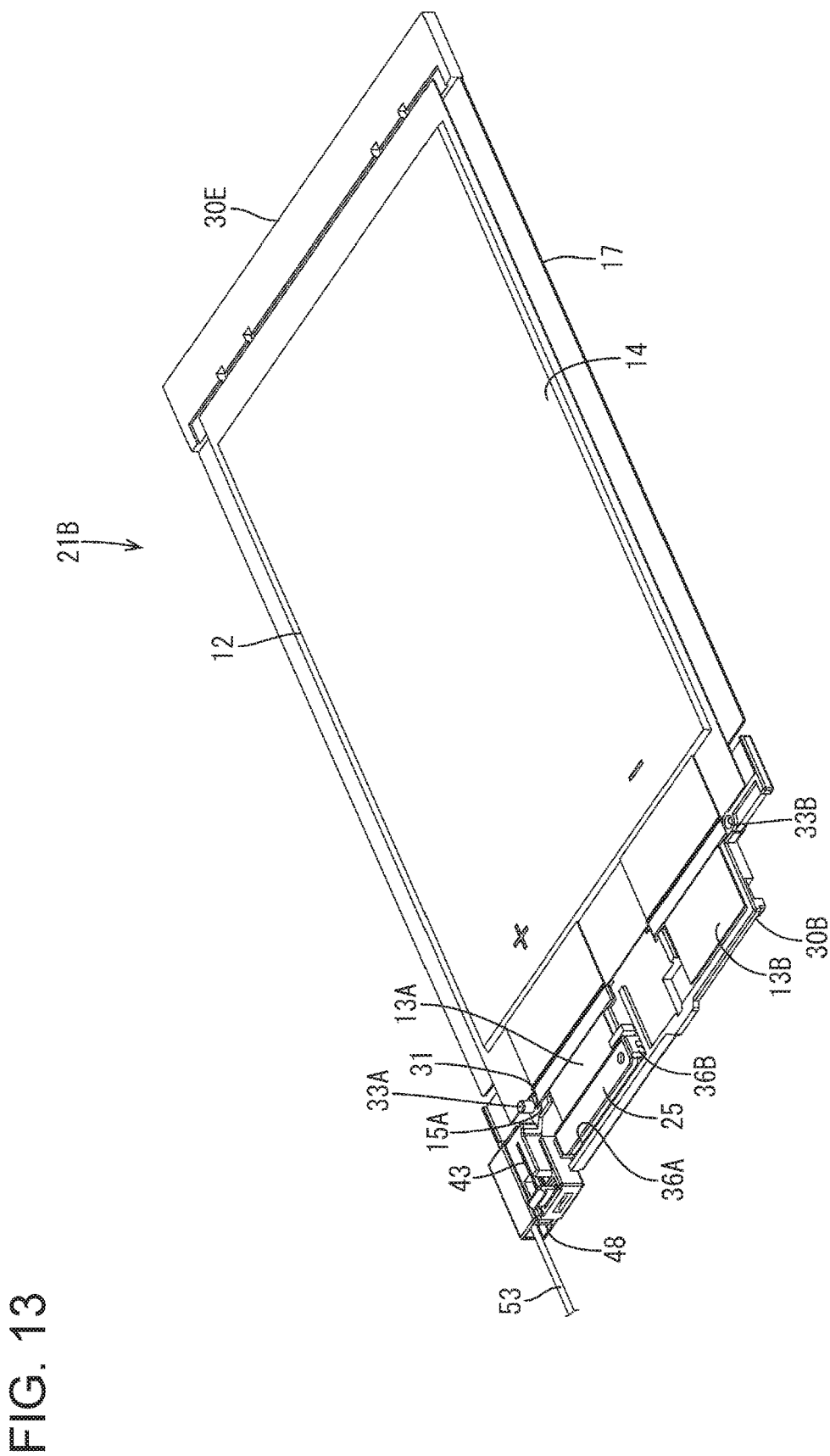
FIG. 13 is a perspective view illustrating a second electrical storage unit (electrical storage unit in the second stage from the bottom).
Figure 14:
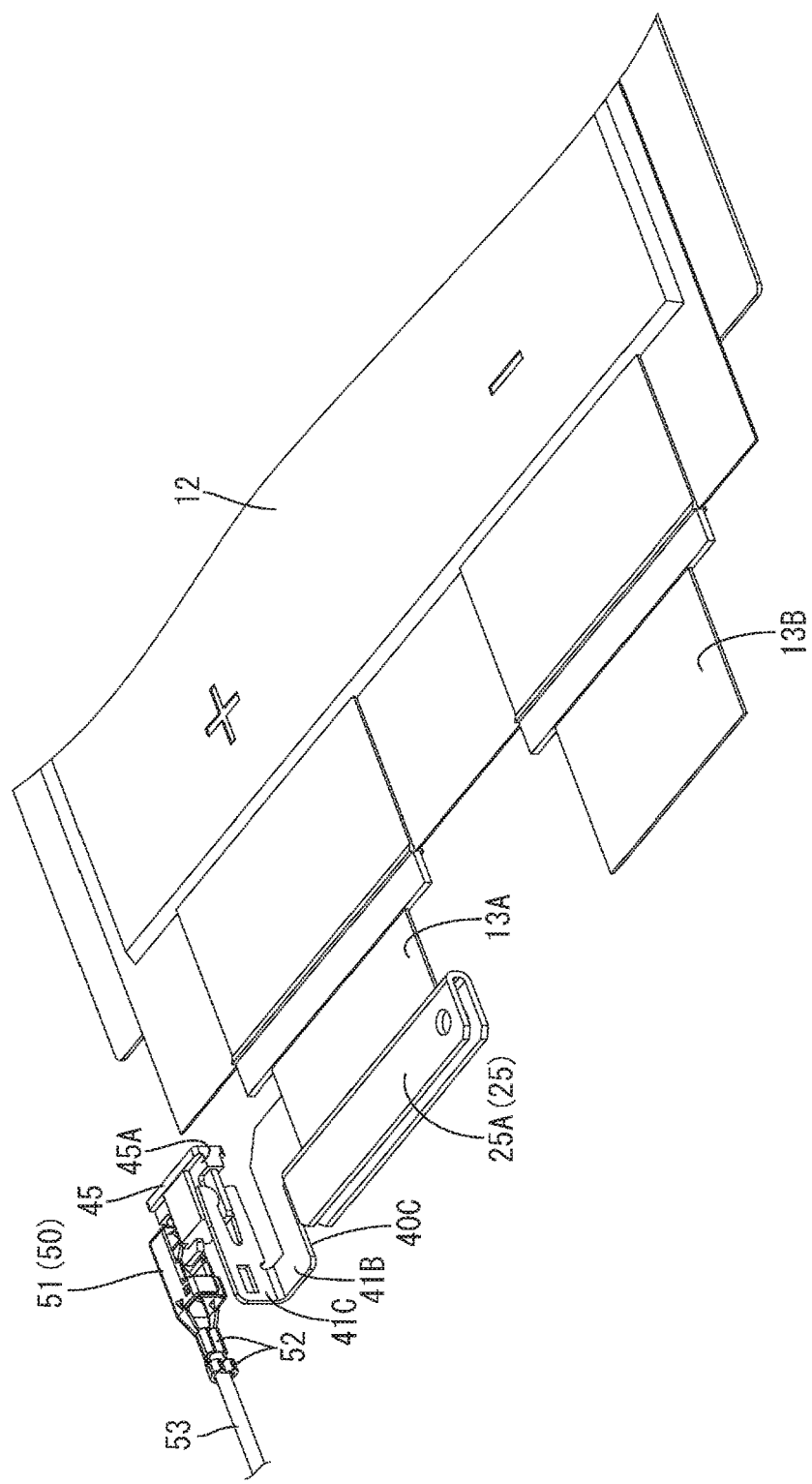
FIG. 14 is a partial perspective view of the second electrical storage unit (without a holding member).
Figure 15:
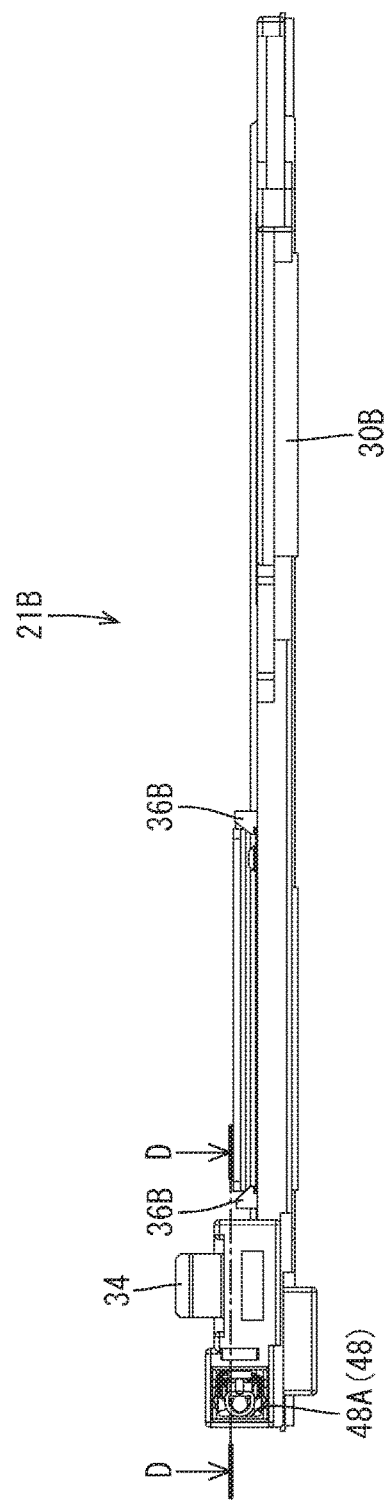
FIG. 15 is a front view of the second electrical storage unit.
Figure 16:
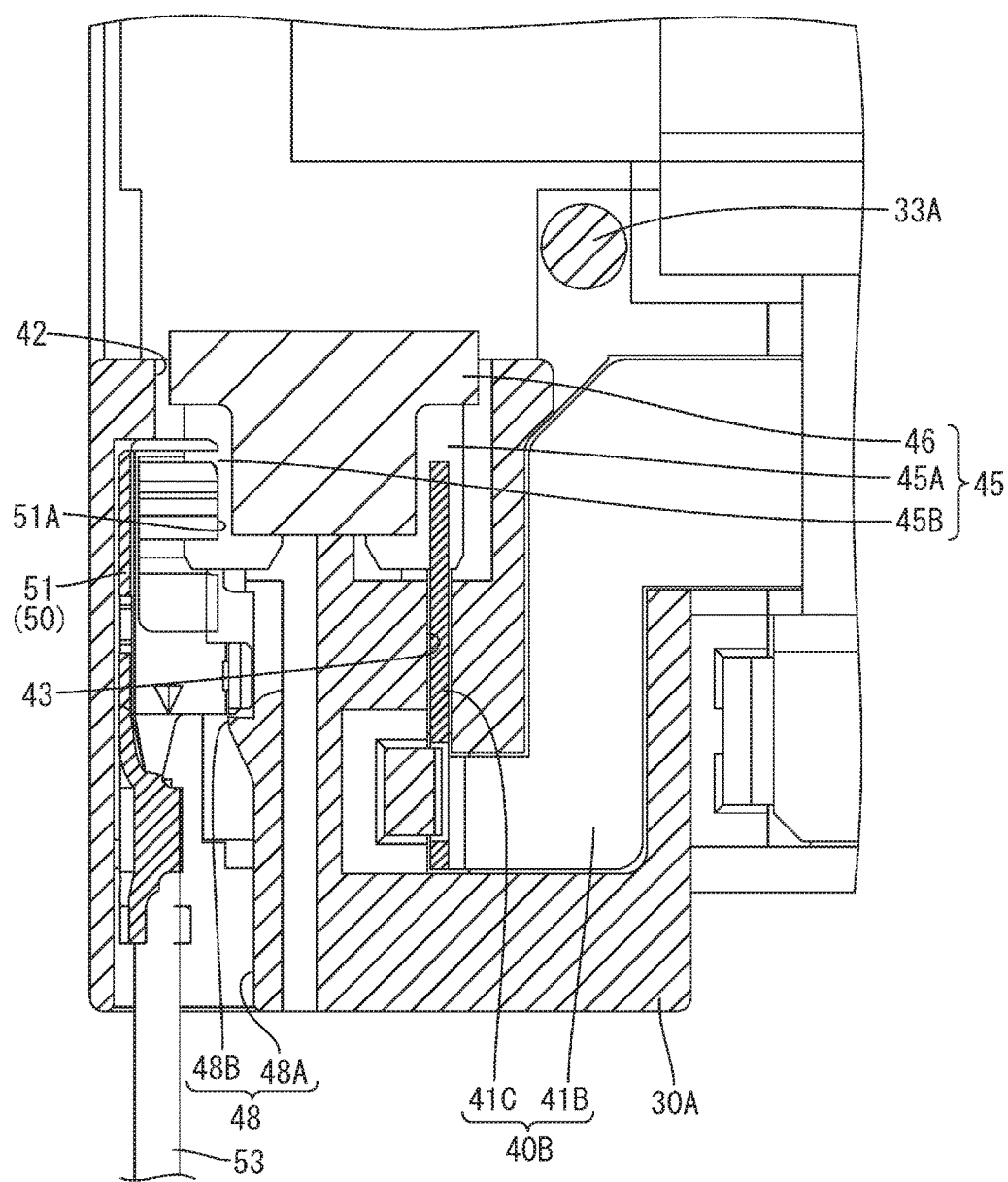
FIG. 16 is a cross-sectional view taken along a line D-D of FIG. 15.

Of the two holding members 30 constituting the second electrical storage unit 21B, the holding member 30 arranged on the front side is a second holding member 30B (see FIGS. 13 and 19), and the holding member 30 arranged on the rear side is the fifth holding member 30E (see FIG. 13).

Figure 20:
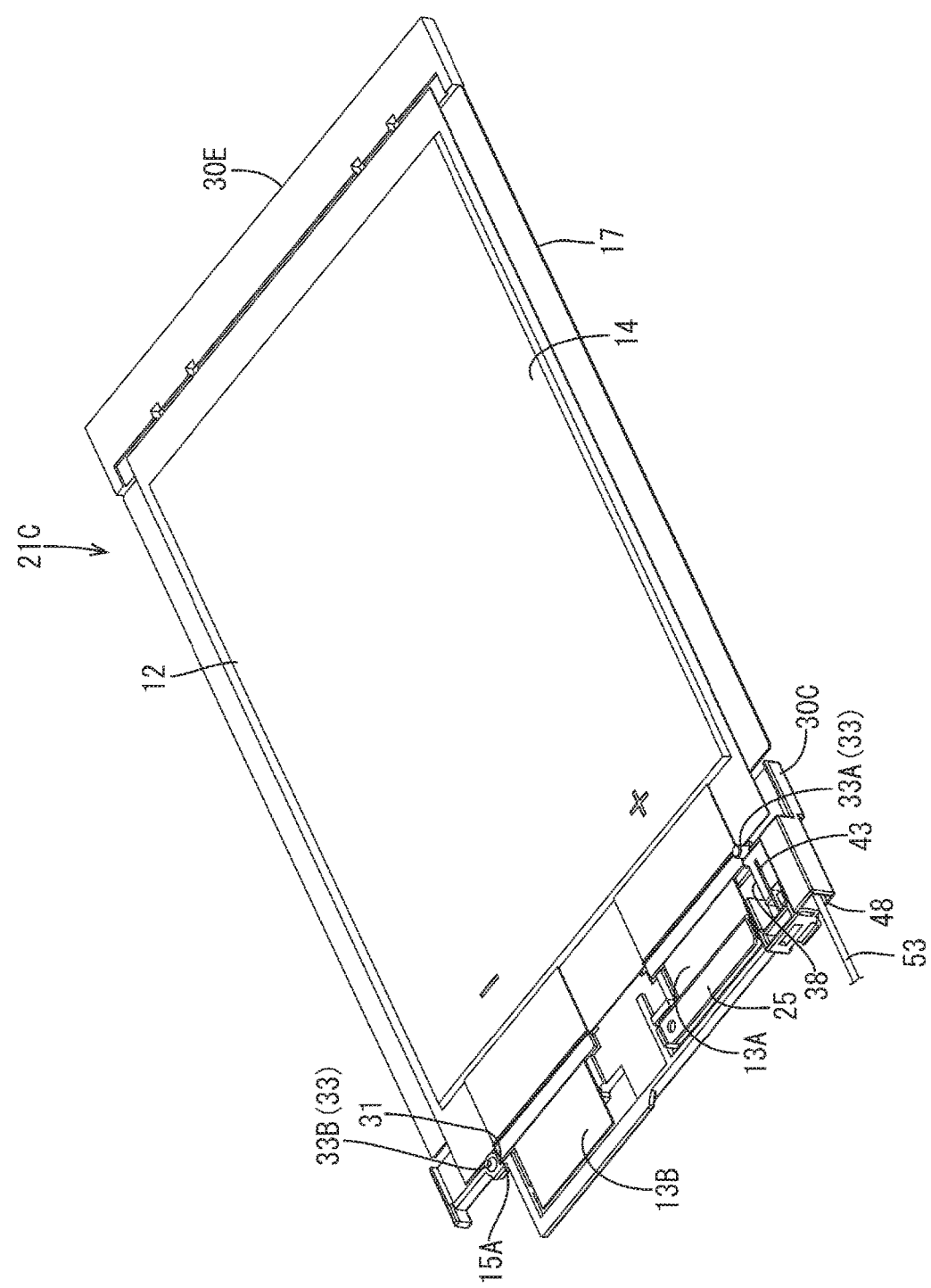
FIG. 20 is a perspective view illustrating a third electrical storage unit (electrical storage unit in the third stage from the bottom).
Figure 21:
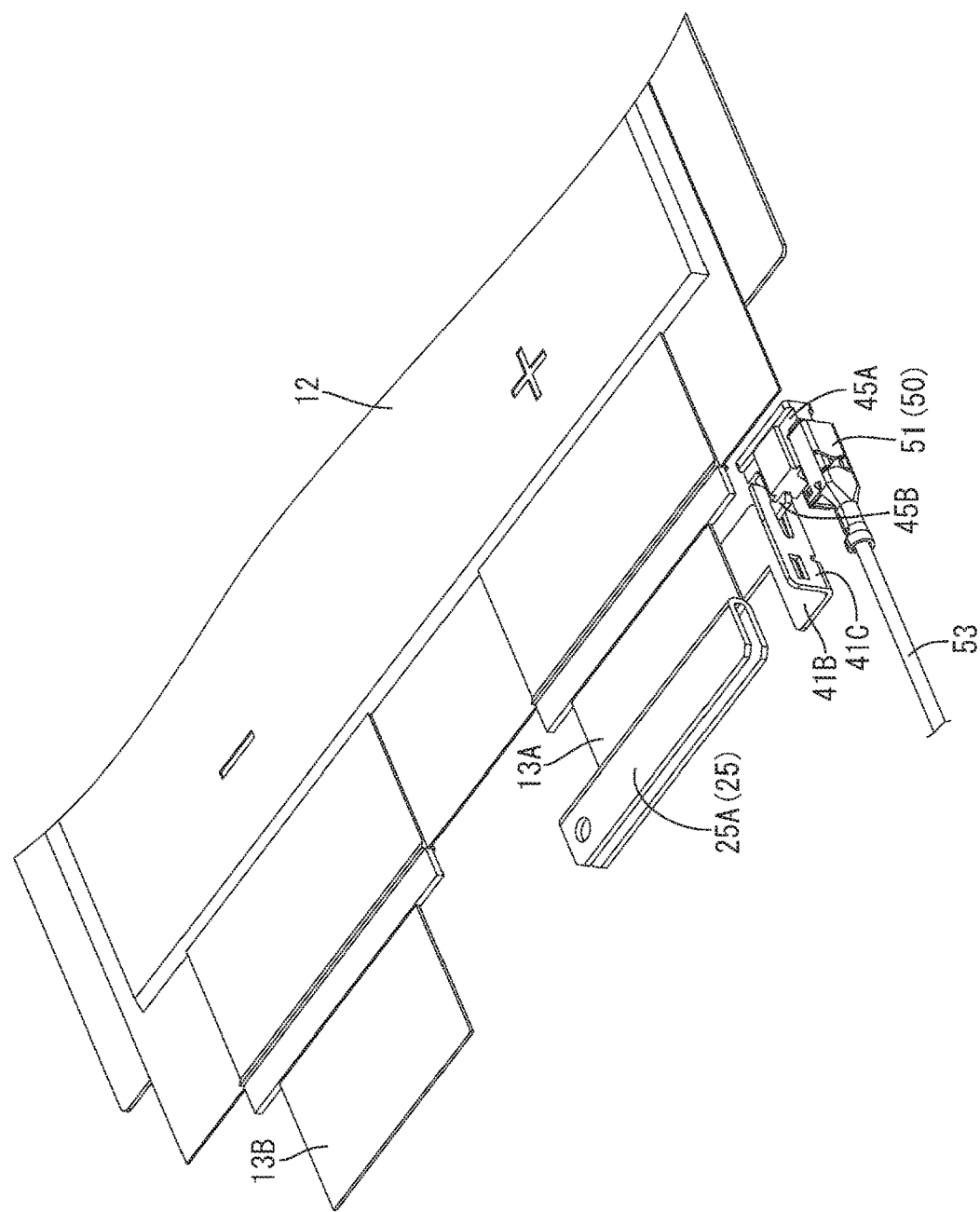
FIG. 21 is a partial perspective view of the third electrical storage unit (without a holding member).
Figure 22:
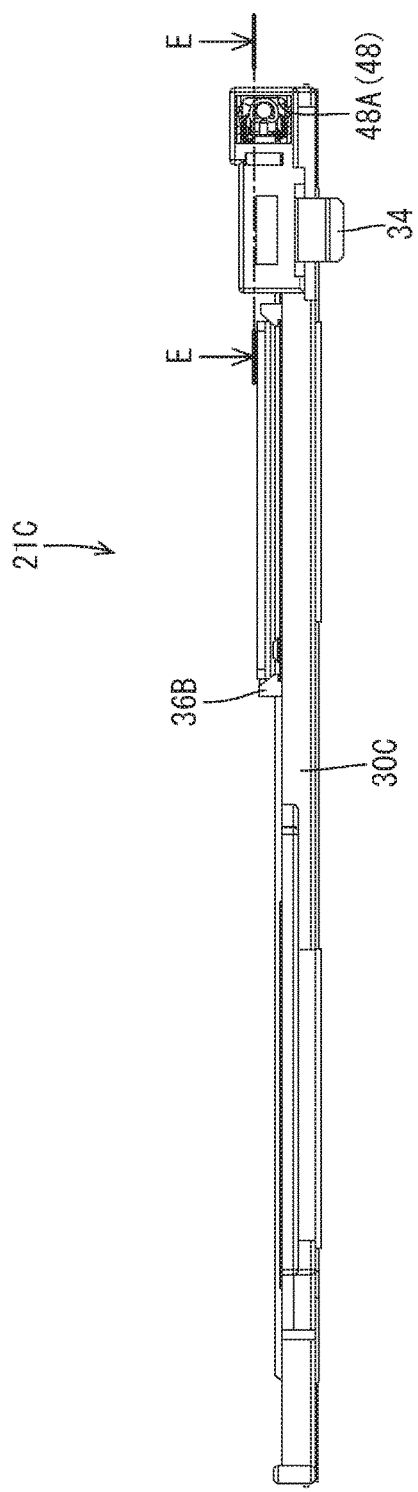
FIG. 22 is a front view of the third electrical storage unit.
Figure 23:
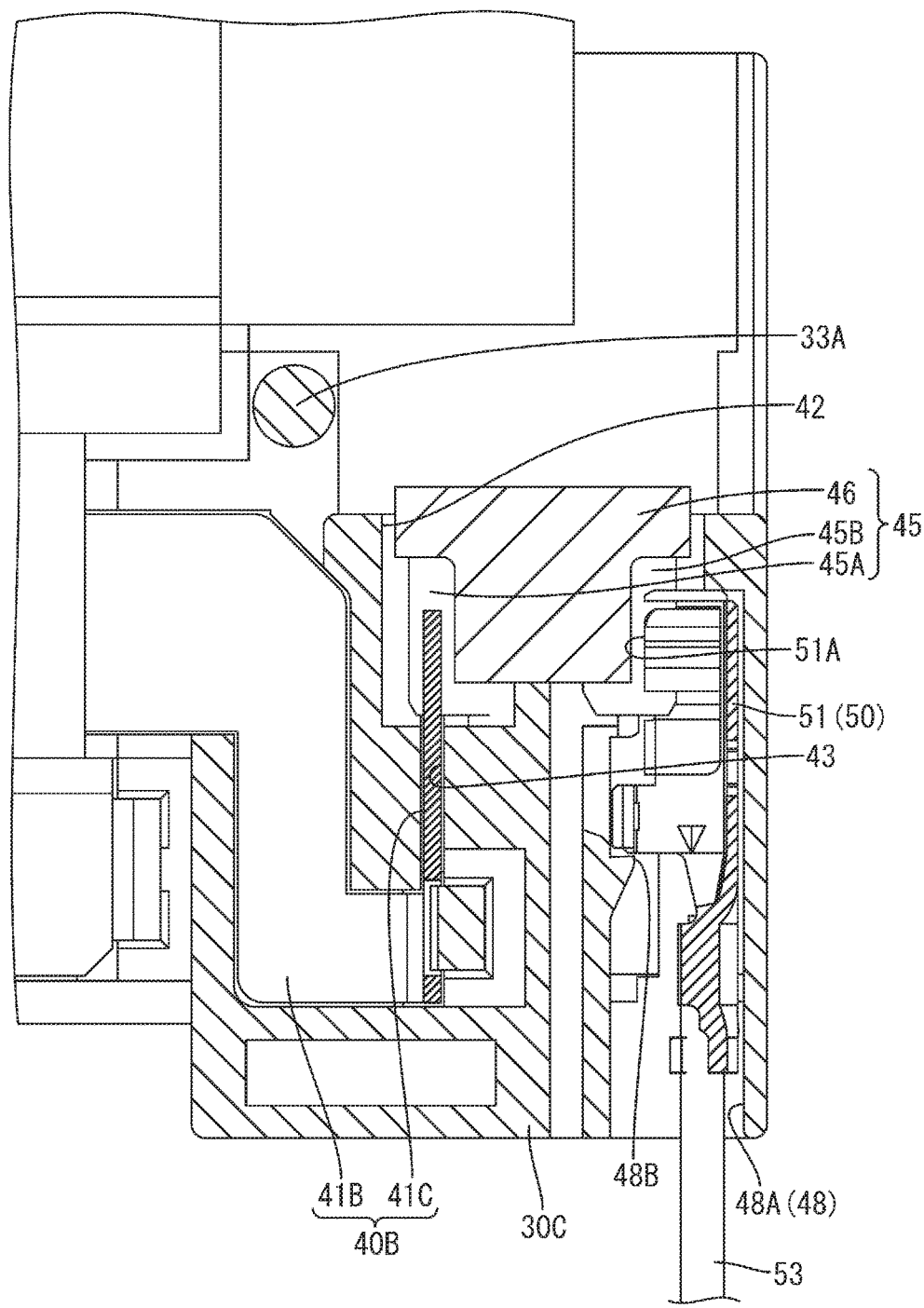
FIG. 23 is a cross-sectional view taken along a line E-E of FIG. 22.

Of the two holding members 30 constituting the third electrical storage unit 21C, the holding member 30 arranged on the front side is a third holding member 30C (see FIGS. 20 and 25), and the holding member 30 arranged on the rear side is the fifth holding member 30E (see FIG. 20).

Figure 26:
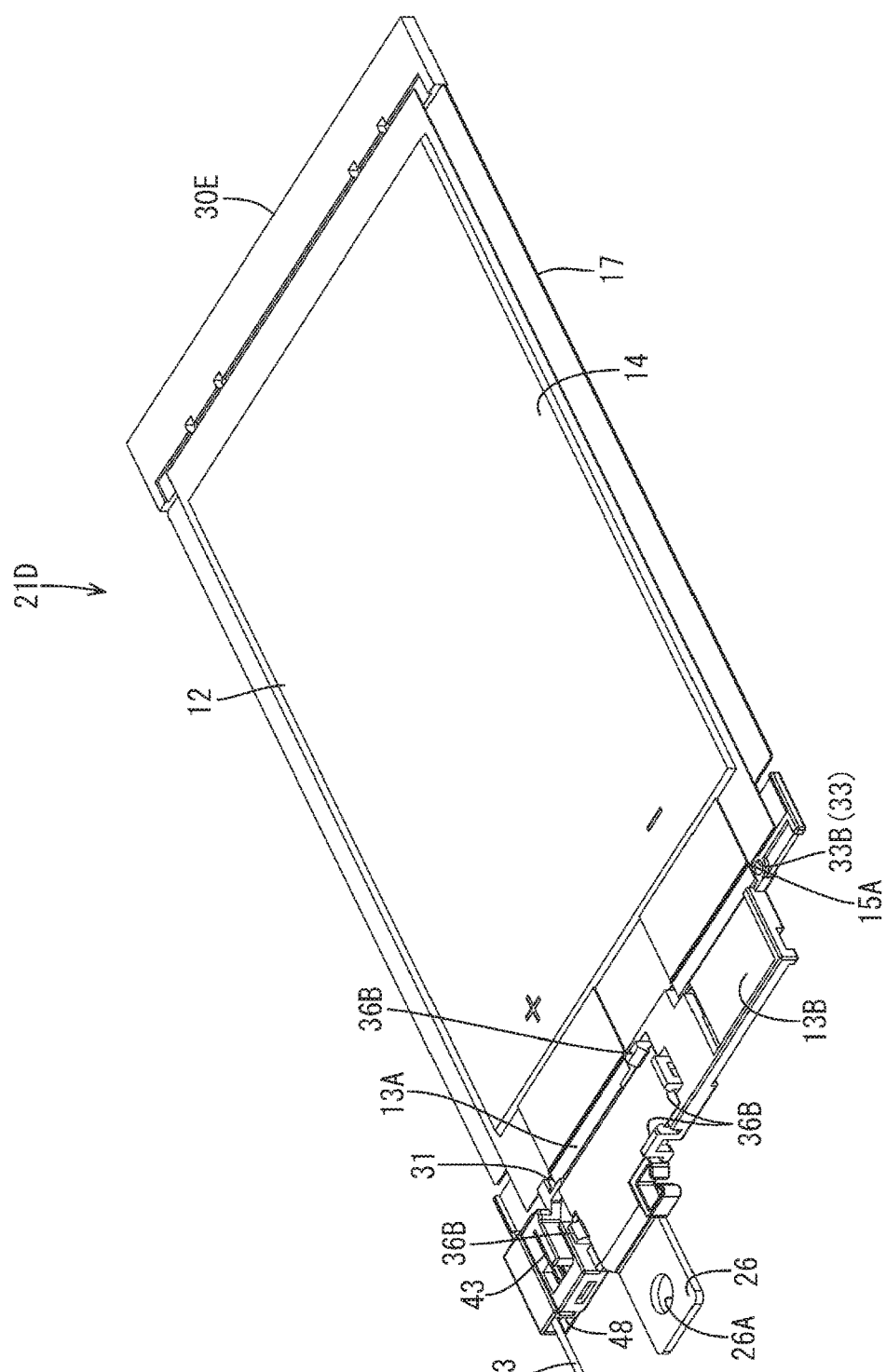
FIG. 26 is a perspective view illustrating a fourth electrical storage unit (electrical storage unit at the uppermost stage).
Figure 27:
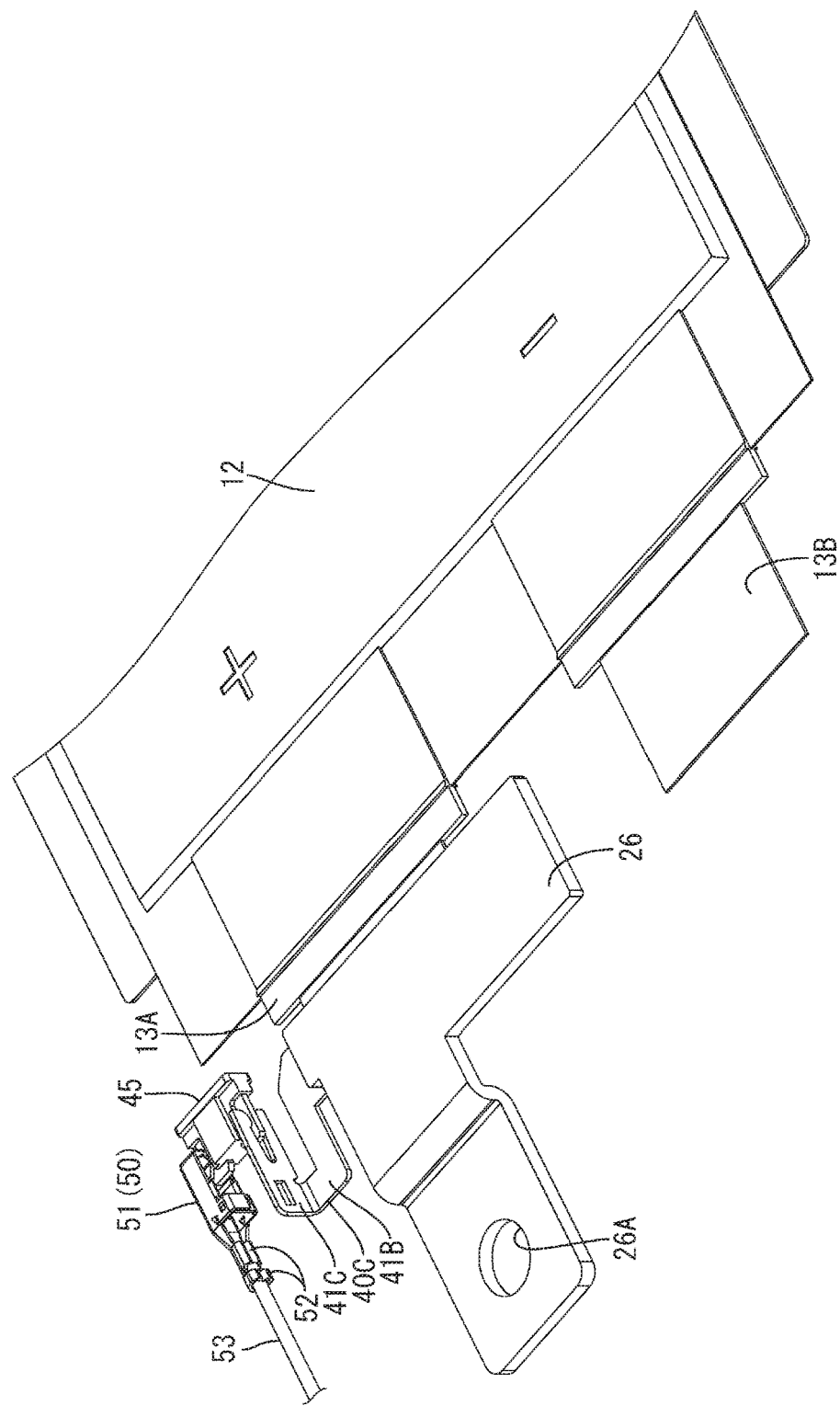
FIG. 27 is a partial perspective view of the fourth electrical storage unit (without a holding member).
Figure 28:
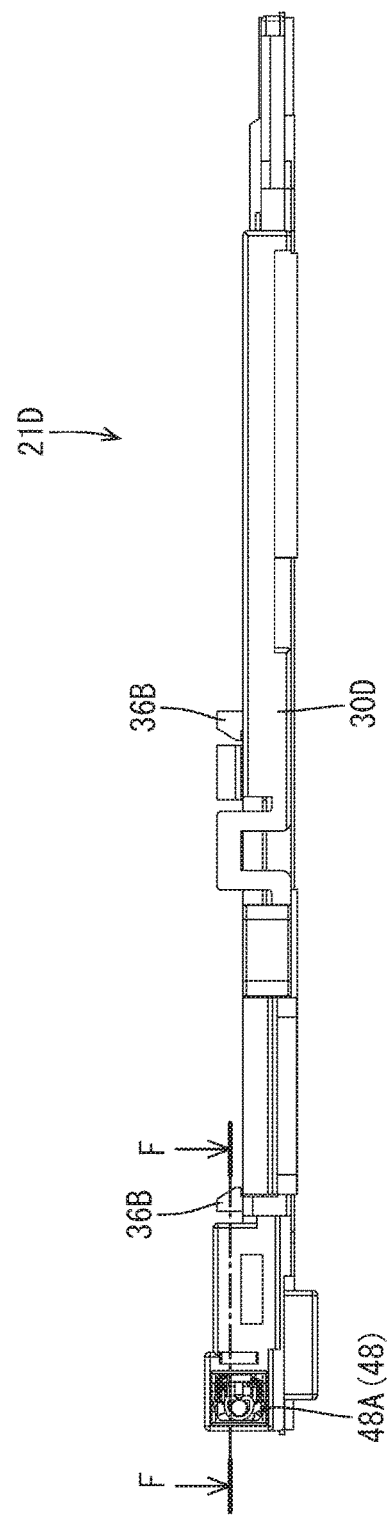
FIG. 28 is a front view of the fourth electrical storage unit.
Figure 29:
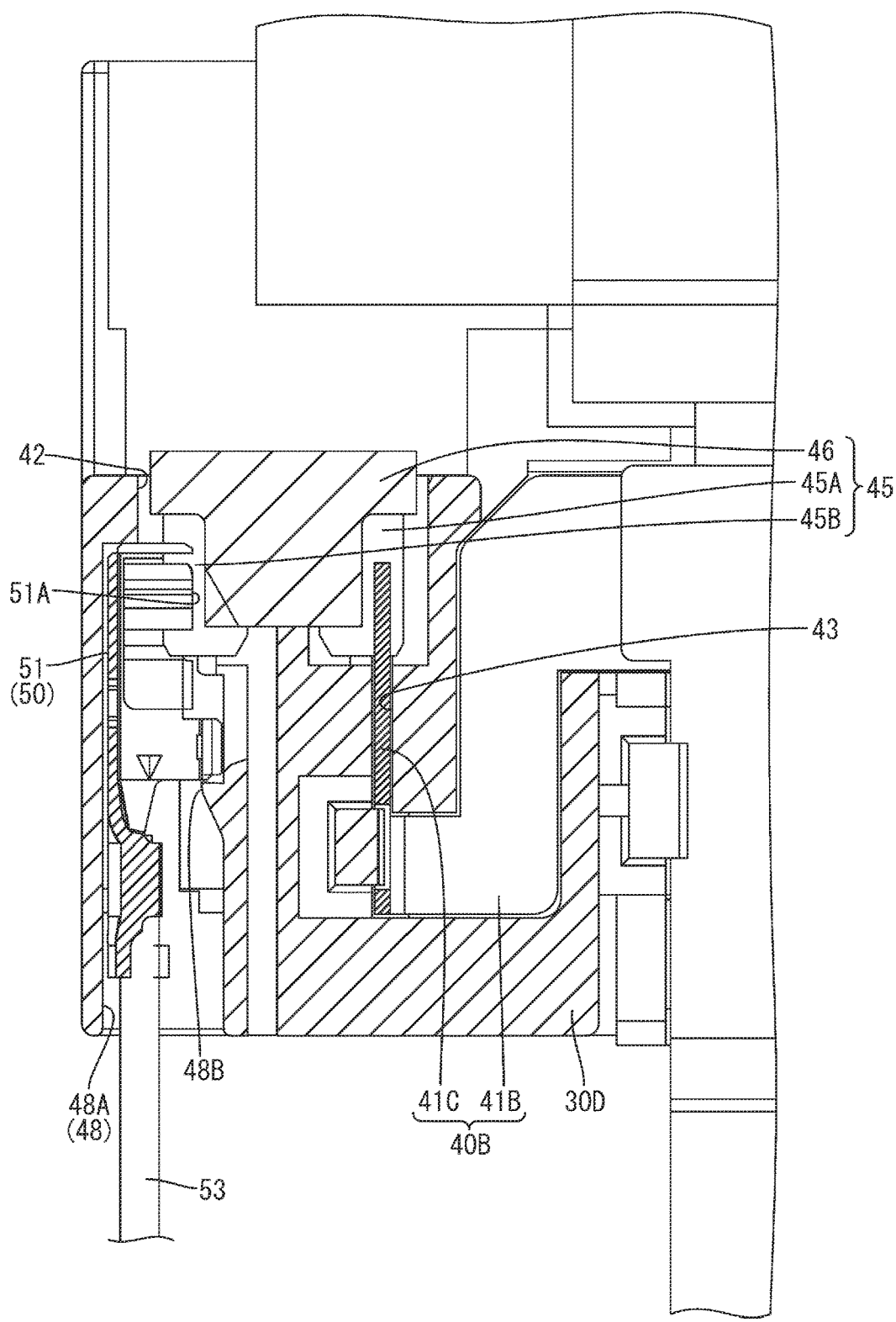
FIG. 29 is a cross-sectional view taken along a line F-F of FIG. 28.

Of the two holding members 30 constituting the fourth electrical storage unit 21D, the holding member 30 arranged on the front side is a fourth holding member 30D (see FIGS. 26 and 31), the holding member 30 arranged on the rear side is the fifth holding member 30E (see FIG. 26).

Each of the holding members 30A, 30B, 30C, and 30D arranged on the front side of the electrical storage units 21 includes a fuse mounting part 42 on which the fuse 45 is mounted, and a terminal housing part 48 in which the detection terminal 50 is housed, and holds the lead terminals 13 and the fuse connecting buster 40 that electrically connects the fuse 45 and the lead terminal 13.

Each holding member 30 is provided with a heat transfer member mounting part 32 into which the heat transfer member 17 is inserted and attached.

Figure 12:
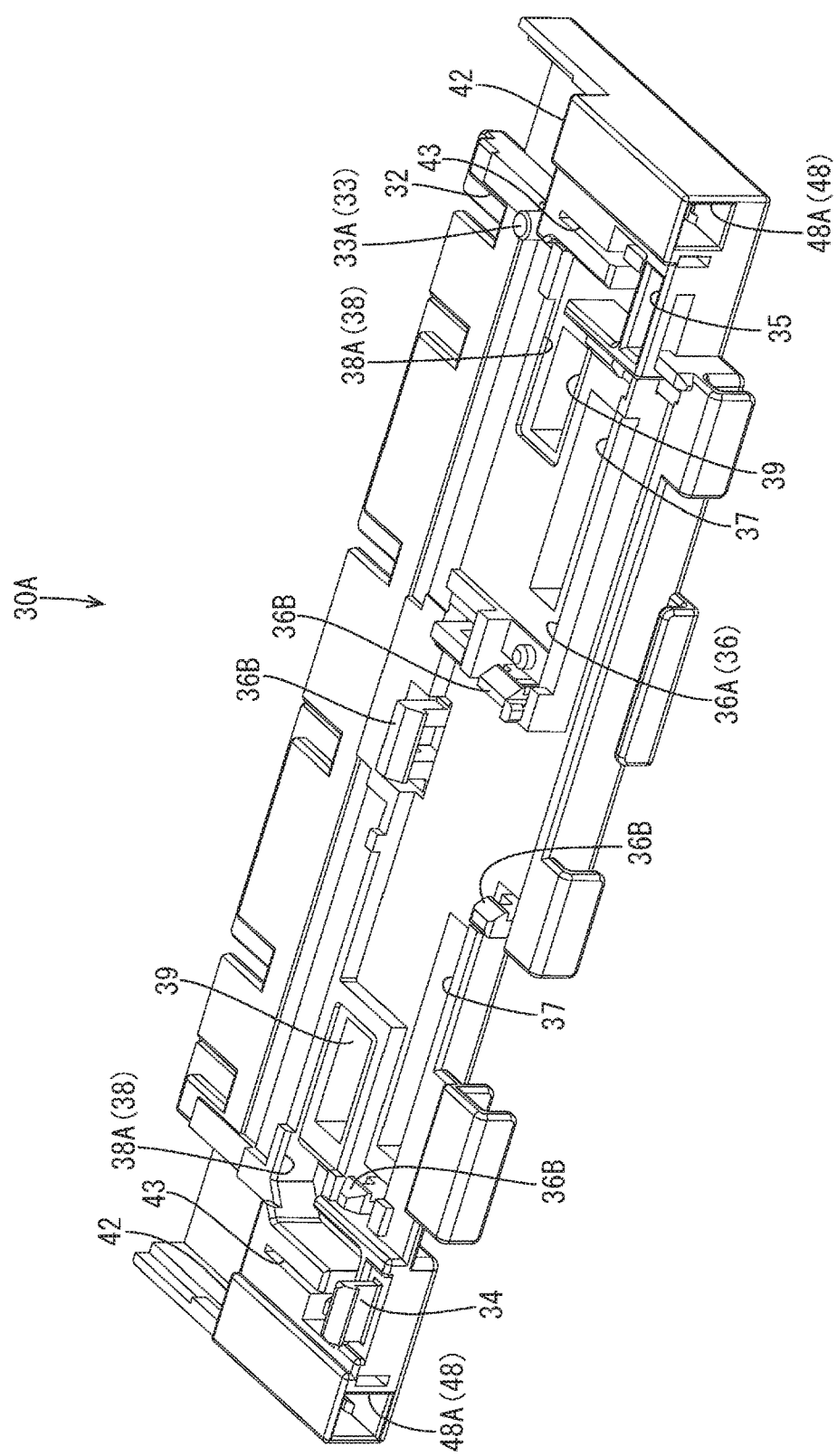
FIG. 12 is a perspective view illustrating a first holding member.

The first holding member 30A has, at a position close to the right side of FIG. 12, a positioning protrusion 33A for positioning the second holding member 30B. The second holding member 30B has, at the position close to the right side of FIG. 19, a positioning hole 33B for receiving the positioning protrusion 33A of the first holding member 30A, and has, at the position close to the left side of the figure, a positioning protrusion 33A for positioning the third holding member 30C.

Figure 25:
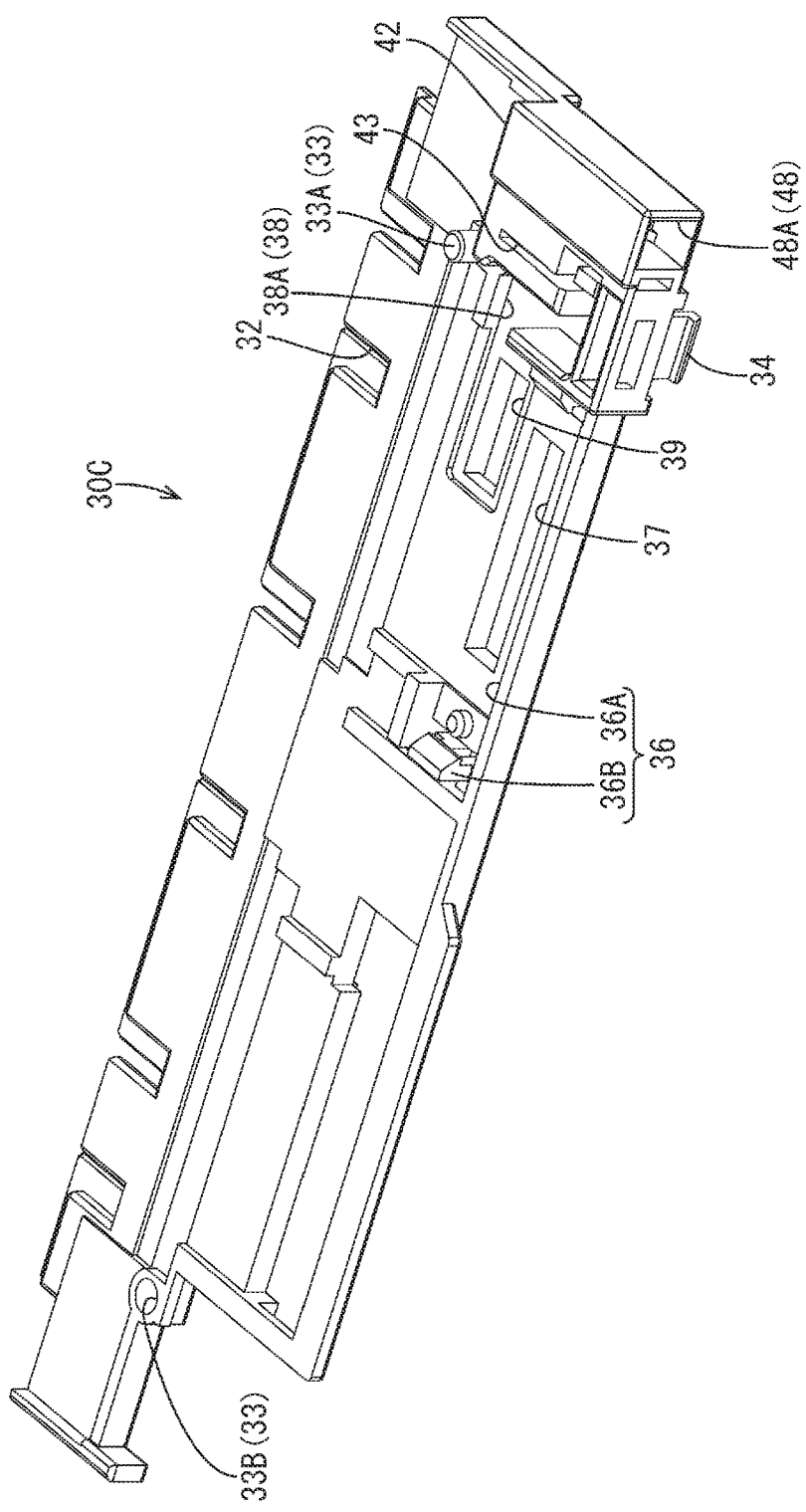
FIG. 25 is a perspective view illustrating a third holding member.

The third holding member 30C has, at the position close to the left side of FIG. 25, a positioning hole 33B for receiving the positioning protrusion 33A of the second holding member 30B, and has, at the position close to the right side of the figure, a positioning protrusion 33A for positioning the fourth holding member 30D.

Figure 31:
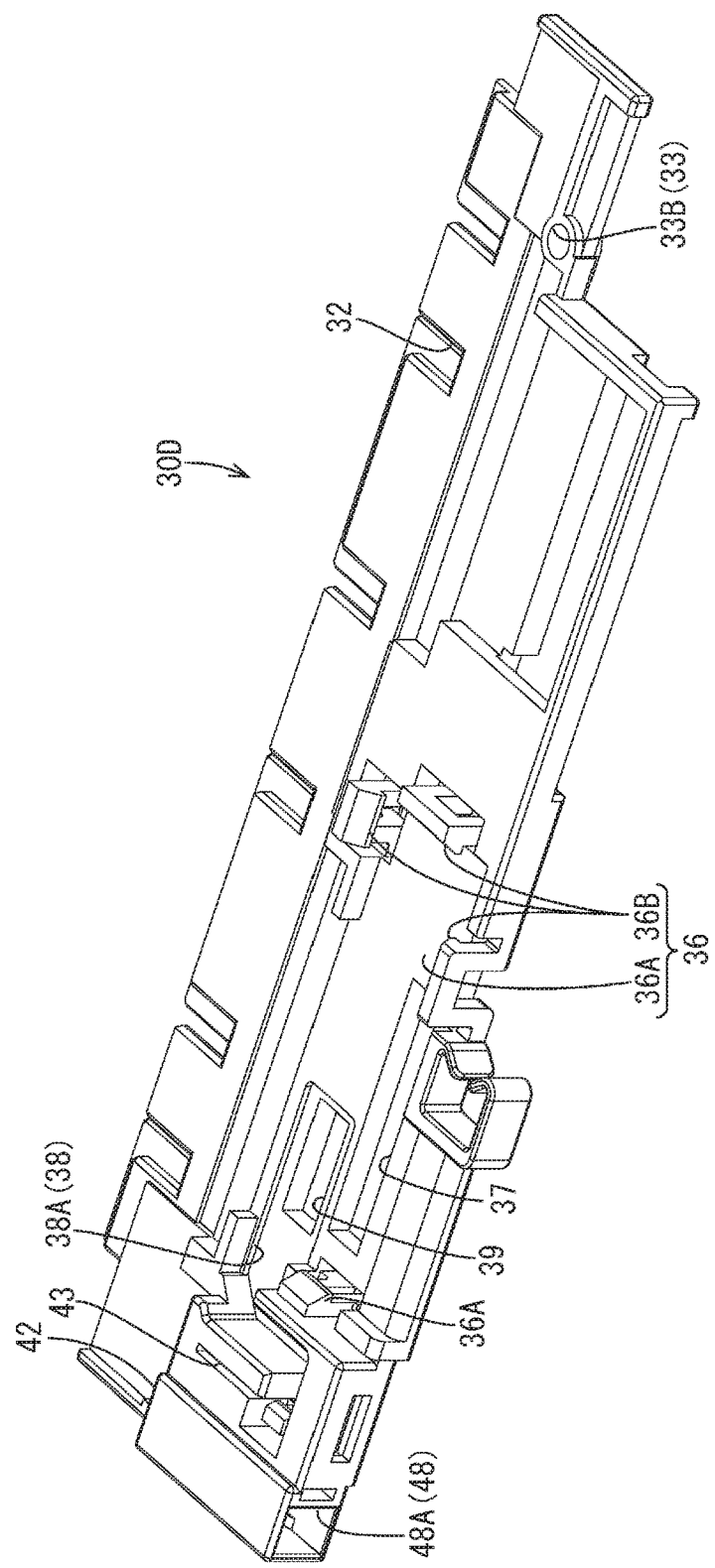
FIG. 31 is a perspective view illustrating a fourth holding member.

The fourth holding member 30D has, at the position close to the right side of FIG. 31, a positioning hole 33B for receiving the positioning protrusion 33A of the third holding member 30C.

The first holding member 30A has an engagement protrusion 34 that protrudes upward and engages with the second holding member 30B, and an engagement-receiving part 35 that receives and engages with the engagement protrusion 34 of the third holding member 30C. The second holding member 30B has an engagement-receiving part 35 that receives and engages with the engagement protrusion 34 of the first holding member 30A, and an engagement protrusion 34 that protrudes upward and engages with the fourth holding member 30D.

The third holding member 30C has an engagement protrusion 34 that protrudes downward and engages with the engagement-receiving part 35 of the first holding member 30A. The fourth holding member 30D has an engagement-receiving part 35 that receives and engages with the engagement protrusion 34 of the second holding member 30B.

The first holding member 30A, the second holding member 30B, the third holding member 30C, and the fourth holding member 30D are each provided with a connection member holding part 36 that holds the busbar 25 or the external connection busbar 26, and the lead terminal 13 in a state in which they are overlaid on each other. The connection member holding part 36 is provided with a recessed part 36A into which the busbar 25 or the external connection busbar 26 can be fitted, and a retaining protrusion 36B that retains the busbar 25 or the external connection busbar 26 that is fitted into the recessed part 36A.

The first holding member 30A, the second holding member 30B, the third holding member 30C, and the fourth holding member 30D are each provided with a first welding hole 37 for use in welding and connecting the lead terminal 13 of the electrical storage element 12 to the connection member (the busbar 25 or the external connection busbar 26) to be connected to the lead terminal 13 of the electrical storage element 12 (see FIGS. 12, 19, 25, and 31).

The busbars 25 are made of aluminum or an aluminum alloy and are arranged overlapping the lead terminals 13. As shown in FIG. 3, the busbars 25 have a U-shaped cross section so that connection parts 25A connected to the lead terminals 13 are arranged at a distance in the vertical direction.

The external connection busbars 26 are made of aluminum or an aluminum alloy, and are arranged overlapping the lead terminals 13. An end of each of the external connection busbars 26 protrudes frontward, and is provided with a connection hole 26A through which an external connection terminal (not shown) is to be connected thereto.

The first holding member 30A, the second holding member 30B, the third holding member 30C, and the fourth holding member 30D are each provided with a busbar holding part 38 that holds the fuse connecting busbar 40, a fuse mounting part 42 on which the fuse 45 is mounted, and a terminal housing part 48 for housing the detection terminal 50 that is connected to the fuse 45.

The fuse connecting busbar 40 held by the busbar holding part 38 has a terminal connection part 41A that is overlaid on and connected to the lead terminal 13, an extending part 41B that extends laterally from the terminal connection part 41A, and a tuning-fork terminal part 410 that is folded upward in the vertical direction relative to the extending part 41B, and is formed by being divided at an end into two portions. The fuse connecting busbar 40 is made of, for example, a metal material such as copper, a copper alloy, aluminum, or an aluminum alloy. The fuse 45 is interposed between the divided portions of the tuning-fork terminal part 41C, and is electrically connected to the tuning-fork terminal part 41C.

Figure 10:
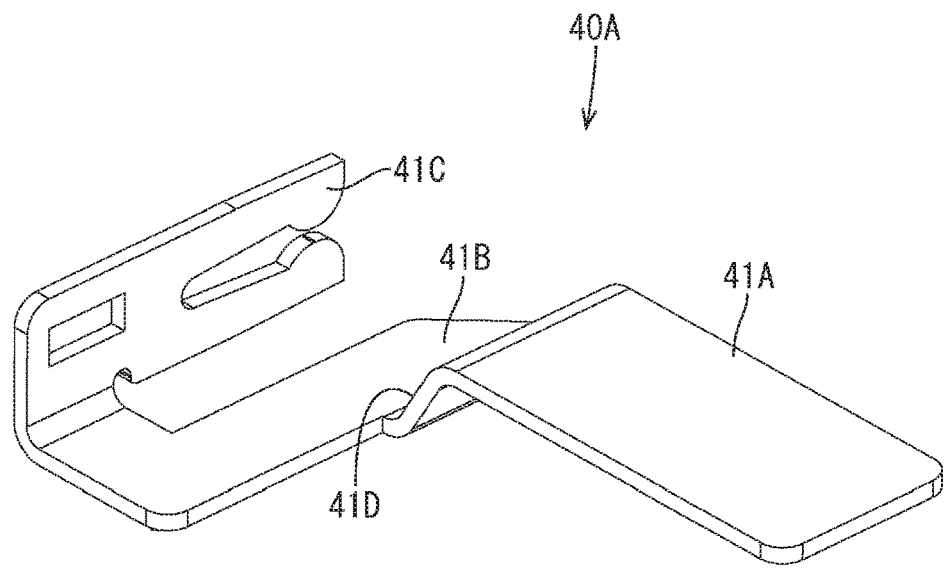
FIG. 10 is a perspective view illustrating a first fuse connnecting busbar.
Figure 11:
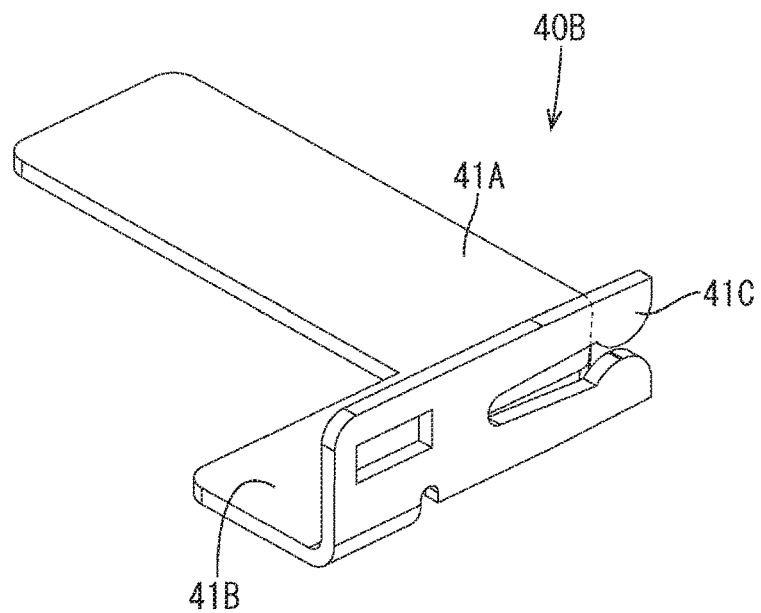
FIG. 11 is a perspective view illustrating a second fuse connecting busbar.
Figure 18:
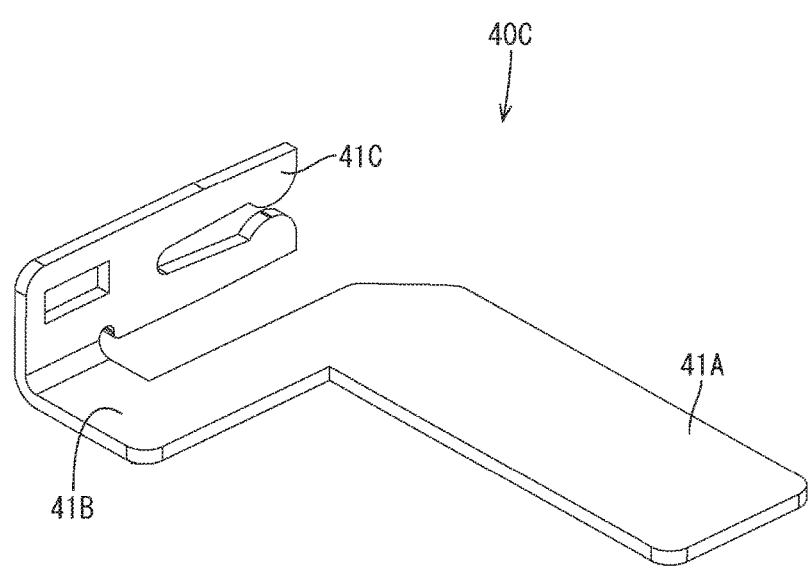
FIG. 18 is a perspective view illustrating a third fuse connecting busbar.
Figure 19:
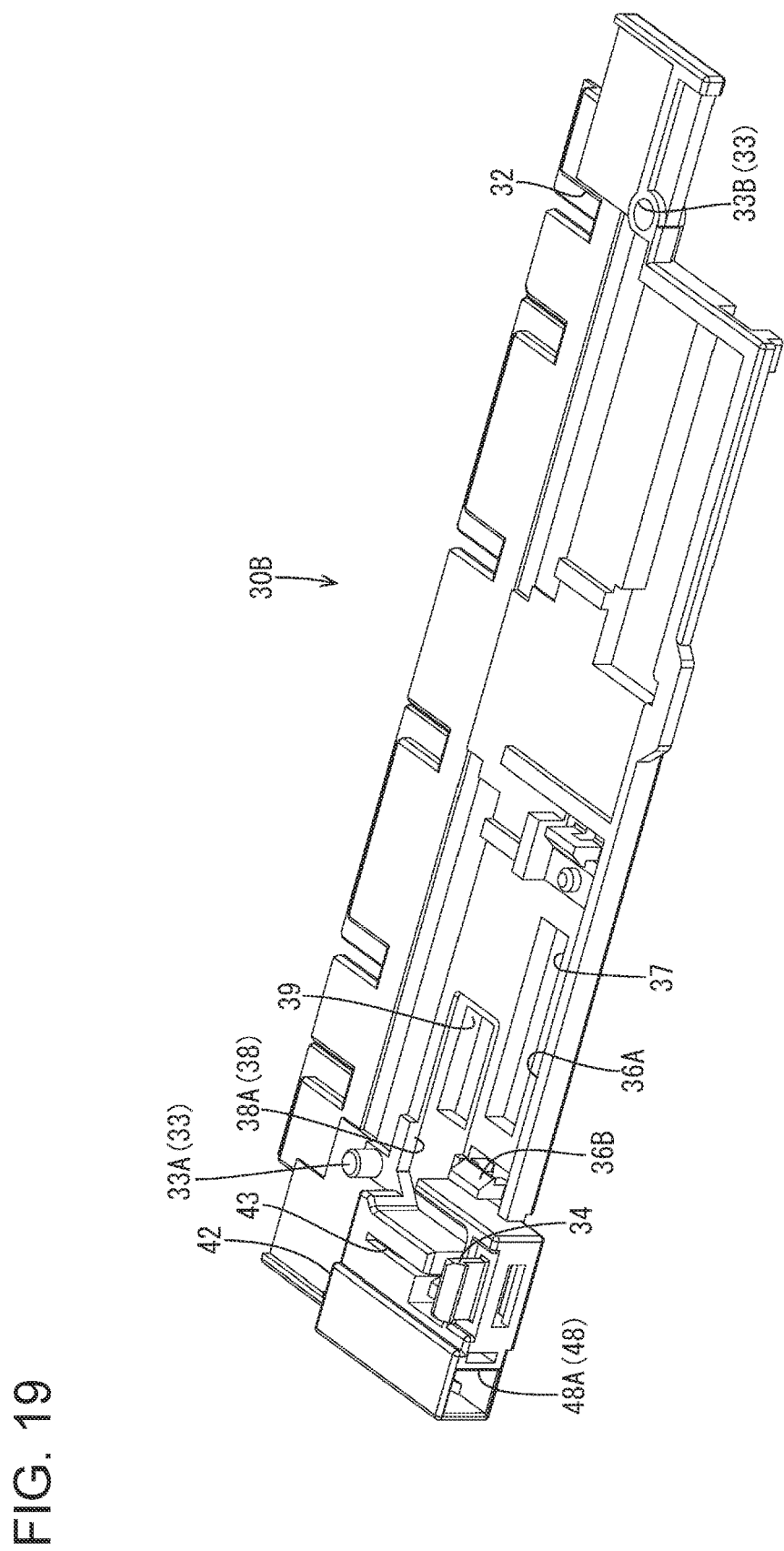
FIG. 19 is a perspective view illustrating a second holding member.

Three types of the fuse connecting busbars 40, specifically the first fuse connecting busbar 40A shown in FIG. 10, the second fuse connecting busbar 40B shown in FIG. 11, and the third fuse connecting busbar 400 shown in FIG. 18, are used.

The first fuse connecting busbar 40A is arranged under the negative lead terminal 13B of the first electrical storage unit 21A, and has a shape in which a step part 41D is formed between the terminal connection part 41A and the extending part 41B.

The second fuse connecting busbars 40B are arranged under the positive lead terminal 13A of the first electrical storage unit 21A, and the positive lead terminal 13A of the third electrical storage unit 21C.

The third fuse connecting busbars 40C are arranged under the positive lead terminal 13A of the second electrical storage unit 21B, and the positive lead terminal 13A of the fourth electrical storage unit 21D.

The second fuse connecting busbar 40B and the third fuse connecting busbar 40C are symmetric, and do not have the step part 41D.

The busbar holding part 38 has a recessed part 38A into which the terminal connection part 41A and the extending part 41B of the fuse connecting busbar 40 are fitted. The first holding member 30A, the second holding member 30B, the third holding member 30C, and the fourth holding member 30D each have a second welding hole 39 for use in welding the lead terminal 13 to the fuse connecting busbar 40 (see FIGS. 12, 19, 25, and 31).

The fuse mounting part 42 and the terminal housing part 48 are provided as one piece that is box-shaped as shown in FIGS. 12, 19, 25, and 31. The fuse mounting part 42 opens so that the fuse 45 can be inserted thereinto from the rear side. The upper wall of the fuse mounting part 42 is provided with a terminal insertion part 43 into which the tuning-fork terminal part 41C of the fuse connecting busbar 40 is inserted.

The detection terminal 50 for detecting a state of the electrical storage element is directly connected to each fuse 45. Specifically the fuse 45 includes a connection part 45A that is interposed between the divided portions of the tuning-fork terminal part 41C of the fuse connecting busbar 40 and is electrically connected to the tuning-fork terminal part 41C, a connection part 45B that is directly connected to the detection terminal 50, and an insulating part 46 that is made of an insulating resin and is provided so as to join the two connection parts 45A and 45B (see FIGS. 5, 14, 21, and 27). The two connection parts 45A and 45B are joined to each other in the inside of the insulating part 46. The connection parts 45A and 45B are made of a metal material. If an overcurrent flows through the fuse 45, the fuse 45 is melted down, interrupting the overcurrent.

The terminal housing part 48 that houses the detection terminal 50 is an opening 48A that opens on the front side, and in which a fuse connection part 51 of the detection terminal 50 is arranged.

The detection terminal 50 is obtained by pressing a metal plate material into a predetermined shape. An electric wire for voltage detection (voltage detection wire 53) is connected to the front end of the detection terminal 50, and the fuse connection part 51 connected to the connection part 45B of the fuse 45 is provided at the rear end of the detection terminal 50. The fuse connection part 51 is box-shaped, and is provided with an elastic contact piece 51A (see FIGS. 7, 8, 16, 23, and 29). The elastic contact piece 51A elastically comes into contact with the connection part 45B of the fuse 45, and is electrically connected thereto. The connection of the voltage detection wire 53 is achieved by crimping two pairs of barrel parts 52 of the detection terminal 50.

Method for Assembling Electrical Storage Module 10

The heat transfer member 17 to which the first holding member 30A and the fifth holding member 30E are attached, the heat transfer member 17 to which the second holding member 30B and the fifth holding member 30E are attached, the heat transfer member 17 to which the third holding member 30C and the fifth holding member 30E are attached, and the heat transfer member 17 to which the fourth holding member 30D and the fifth holding member 30E are attached are prepared.

The terminal connection parts 41A and the extending parts 41B of the fuse connecting busbars 40 are fitted into the recessed parts 38A of the busbar holding parts 38 of the first holding member 30A, the second holding member 30B, the third holding member 30C, and the fourth holding member 30D, and the tuning-fork terminal parts 41C of the fuse connecting busbars 40 are inserted into the terminal insertion parts 43. Furthermore, the external connection busbar 26 is fitted into the recessed part 36A of the connection member holding part 36 of the first holding member 30A.

Then, the electrical storage elements 12 are respectively placed onto the heat transfer members 17, and the corner parts 15A of the lead terminals 13 are fitted into the electrical storage element holding parts 31 of the holding members 30, so that the lead terminals 13 are overlaid on the fuse connecting busbars 40. At the first holding member 30A, the lead terminals 13 are also overlaid on the external connection busbar 26. In this state, the fuse connecting busbars 40 are respectively arranged over the second welding holes 39 each formed in the recessed part 38A of the busbar holding part 38, and the external connection busbar 26 is arranged over the first welding hole 37 formed in the recessed part 36A of the connection member holding part 36.

The fuse connecting busbar 40 and the lead terminal 13 that are arranged over each second welding hole 39 are joined to each other by ultrasonic welding via the second welding hole 39, and are brought into a connected state.

Then, the busbars 25 are fitted into and attached to the connection member holding parts 36 on the positive lead terminal 13A side of the first holding member 30A, the second holding member 30B, and the third holding member 30C, and the external connection busbar 26 is fitted into and attached to the connection member holding part 36 on the positive lead terminal 13A side of the fourth holding member 30D. In this state, the positive lead terminal 13A, and the busbar 25 or the external connection busbar 26 are arranged over the first welding hole 37 formed in the recessed part 36A of each connection member holding part 36.

Then, the lead terminal 13 and the busbar 25 or the external connection busbar 26 that are arranged over each first welding hole 37 are joined to each other by laser welding via the first welding hole 37.

Figure 4:
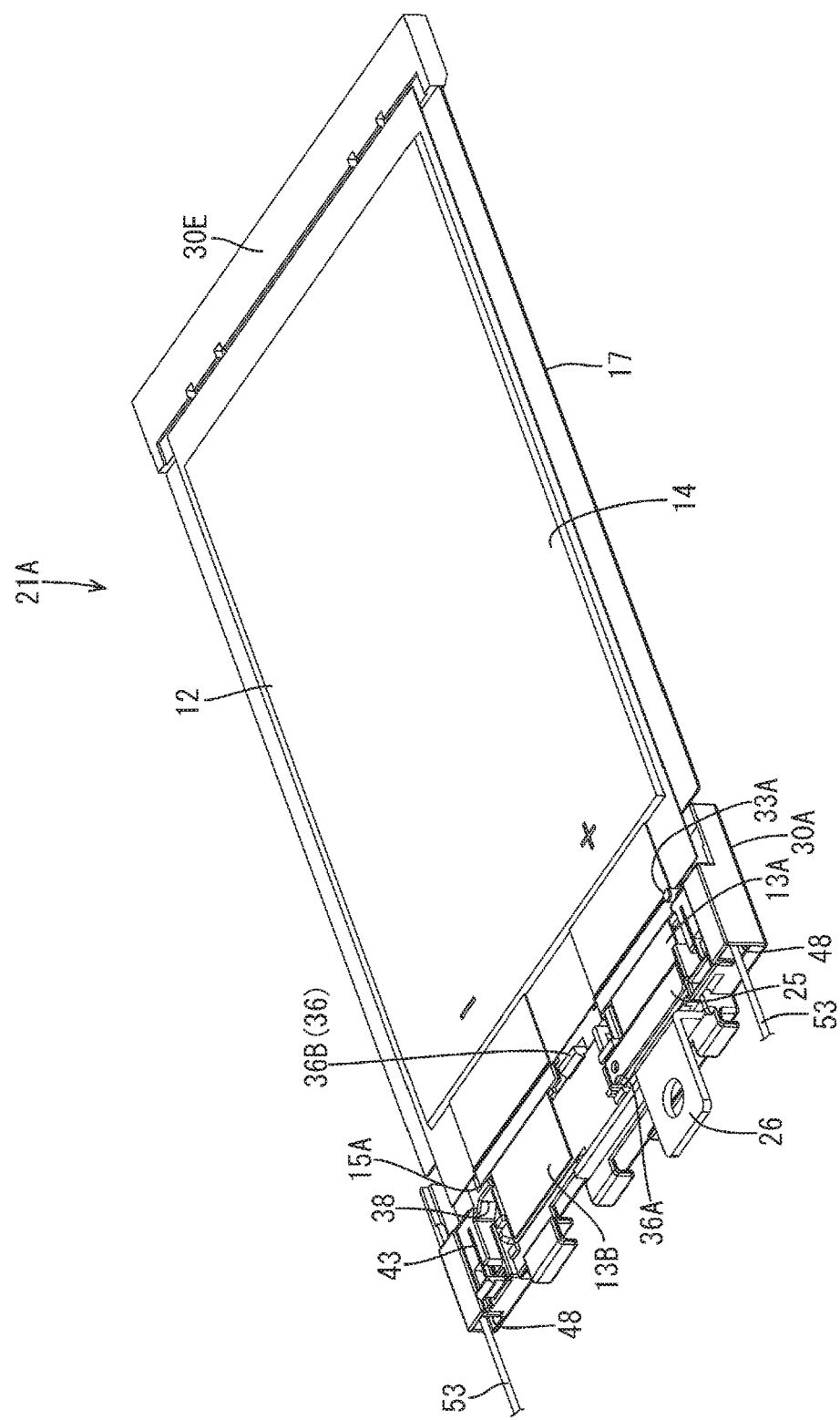
FIG. 4 is a perspective view illustrating a first electrical storage unit (electrical storage unit in the lowermost stage).
Figure 5:
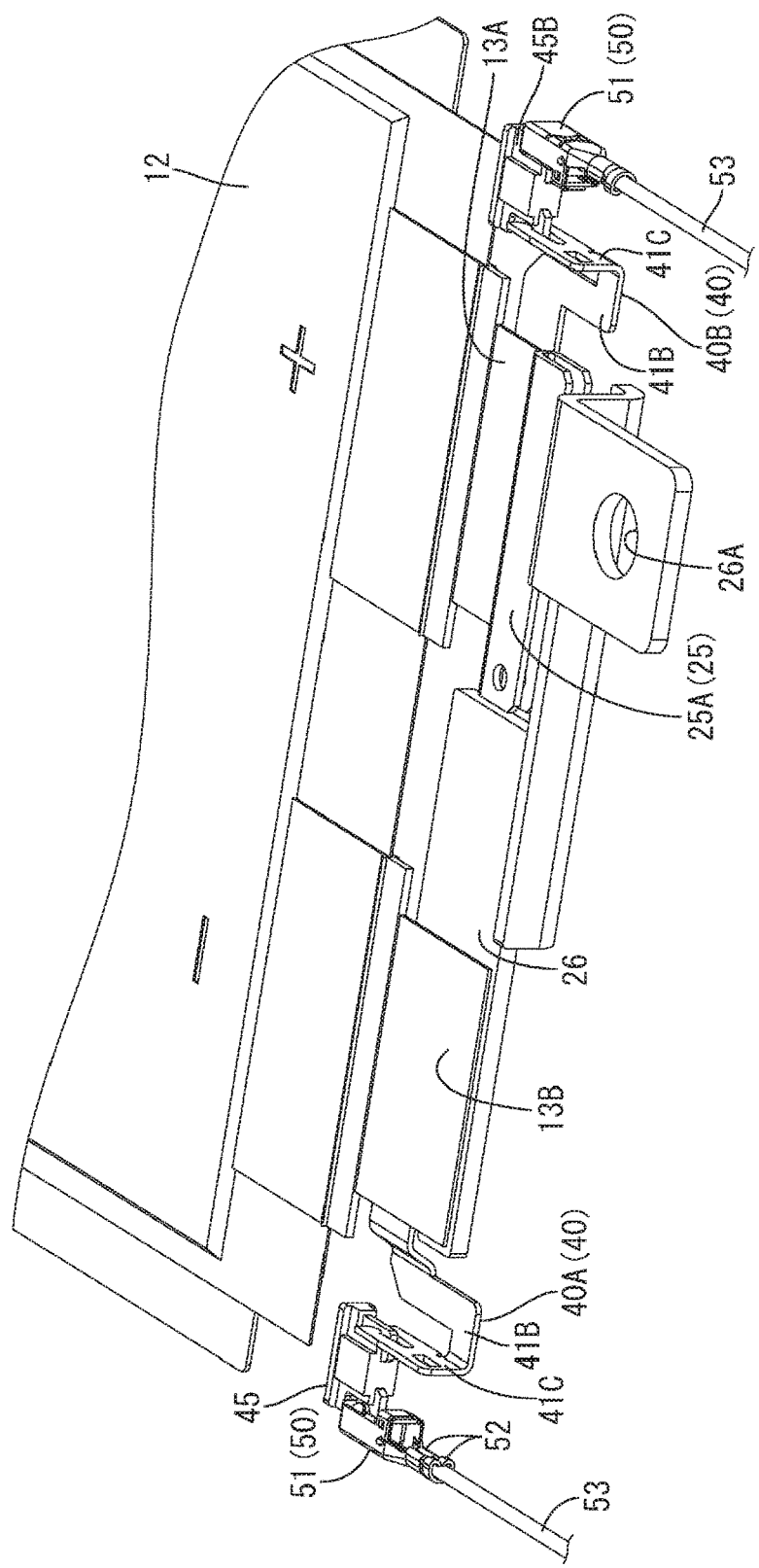
FIG. 5 is a partial perspective view of the first electrical storage unit (without a holding member).
Figure 6:
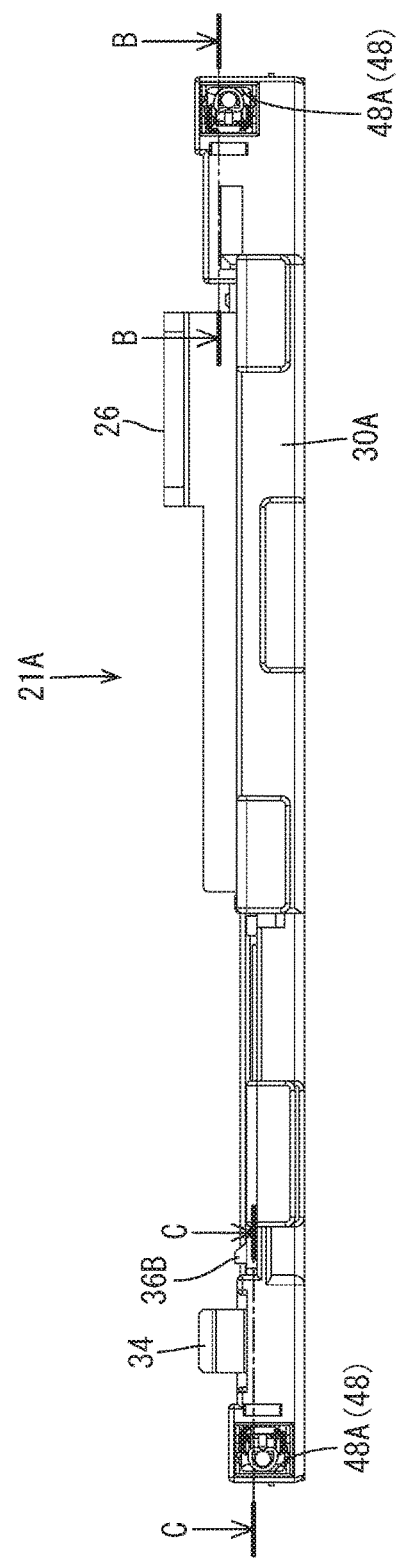
FIG. 6 is a front view of the first electrical storage unit.
Figure 7:
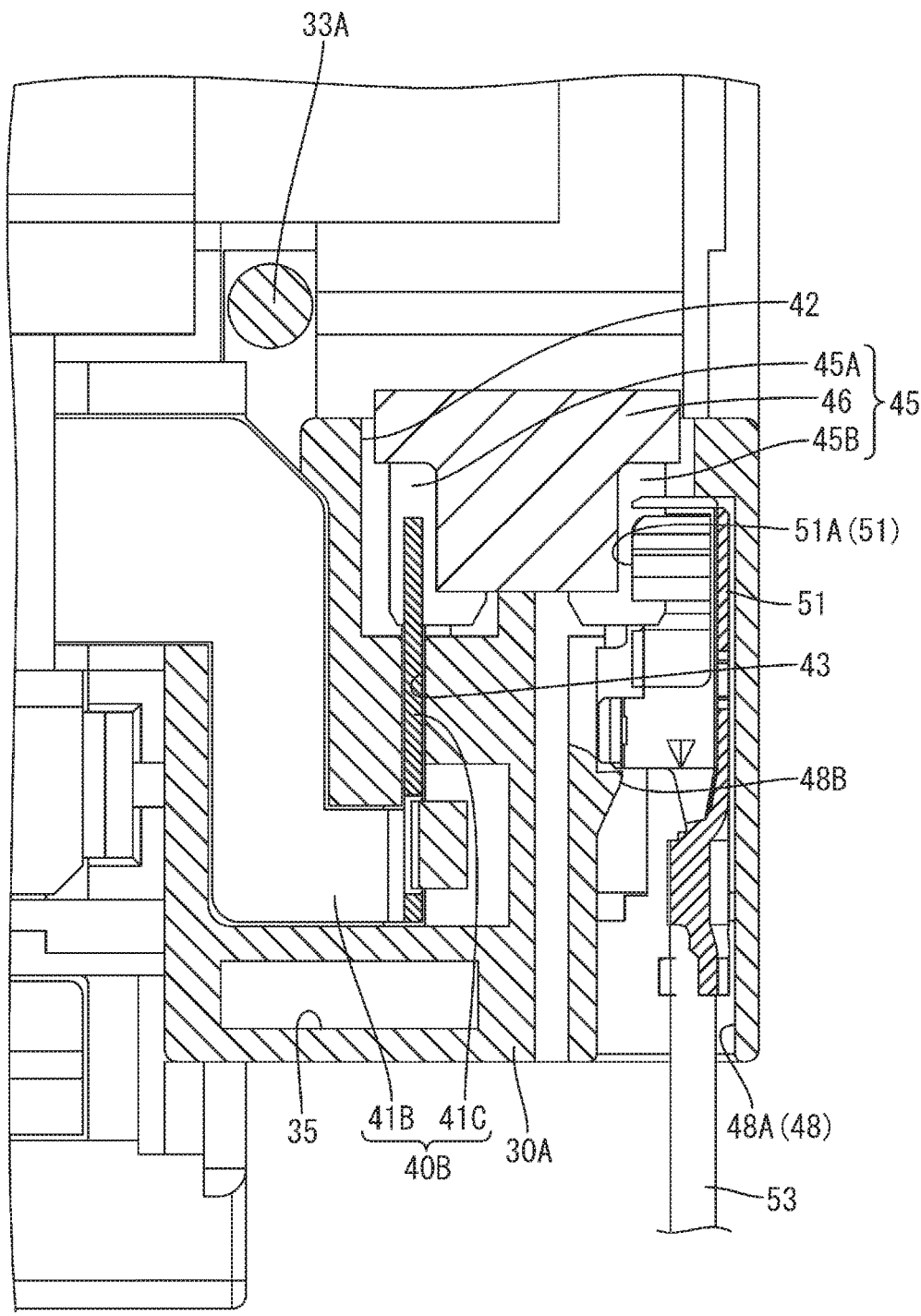
FIG. 7 is a cross-sectional view taken along a line B-B of FIG. 6.
Figure 8:
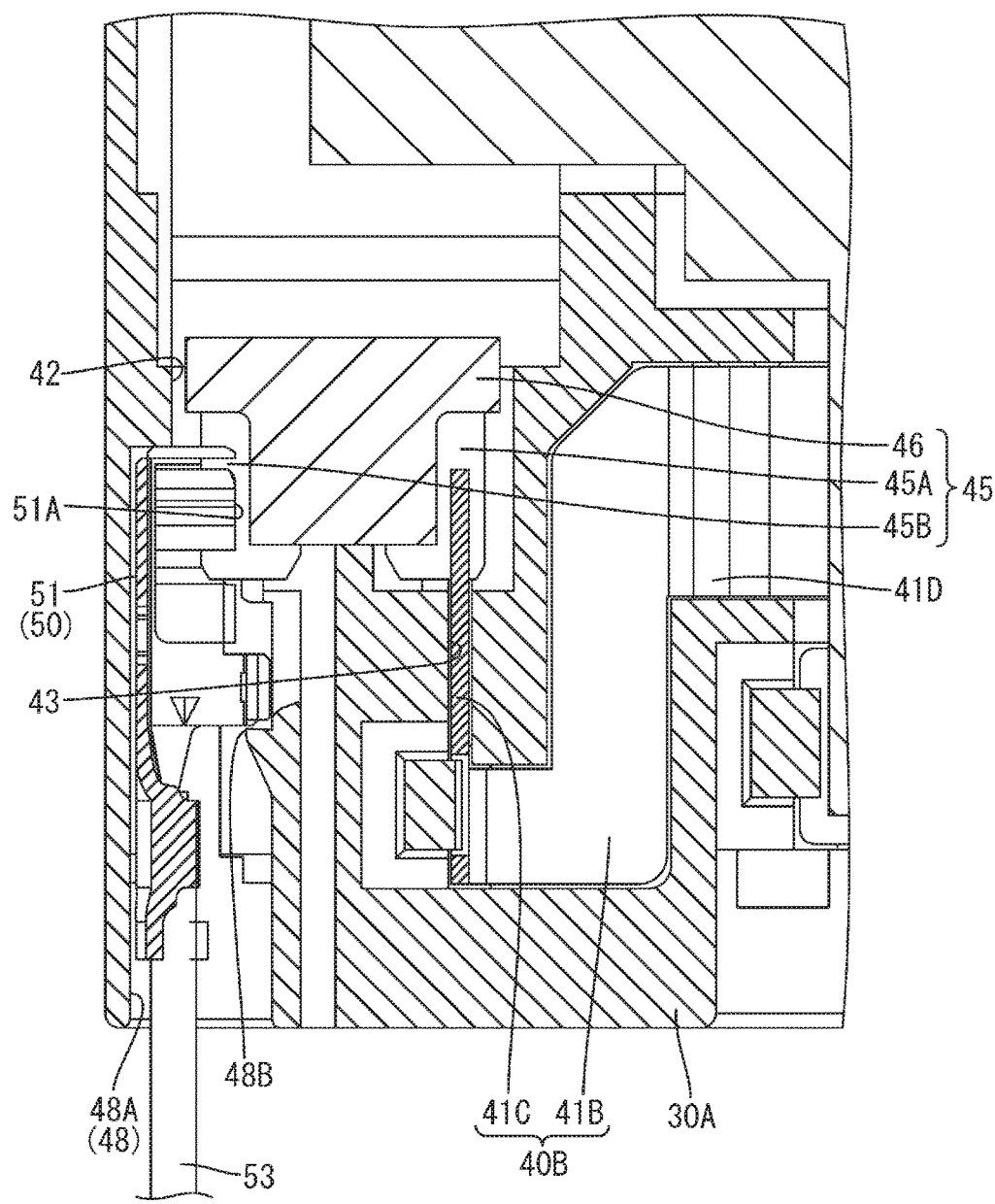
FIG. 8 is a cross-sectional view taken along a line C-C FIG. 6.
Figure 9:
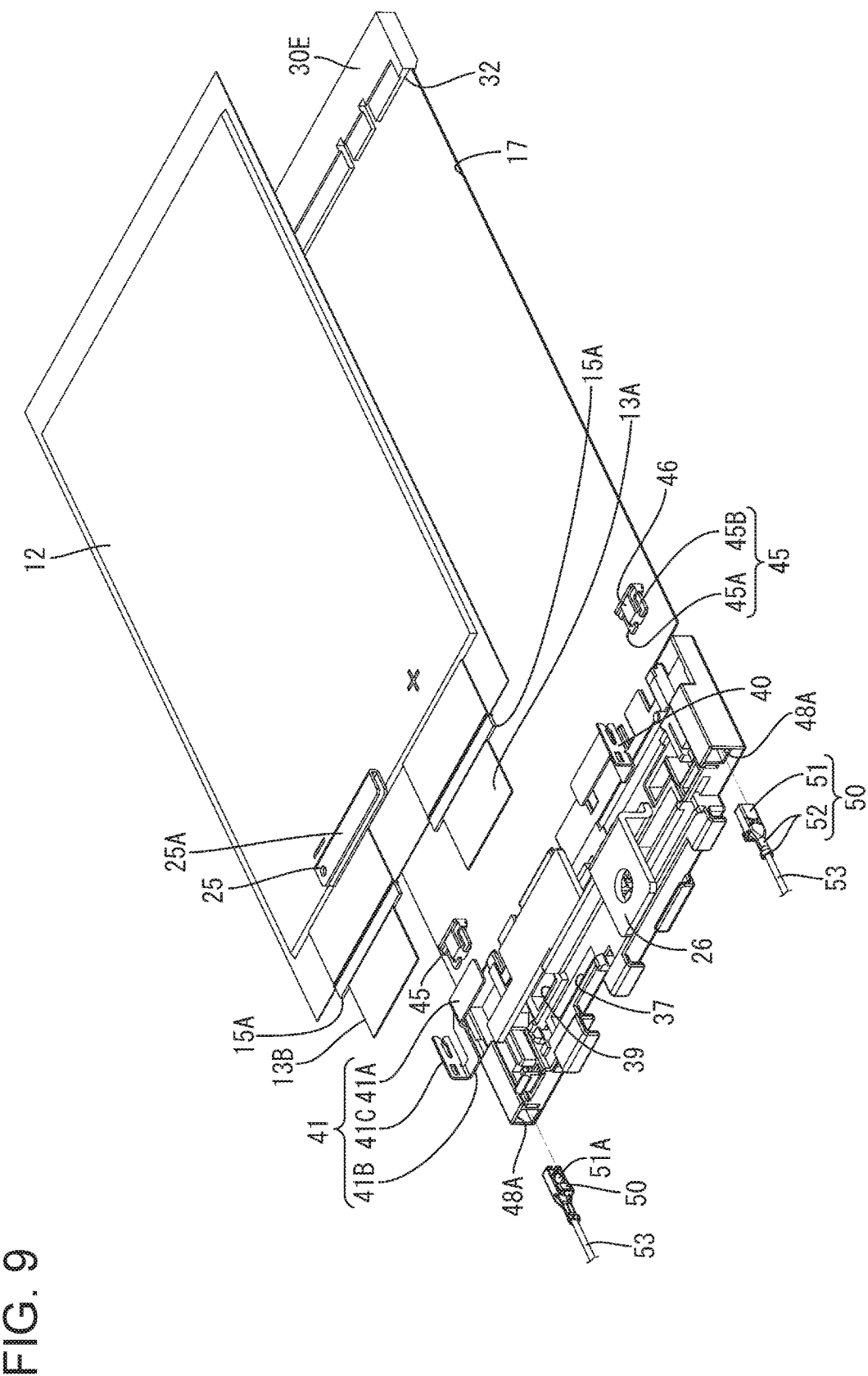
FIG. 9 is an exploded perspective view of the first electrical storage unit.

By this, at the first holding member 30A, the positive lead terminal 13A is joined to the busbar 25, and the negative lead terminal 13B is joined to the external connection busbar 26, and thereby the first electrical storage unit 21A shown in FIG. 4 is obtained. In the first electrical storage unit 21A, the external connection busbar 26 is arranged below the negative lead terminal 13B (see FIG. 5).

At the second holding member 30B, the positive lead terminal 13A is joined to the busbar 25, and thereby the second electrical storage unit 21B shown in FIG. 13 is obtained. At the third holding member 30C, the positive lead terminal 13A is joined to the busbar 25, and thereby the third electrical storage unit 21C shown in FIG. 20 is obtained.

At the fourth holding member 30D, the positive lead terminal 13A is joined to the external connection busbar 26, and thereby the fourth electrical storage unit 21D shown in FIG. 26 is obtained.

Then, the fuses 45 are inserted into and mounted to the fuse mounting parts 42, and the detection terminals 50 are inserted into and housed in the terminal housing parts 48. When each detection terminal 50 is inserted through the opening 48A of the terminal housing part 48, the detection terminal 50 is locked to and retained by a lance 48B, and the elastic contact piece 51A of the fuse connection part 51 of the detection terminal 50 elastically comes into contact with the connection part 45B of the fuse 45. Accordingly, the fuses 45 are electrically connected to the detection terminals 50 and the electrical storage elements 12.

Then, the stacked body 20 is obtained by stacking the four electrical storage units 21 on one another. The second electrical storage unit 21B is overlaid on the first electrical storage unit 21A, the engagement protrusion 34 of the first holding member 30A is engaged with the engagement-receiving part 35 of the second holding member 30B, and the positioning protrusion 33A of the first holding member 30A is fitted into the positioning hole 33B of the second holding member 30B. As a result, the negative lead terminal 13B of the electrical storage element 12 of the second electrical storage unit 21B is positioned with respect to the busbar 25 joined to the positive lead terminal 13A of the electrical storage element 12 of the first electrical storage unit 21A.

Figure 32:
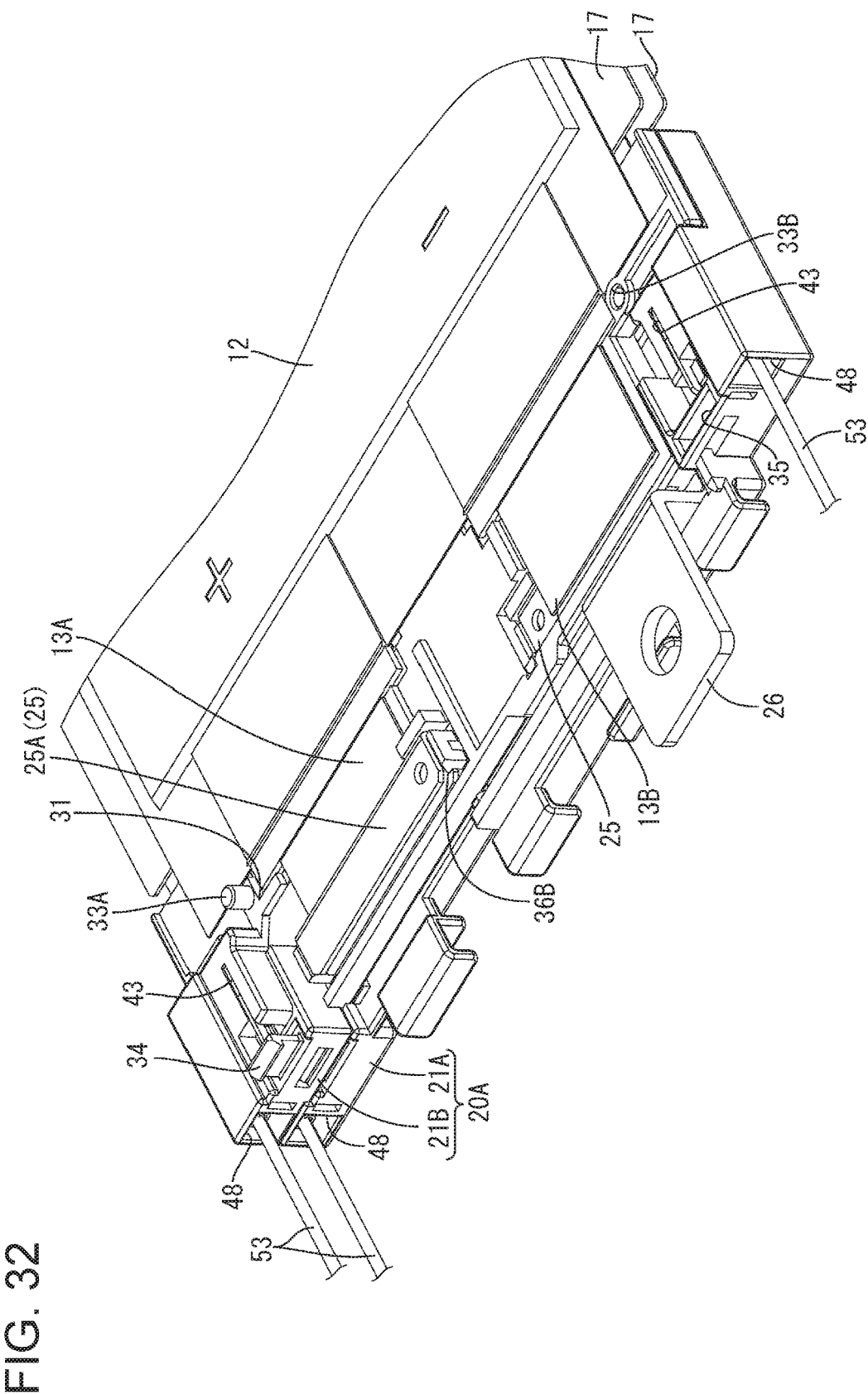
FIG. 32 is a perspective view illustrating a state in which the first electrical storage unit and the second electrical storage unit are stacked on each other.

The negative lead terminal 13B of the electrical storage element 12 of the second electrical storage unit 21B, and the connection part 25A arranged on the upper side of the busbar 25 that is joined to the positive lead terminal 13A of the electrical storage element 12 of the first electrical storage unit 21A are joined to each other by laser welding. As a result, a stacked body 20A in which the second electrical storage unit 21B is stacked on the first electrical storage unit 21A, as shown in FIG. 32, is obtained.

The third electrical storage unit 21C is further overlaid on the stacked body 20A, the engagement protrusion 34 of the third holding member 30C is engaged with the engagement-receiving part 35 of the first holding member 30A, and the positioning protrusion 33A of the second holding member 30B is fitted into the positioning hole 33B of the third holding member 30C. As a result, the negative lead terminal 13B of the electrical storage element 12 attached to the third electrical storage unit 21C is positioned with respect to the busbar 25 joined to the positive lead terminal 13A of the electrical storage element 12 of the second electrical storage unit 21B.

Figure 33:
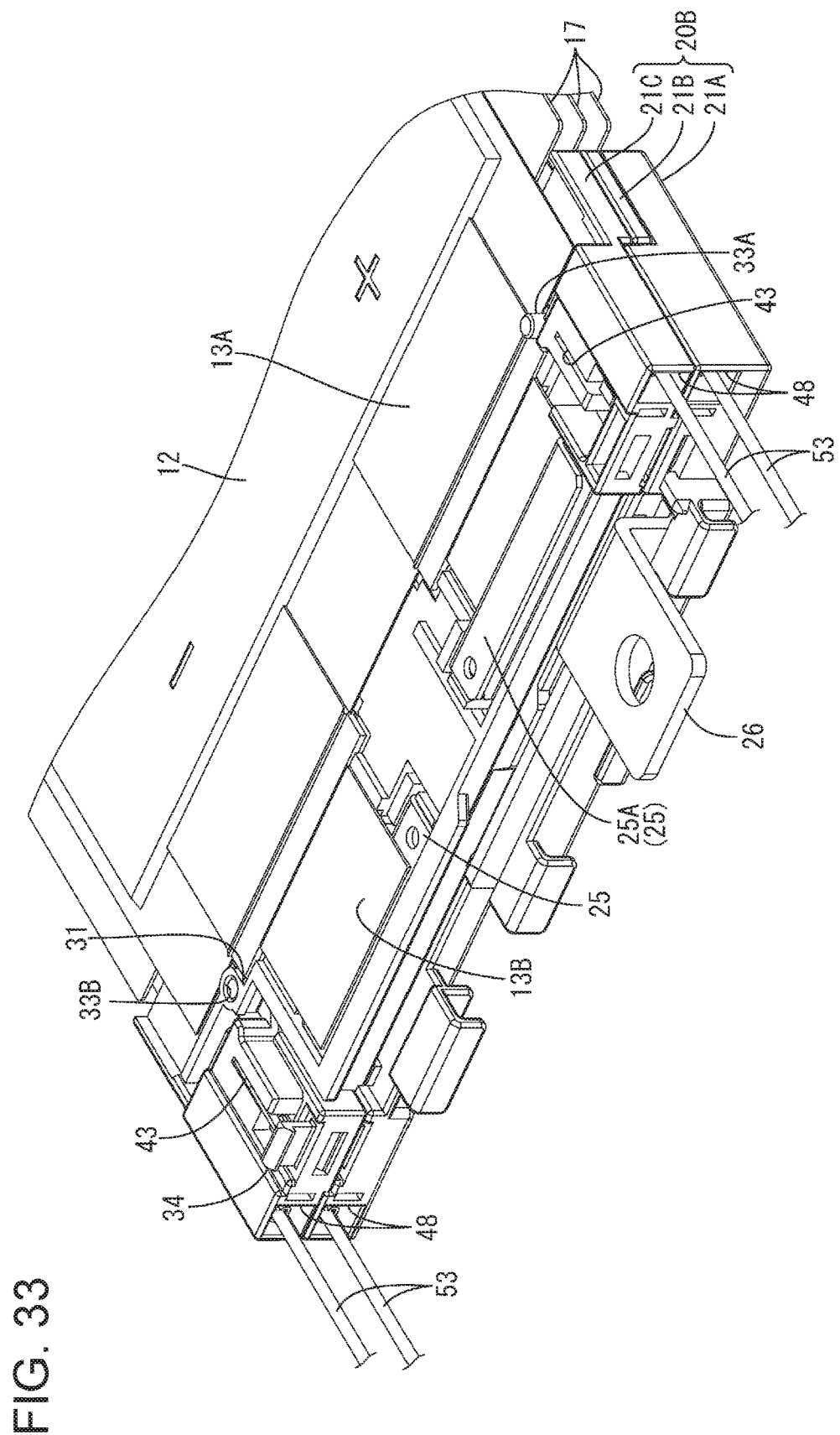
FIG. 33 is a perspective view illustrating a state in which the first electrical storage unit, the second electrical storage unit, and the third electrical storage unit are stacked on one another.
Figure 34:
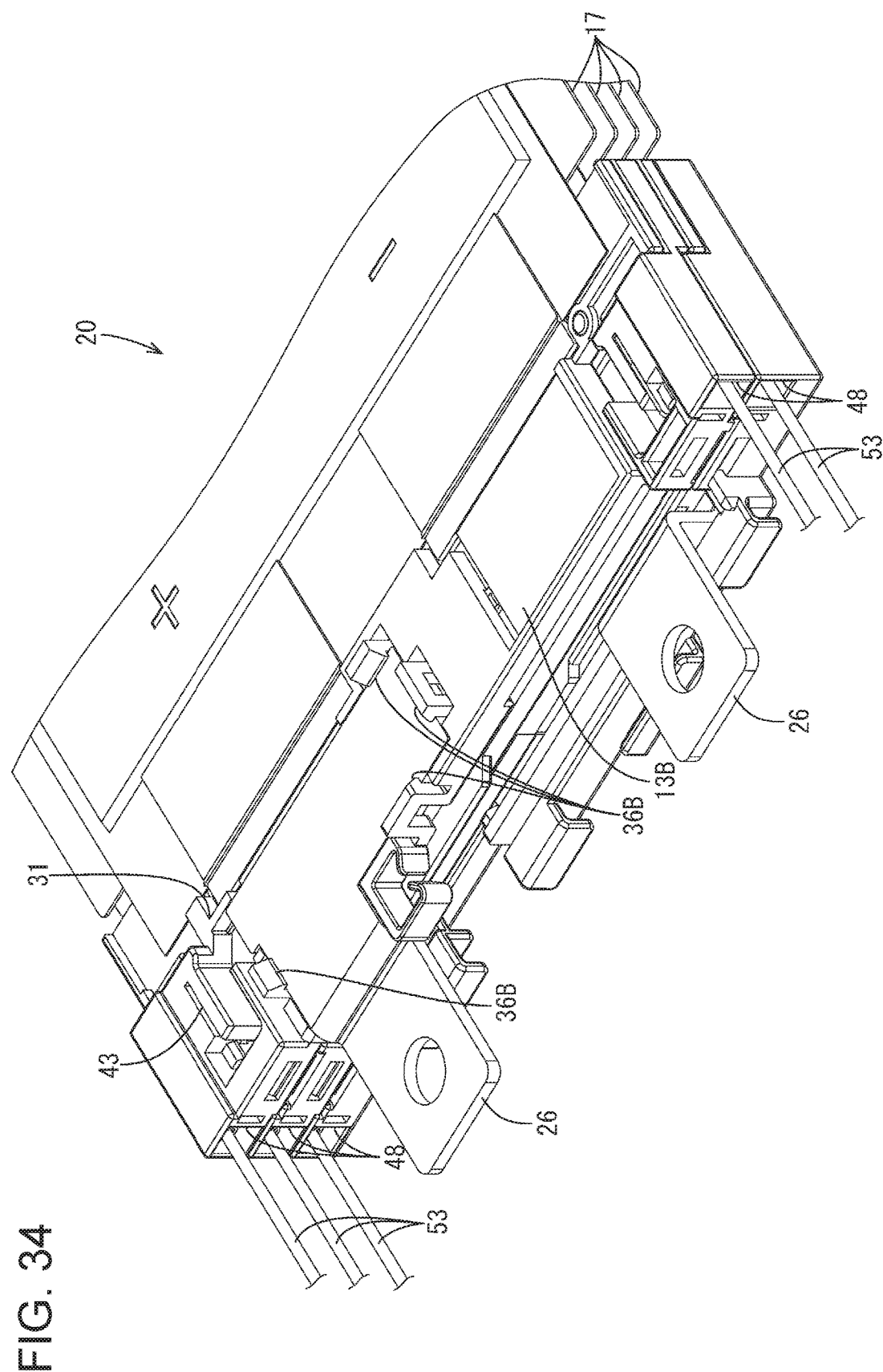
FIG. 34 is a perspective view illustrating a state in which four electrical storage units are stacked on one another.

The negative lead terminal 13B of the electrical storage element 12 of the third electrical storage unit 21C, and the connection part 25A arranged on the upper side of the busbar 25 that is joined to the positive lead terminal 13A of the electrical storage element 12 of the second electrical storage unit 21B are joined to each other by laser welding. As a result, as shown in FIG. 33, the third electrical storage unit 21C is stacked on the second electrical storage unit 21B, and a stacked body 20B is obtained. In the stacked body 20B, the first electrical storage unit 21A, the second electrical storage unit 21B, and the third electrical storage unit 21C are stacked in the stated order from the bottom.

The fourth electrical storage unit 21D is further overlaid on the stacked body 20B, the engagement protrusion 34 of the second holding member 30B is locked in the engagement-receiving part 35 of the fourth holding member 30D, and the positioning protrusion 33A of the third holding member 30C is fitted into the positioning hole 33B of the fourth holding member 30D. As a result, the negative lead terminal 13B of the electrical storage element 12 attached to the fourth electrical storage unit 21D is positioned with respect to the busbar 25 joined to the positive lead terminal 13A of the electrical storage element 12 of the third electrical storage unit 21C.

The negative lead terminal 13B of the electrical storage element 12 of the fourth electrical storage unit 21D, and the connection part 25A arranged on the upper side of the busbar 25 joined to the positive lead terminal 13A of the electrical storage element 12 of the third electrical storage unit 21C are joined to each other by laser welding. As a result, the fourth electrical storage unit 21D is stacked on the third electrical storage unit 21C, and the stacked body 20 shown in FIG. 33 is obtained. The electrical storage module 10 is obtained by placing the stacked body 20 in the case.

Functions and Effects of the Present Embodiment

The following will describe functions and effects of the present embodiment. In the present embodiment, the electrical storage module 10 is provided with the fuses 45 that are electrically connected to the lead terminals 13 of the electrical storage elements 12, and to which the detection terminals 50 are directly connected, and thus there is no need for fuse blocks for connecting the fuses 45 and the detection terminals 50 or members for connecting the fuses 45 and the detection terminals 50. Accordingly, it is possible to realize downsizing and to reduce the number of components as compared with that of a conventional case. As a result, according to the present embodiment, it is possible to downsize the electrical storage module 10 provided with the fuses 45.

Furthermore, in the present embodiment, the electrical storage module 10 includes the holding members 30 that have the fuse mounting parts 42 and the terminal housing parts 48, and hold the lead terminals 13 and the fuse connecting busbars 40. The fuses 45 are electrically connected to the detection terminals 50 and the electrical storage elements 12, by putting the electrical storage module into a state in which the fuses 45 are mounted on the fuse mounting parts 42, the detection terminals 50 are housed in the terminal housing parts 48, and the fuse connecting busbars 40 and the lead terminals 13 are connected to each other. In other words, according to the present embodiment, only by obtaining the state in which the fuses 45 are mounted on the fuse mounting parts 42 of the holding members 30, the detection terminals 50 are housed in the terminal housing parts 48 thereof, and the fuse connecting busbars 40 and the lead terminals 13 are connected to each other, it is possible to electrically connect the detection terminals 50 and the electrical storage elements 12 to the fuses 45, thus achieving a connection operation with excellent operability.

Embodiment 2

Embodiment 2 according to the technique disclosed in the present description will be described with reference to FIGS. 35 to 60. An electrical storage module 110 according to the present embodiment is mounted in a vehicle that is not shown and is used as an electric power supply. The electrical storage module 110 is provided with an electrical storage unit 112 and a circuit unit 113. In the following description, "right", "front", and "upper" respectively refer to the X-direction, the Y-direction, and the Z-direction. Furthermore, there may be cases where reference signs are given to only some of a plurality of the same members, and are not given to the remaining members.

Electrical Storage Unit 112

Figure 35:
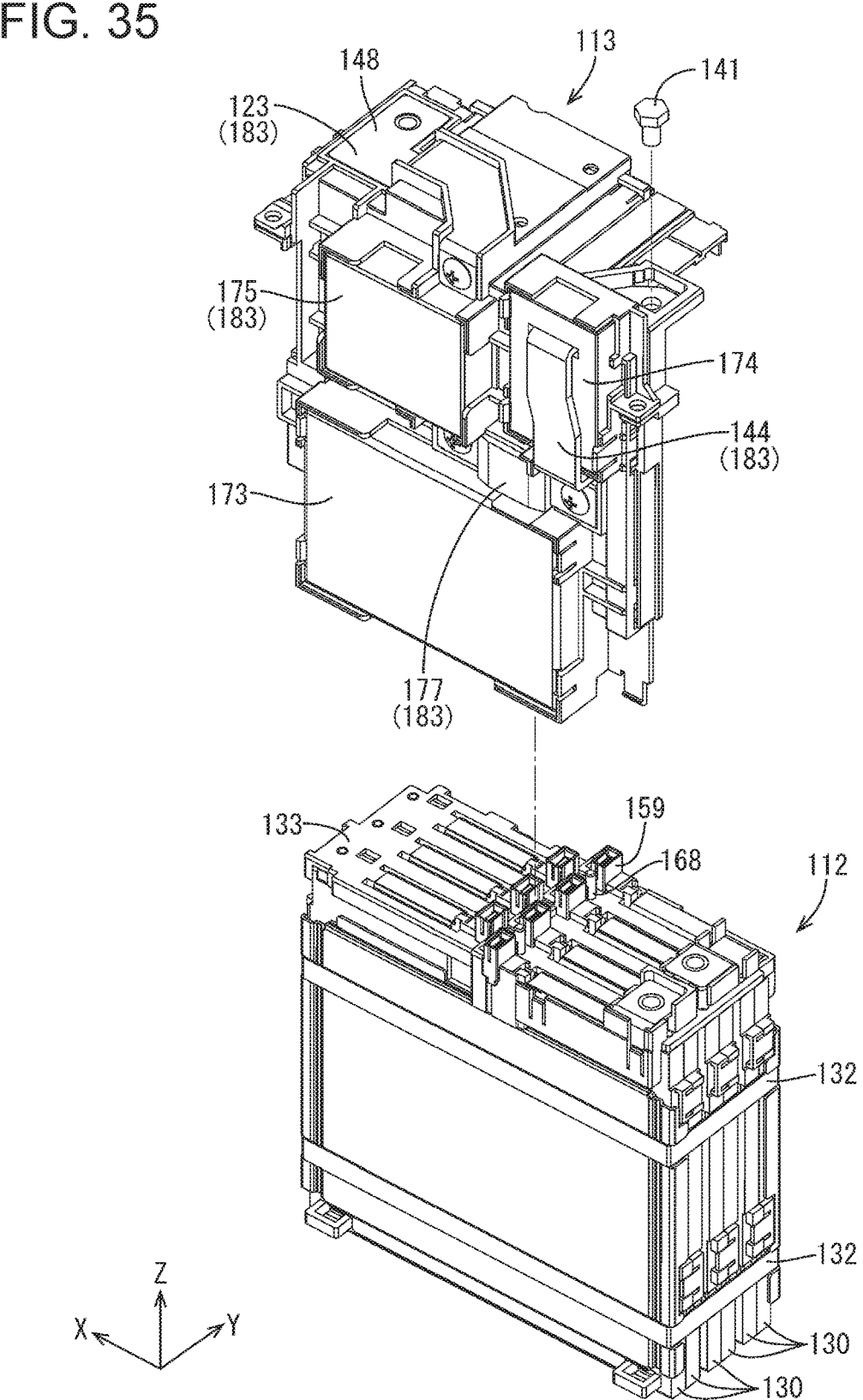
FIG. 35 is an exploded perspective view illustrating an electrical storage module according to Embodiment 2.

The electrical storage unit 112 as a whole has the shape of a substantially rectangular parallelepiped (see FIG. 35). The electrical storage unit 112 includes an electrical storage element group 128 in which a plurality of (six in the present embodiment) electrical storage elements 127 are lined up (see FIG. 38). Each electrical storage element 127 has an electrical storage component (not shown) that is interposed between a pair of rectangular laminate sheets. The pair of laminate sheets are joined to each other on their four sides in a state in which the electrical storage component is housed in the inner space therebetween. The sides of the pair of laminate sheet are joined to each other by a well-known method, such as thermal fusion bonding, glueing, or the like.

The upper edge of the electrical storage element 127 is provided with a pair of tabs (an example of the lead terminal) 129 that protrude upward. One of the tabs 129 is a positive electrode tab 129A, and the other one is a negative electrode tab 129B. The tabs 129 are made of metallic foil. Any metal such as aluminum, an aluminum alloy, copper, or a copper alloy can be used. for the metal constituting the tabs 129, as needed. The tabs 129 according to the present embodiment are made of copper or a copper alloy. The surfaces of the tabs 129 may each be provided with a plated layer made of metal such as tin or nickel.

Figure 36:
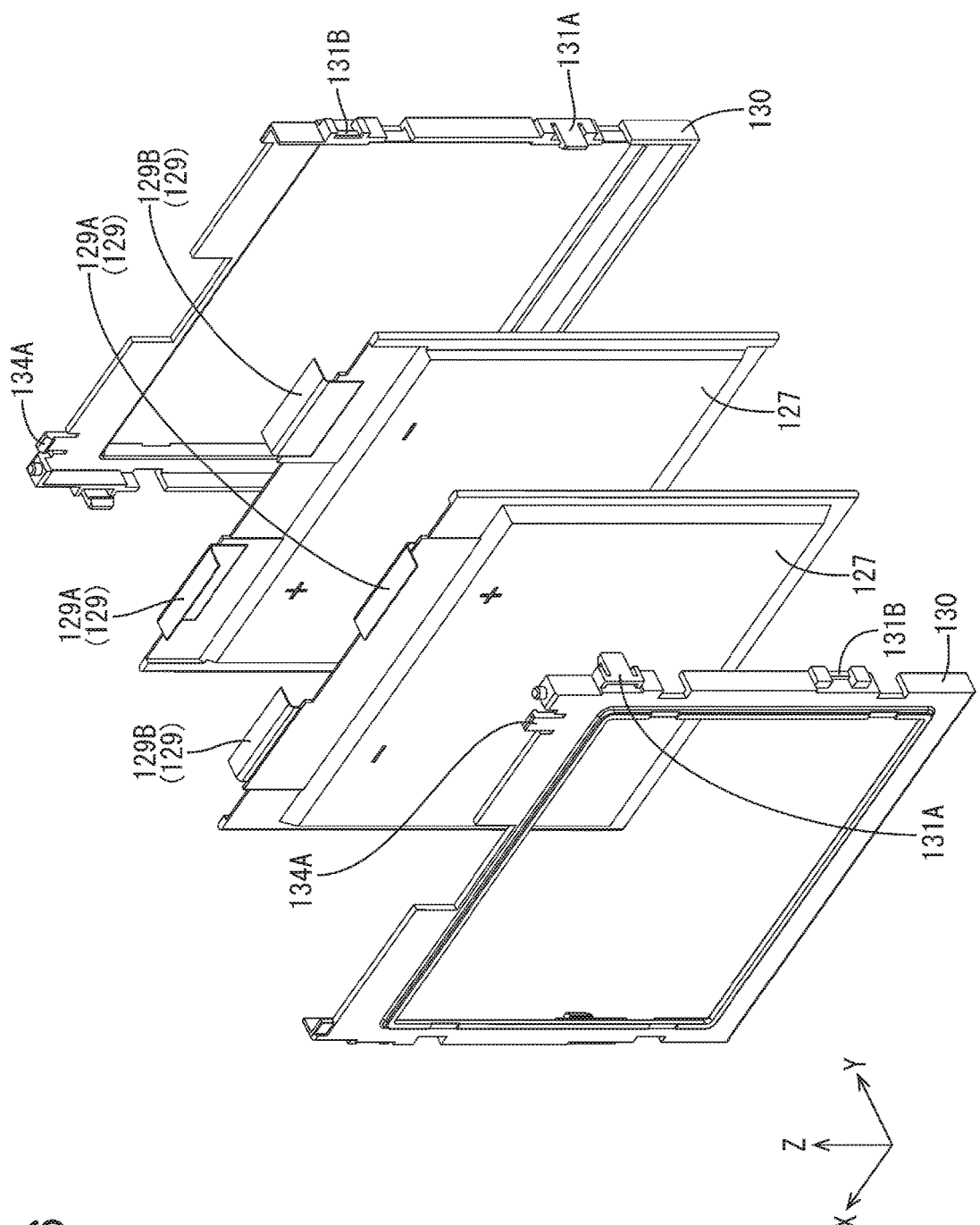
FIG. 36 is an exploded perspective view illustrating frame parts and electrical storage elements.
Figure 37:
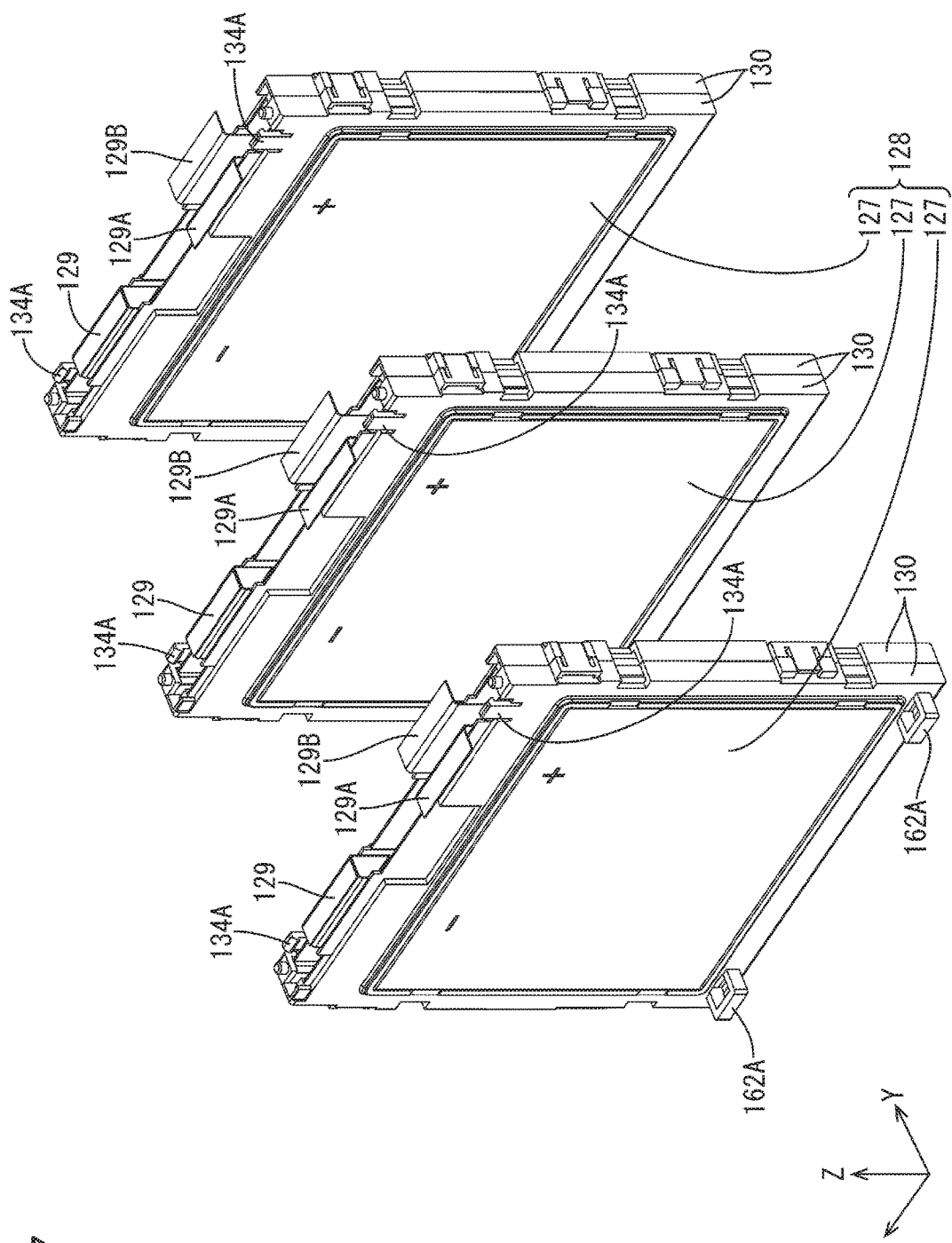
FIG. 37 is a perspective view illustrating the electrical storage elements sandwiched by the frame parts.
Figure 38:
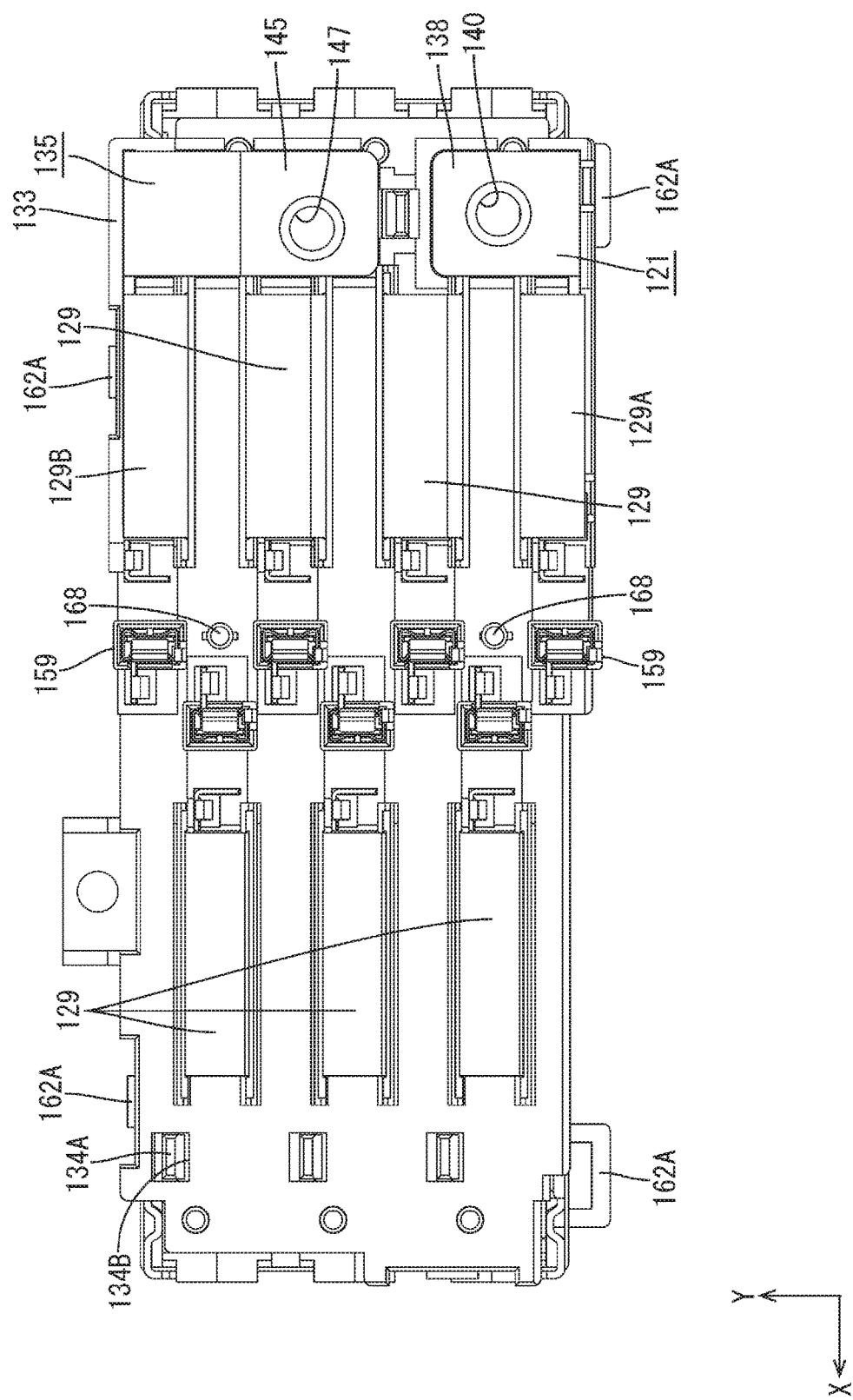
FIG. 38 is a plan view illustrating the electrical storage units.

Two electrical storage elements 127 are held by being sandwiched between a pair of frames 130 that are made of an insulating synthetic resin in a state in which adjacent tabs 129 have different polarities (see FIG. 36). The frames 130 have the shape of frames that have, in their central portions, a space in which the electrical storage element 127 is housed. The left side edges and the right side edges of the frames 130 are provided with lock parts 131A and lock receiving parts 131B, which are elastically engaged with each other. The pair of frames 130 are configured to be assembled as one piece by the lock parts 131A being elastically engaged with the lock receiving parts 131B.

Two tabs 129 located on the right side of the electrical storage elements 127 are bent at a right angle in the front-rear direction, and are thus connected to each other while overlapping each other. The tabs 129 are connected to each other by a well-known method such as laser welding, ultrasonic welding, resistance welding, soldering, or brazing.

Three pairs of electrical storage elements 127 that are put together by the frames 130 are lined up and are bundled by two binding members 132 that are arranged on the upper and lower sides. The binding members 132 are constituted by annular belts that are made of metal or synthetic resin. Three pair of electrical storage elements 127 are put together as one piece as a result of the binding members 132 being fitted externally (see FIG. 35).

The six electrical storage elements 127 are lined up so that adjacent tabs 129 have different polarities. Two tabs 129 located on the left side of the electrical storage elements 127 are connected to the tabs 129 of the other pairs of electrical storage elements 127 that are lined up so as to be adjacent frontward and rearward to those electrical storage elements 127. The tabs 129 are connected to each other by a well-known method such as laser welding, ultrasonic welding, resistance welding, soldering, or brazing.

An insulating protector 133 (an example of the holding member) that is made of an insulating synthetic resin is attached to the upper portion of the plurality of electrical storage elements 127 bundled by the binding members 132. The insulating protector 133 is a substantially rectangular-shaped plate when viewed from above (see FIG. 38).

By elastically engaging the lock parts 134A formed on the upper ends of the frames 130 with the lock receiving parts 134B formed at the positions on the insulating protector 133 that correspond to the lock parts 134A, the frames 130 and the insulating protector 133 are assembled.

Figure 39:
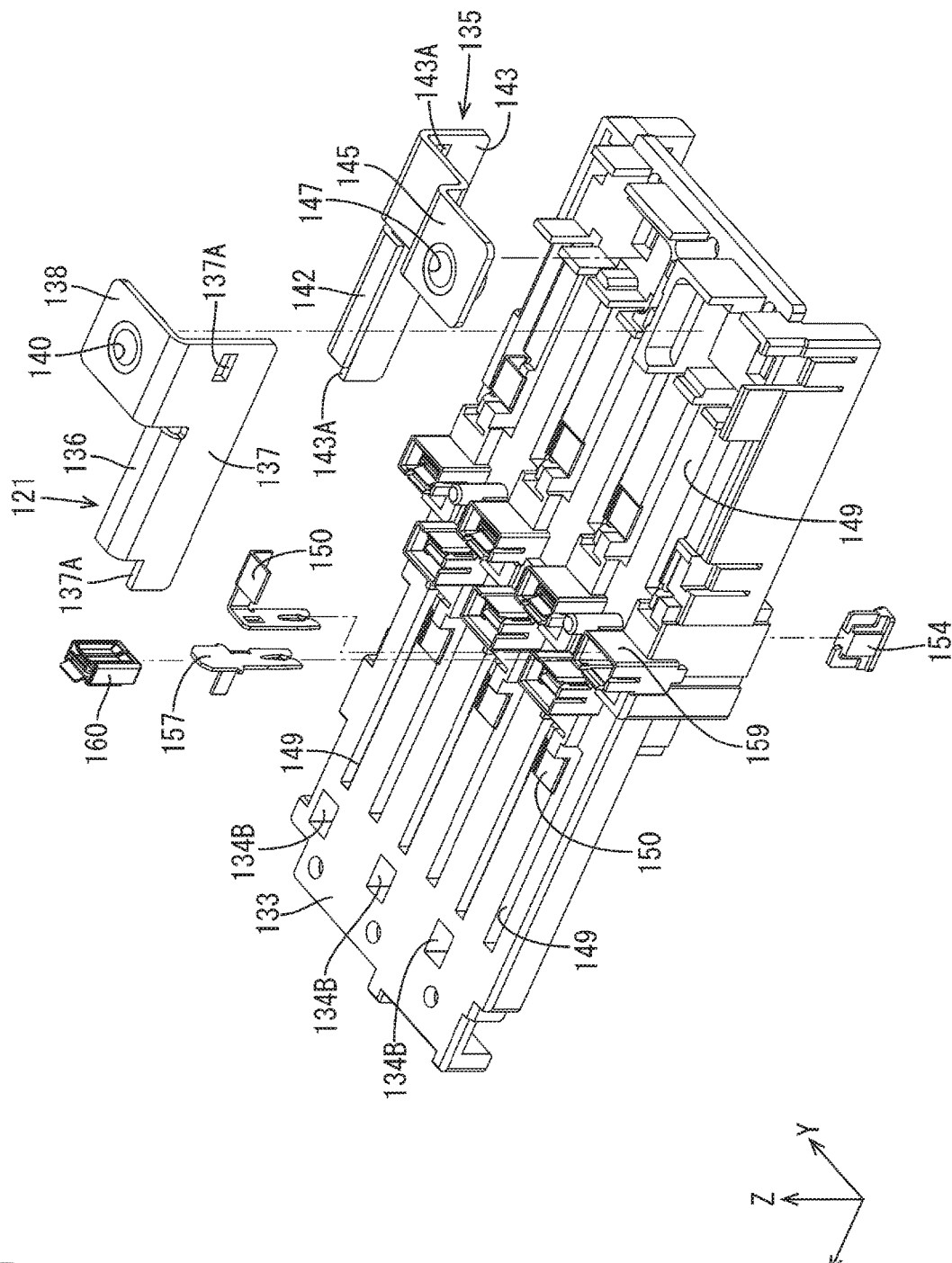
FIG. 39 is an exploded perspective view illustrating an insulating protector and the electric connection structure of the electrical storage units.
Figure 40:
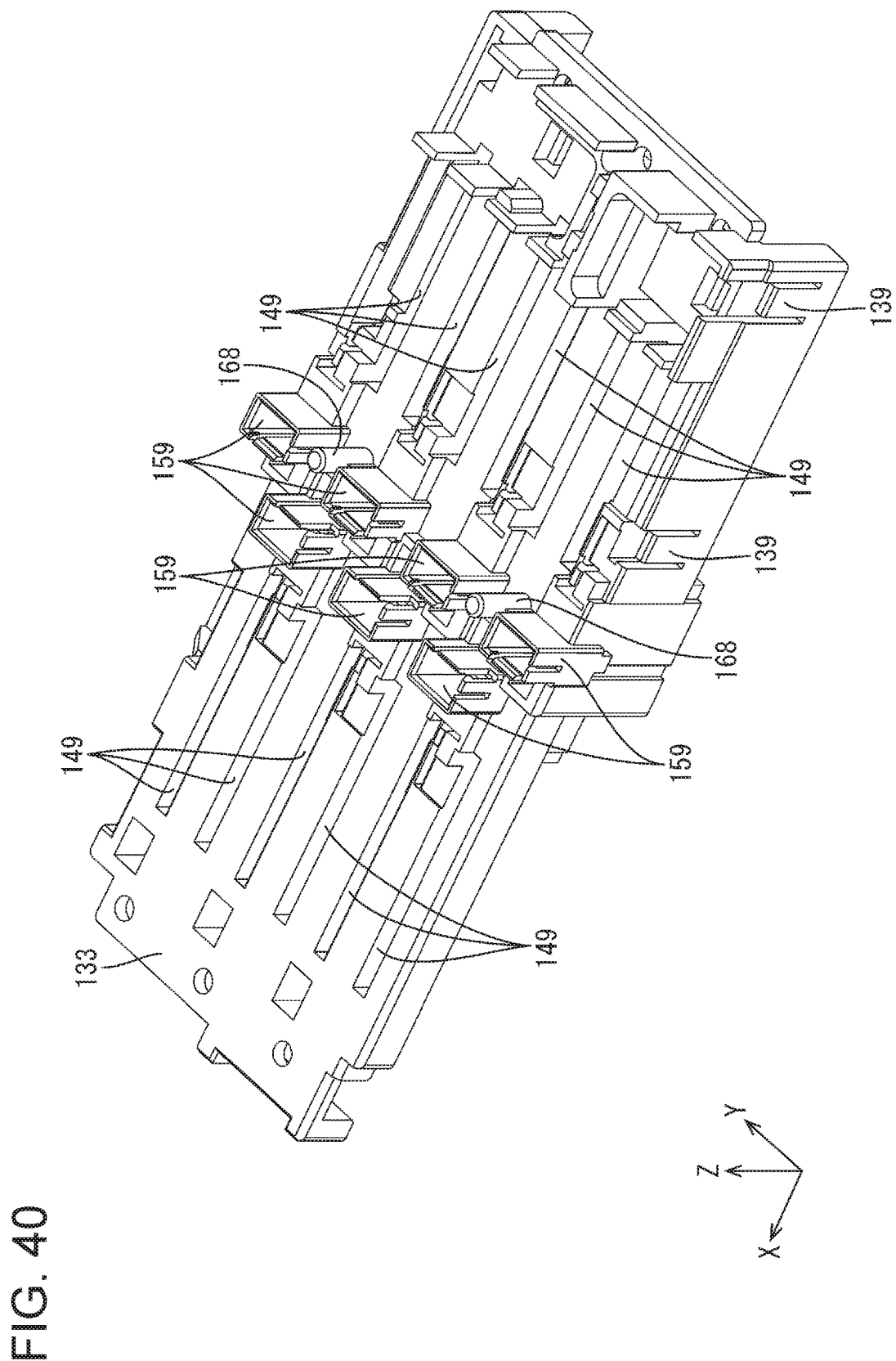
FIG. 40 is a perspective view illustrating the insulating protector.

The insulating protector 133 is provided with a positive electrode bulbar 121 that is connected to the positive electrode tab 129A of the electrical storage element 127, and a negative electrode busbar 135 that is connected to the negative electrode tab 129B of the electrical storage element 127 (see FIG. 39). The positive electrode bulbar 121 and the negative electrode busbar 135 are obtained by pressing metal plate materials into predetermined shapes. Any metal such as copper, a copper alloy, aluminum, or an aluminum alloy can be selected for the metal constituting the positive electrode busbar 121 and the negative electrode busbar 135, as needed. In the present embodiment, the positive electrode busbar 121 and the negative electrode busbar 135 are made of copper or a copper alloy. The surfaces of the positive electrode busbar 121 and the negative electrode busbar 135 may each be provided with a plated layer made of metal such as tin or nickel.

The positive electrode busbar 121 is provided with: a positive electrode tab connection part 136 that is connected to the positive electrode tab 129A of the electrical storage element 127, and extends in the left-right direction; a held part 137 that extends downward from the positive electrode tab connection part 136, and is held by the insulating protector 133; and a positive electrode terminal connection part 138 that is provided at a position close to the left end of the held part 137, is bent frontward, and is connected to a first high-current busbar 144.

The positive electrode tab 129A and the positive electrode tab connection part 136 are connected to each other by a well-known method such as laser welding, ultrasonic welding, soldering, or brazing. In the present embodiment, they are connected to each other by laser welding.

The held part 137 has a lock receiving part 137A. The positive electrode busbar 121 is held by the insulating protector 133 as a result of a lock claw 139 of the insulating protector 133 being elastically engaged with the lock receiving part 137A.

The positive electrode terminal connection part 138 is provided with a bolt through hole 140 that passes therethrough in the vertical direction. By screwing a bolt 141 into this bolt through hole 140, the positive electrode busbar 121 and the first high-current busbar 144 are electrically connected to each other.

The negative electrode busbar 135 is provided with: a negative electrode tab connection part 142 that is connected to the negative electrode tab 129B of the electrical storage element 127, and extends in the left-right direction; a held part 143 that extends downward from the negative electrode tab connection part 142, and is held by the insulating protector 133; and an external negative electrode terminal 145 that is bent at a right angle rearward from the outer end, in the left-right direction, of the held part 143.

The negative electrode tab 129B and the negative electrode tab connection part 142 are connected to each other by a well-known method such as laser welding, ultrasonic welding, soldering, or brazing. In the present embodiment, they are connected to each other by laser welding.

The held part 143 has a lock receiving part 143A. The negative electrode busbar 135 is held by the insulating protector 133 as a result of a lock claw 146 of the insulating protector 133 being elastically engaged with the lock receiving part 143A.

The external negative electrode terminal 145 is bent upward in the shape of a crank when viewed in the left-right direction. The end, in the front-rear direction, of the external negative electrode terminal 145 is provided with a bolt through hole 147 that passes therethrough in the vertical direction.

The upper surface of the insulating protector 133 is provided with a plurality of openings 149 that pass therethrough in the vertical direction. The tabs 129 are inserted through the openings 149 from below. In the present embodiment, the upper surface of the insulating protector 133 is provided with two lines in which openings 149 are lined up at a distance in the front-rear direction are formed in the left-right direction. The positive electrode tabs 129A and the negative electrode tabs 129B of the electrical storage elements 127 are overlapped and welded to each other in the state of being passed through the openings 149.

A fuse connecting busbar 150 is provided at a position in each opening 149 that is close to the central portion thereof in the left-right direction. The fuse connecting busbars 150 are obtained by pressing metal plate members into a predetermined shape. Any metal such as copper, a copper alloy, aluminum, or an aluminum alloy can be selected for the metal constituting the fuse connecting busbars 150, as needed. The surfaces of the fuse connecting busbars 150 may each be provided with a plated layer made of metal such as tin or nickel.

Each fuse connecting busbar 150 is provided with: a tab connection part 151 that is connected to a positive electrode tab 129A or a negative electrode tab 129B that is arranged in the opening 149; an extended part 152 that extends downward from the tab connection part 151 and extends in the left-right direction; and a fuse terminal connection part 153 that extends downward from the extended part 152. The lower end of the fuse terminal connection part 153 is fork-shaped and is divided into two portions, which are configured to sandwich and hold a fuse terminal 155A of a low-current fuse 154 (an example of the fuse) that will be described later.

Figure 42:
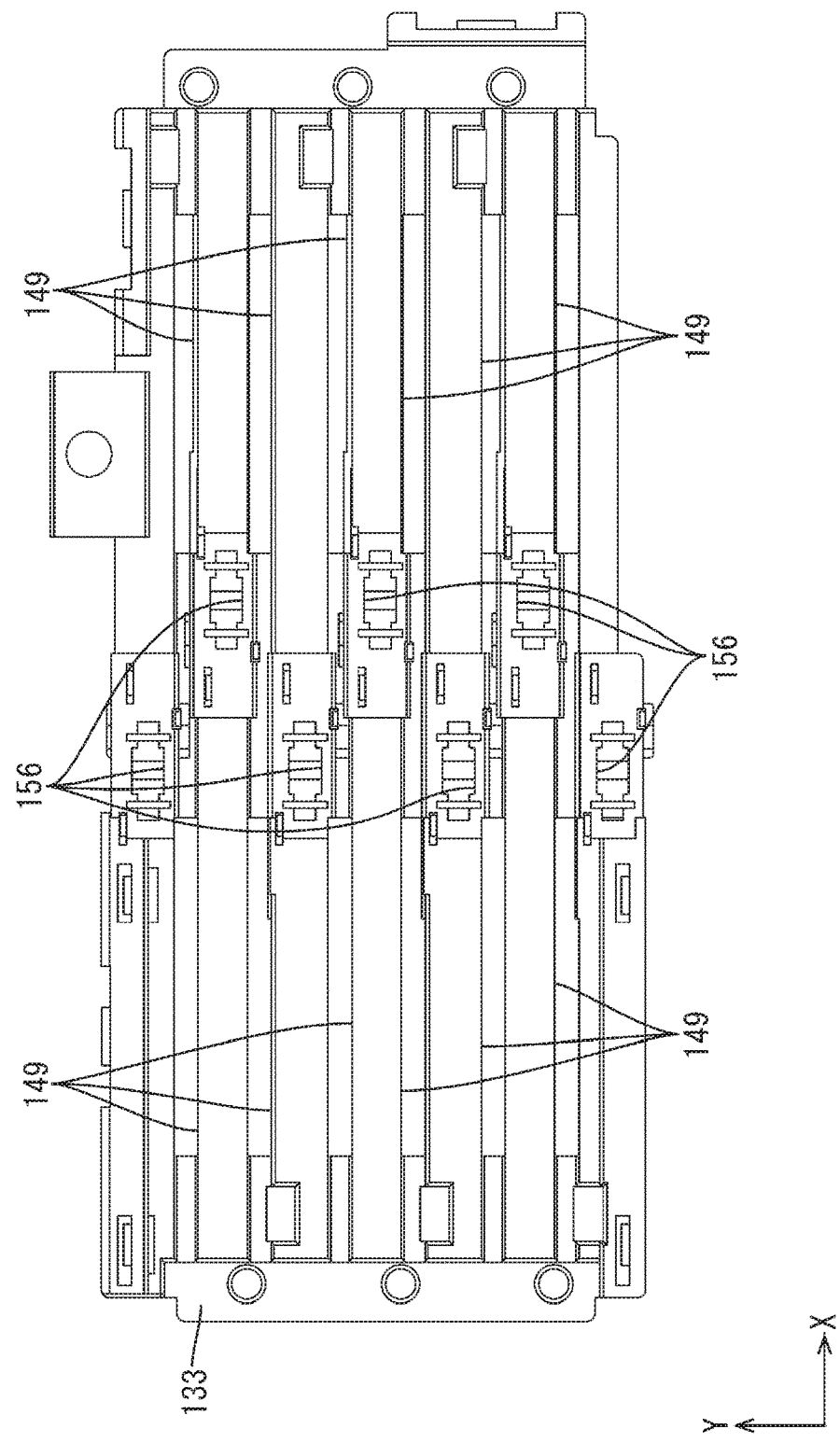
FIG. 42 is a bottom view illustrating the insulating protector.
Figure 43:
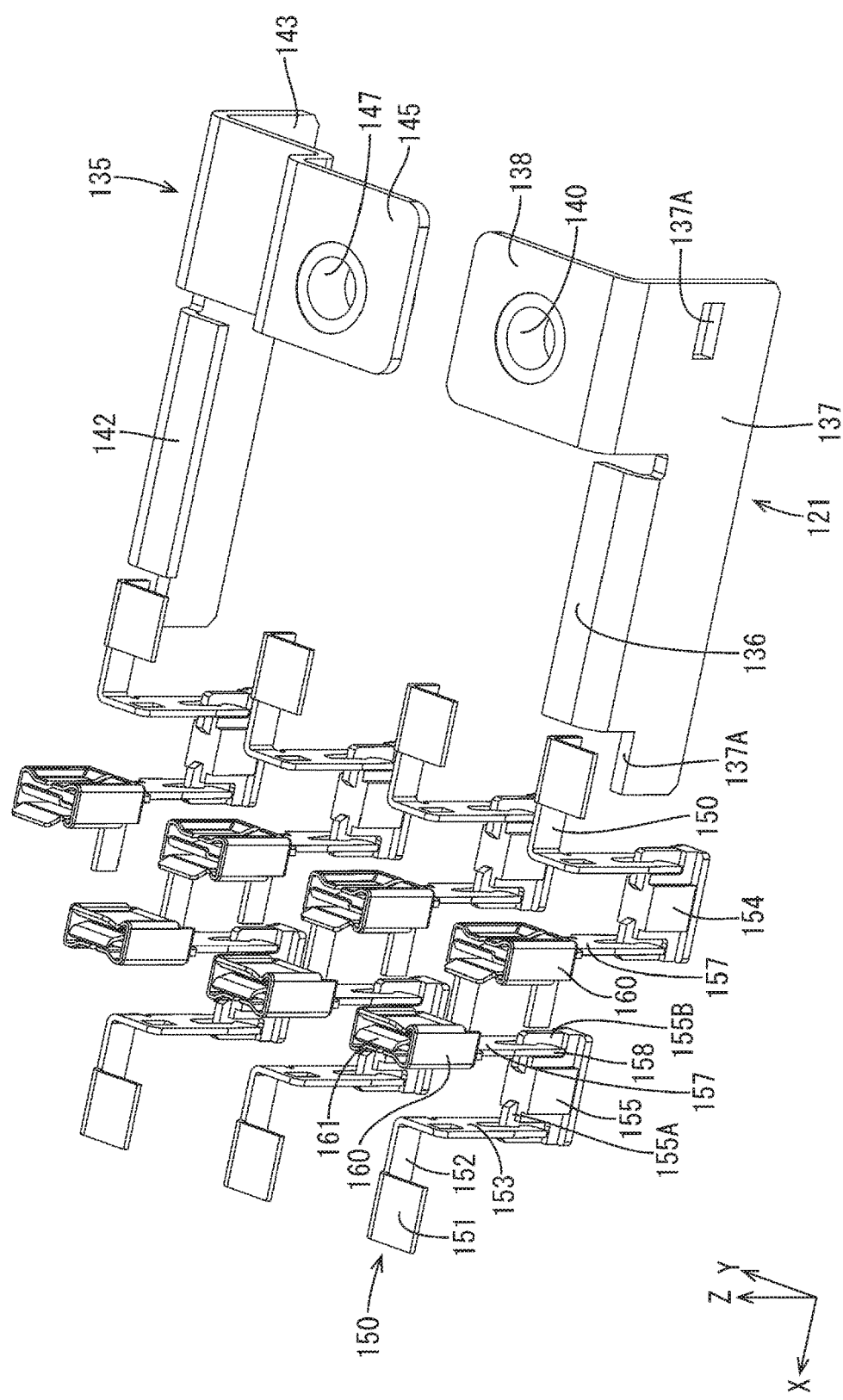
FIG. 43 is a perspective view illustrating the electric connection structure of the electrical storage units.

The insulating protector 133 is provided with fuse mounting parts 156 to which the low-current fuses 154 are mounted and that are open downward (see FIG. 42). The above-described fuse terminal connection parts 153 of the fuse connecting busbars 150 protrude into the fuse mounting parts 156 from above (see FIG. 59).

The low-current fuses 154 are mounted on the fuse mounting parts 156 from below. Each low-current fuse 154 has fuse terminals 155A and 155B on both ends in the left-right direction.

Also fuse terminal connection parts 158 of voltage detection terminals (an example of the detection terminal) 157 protrude into the fuse mounting part 156 from above. Also the lower end of the fuse terminal connection part 158 of each voltage detection terminals 157 is fork-shaped and is divided into two portions, which are configured to sandwich and hold the fuse terminal 155B of the low-current fuse 154.

The voltage detection terminals 157 are obtained by pressing metal plate members into a predetermined shape. Any metal such as copper, a copper alloy, aluminum, or an aluminum alloy can be selected for the metal constituting the voltage detection terminals 157, as needed. The surfaces of the voltage detection terminals 157 may each be provided with a plated layer made of metal such as tin or nickel.

The voltage detection terminals 157 are formed so as to extend in the vertical direction. As described above, the lower ends of the voltage detection terminals 157 serve as the fuse terminal connection parts 158. On the other hand, the upper ends of the voltage detection terminals 157 are tab-shaped.

Figure 41:
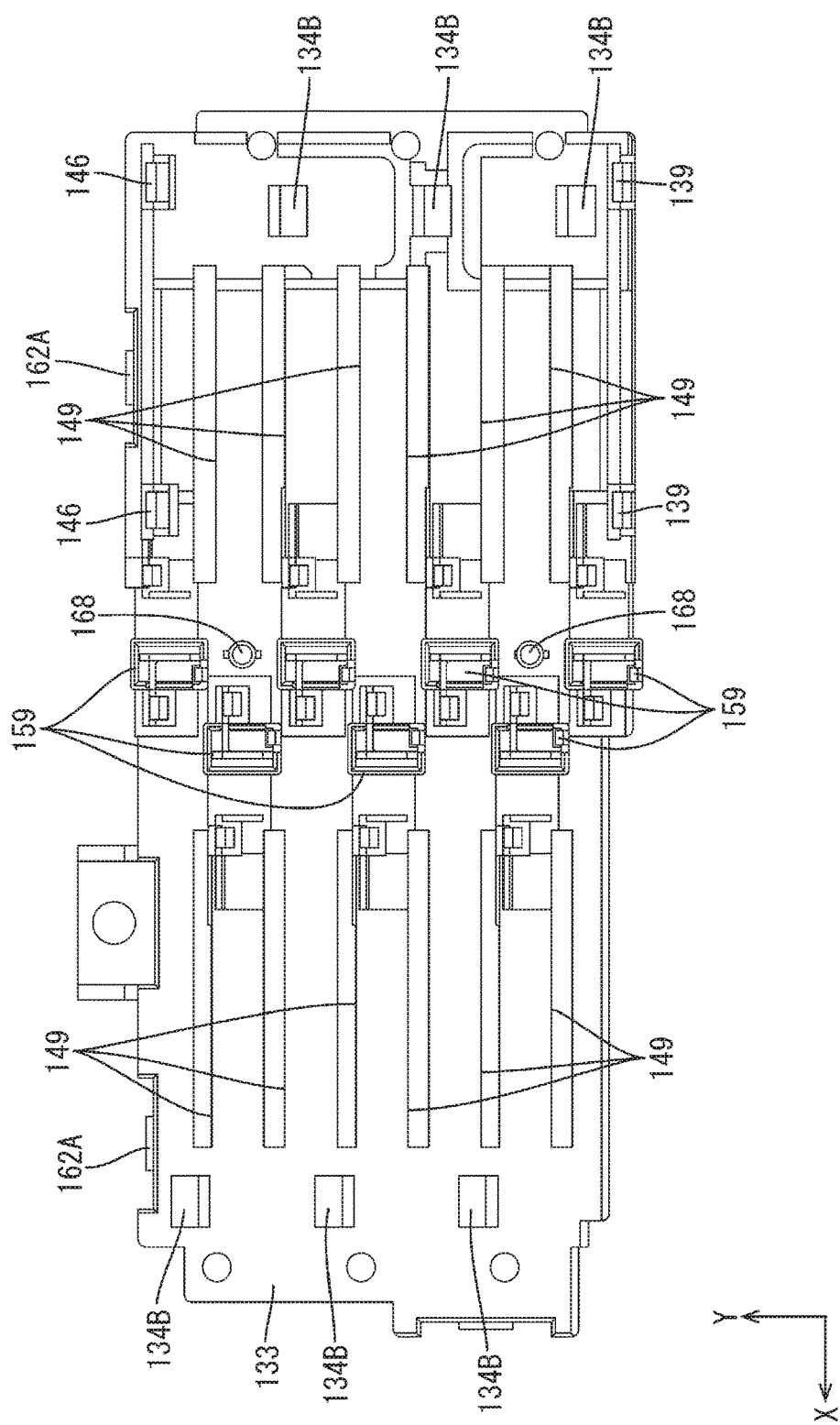
FIG. 41 is a plan view illustrating the insulating protector.

The upper surface of the insulating protector 133 is provided with, in the central portion in the left-right direction, a plurality of (seven in the present embodiment) standby connectors 159 (an example of the terminal housing part) that are open upward (see FIG. 41). The standby connectors 159 are formed while being lined up in the zigzag shape in the front-rear direction. In other words, a line in which three standby connectors 159 are lined up in the front-rear direction, and a line in which four standby connectors 159 are lined up in the front-rear direction are arranged at a distance in the left-right direction, and the standby connectors 159 in the respective lines are arranged at positions that are shifted from each other in the left-right direction.

The upper ends of the voltage detection terminals 157 are arranged so as to protrude upward into the standby connectors 159. Relay terminals 160 are fitted to the upper ends of the voltage detection terminals 157 from above (see FIG. 43).

The relay terminals 160 are obtained by pressing metal plate materials into a predetermined shape and then bending the pressed metal plate materials. Any metal such as copper, a copper alloy, aluminum, or an aluminum alloy can be selected for the metal constituting the relay terminals 160, as needed. A plated layer made of metal such as tin or nickel may be formed on the surface of the relay terminals 160.

The relay terminals 160 substantially have the shape of a box that opens in the vertical direction. An elastic piece 161 is arranged in each relay terminal 160. By bringing the elastic pieces 161 into elastic contact with the upper ends of the voltage detection terminals 157, the relay terminals 160 and the voltage detection terminals 157 are electrically connected to each other.

Circuit Unit 113

Figure 54:
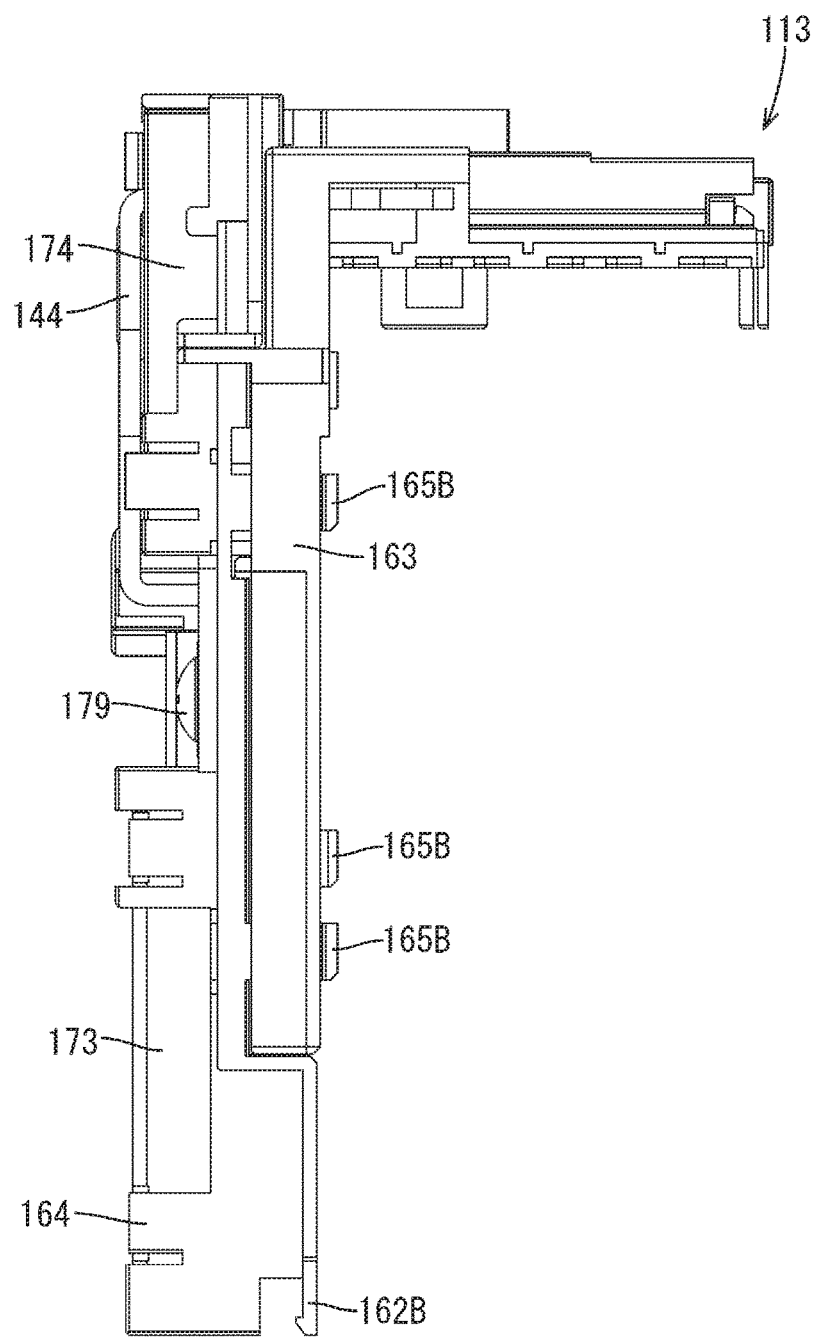
FIG. 54 is a side view illustrating the circuit unit.

The circuit unit 113 as a whole is substantially L-shaped when viewed in the left-right direction (see FIG. 54). The circuit unit 113 is attached to the upper surface of the electrical storage unit 112 and to a side surface that is contiguous downward from an edge of the upper surface. The circuit unit 113 is provided with: high-current components 183 through which relatively high current flows; and low-current components 184 through which a current lower than the current flowing through the high-current components 183 flows.

Figure 57:
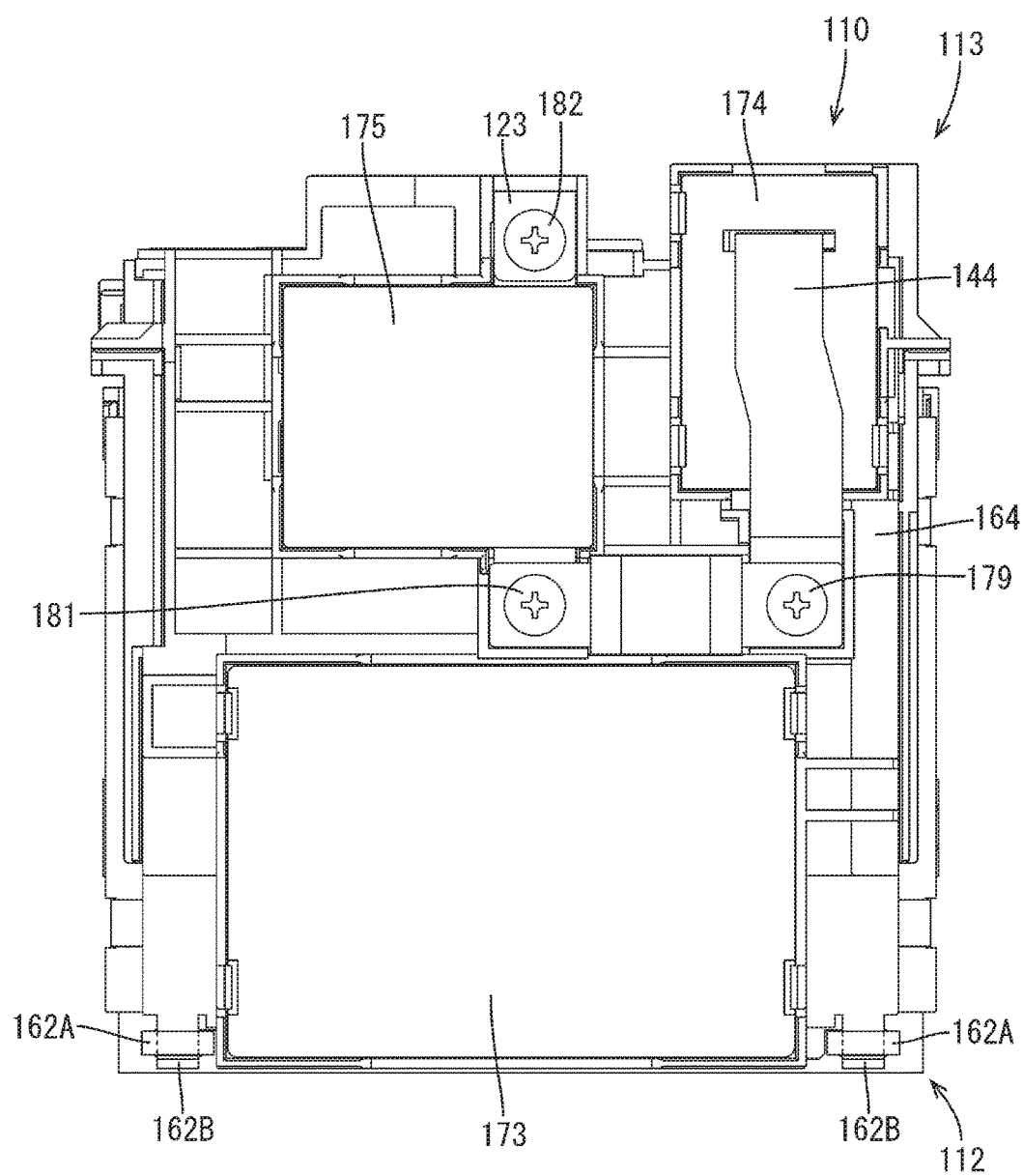
FIG. 57 is a rear view illustrating the state in which the electrical storage units and the circuit unit are assembled.
Figure 58:
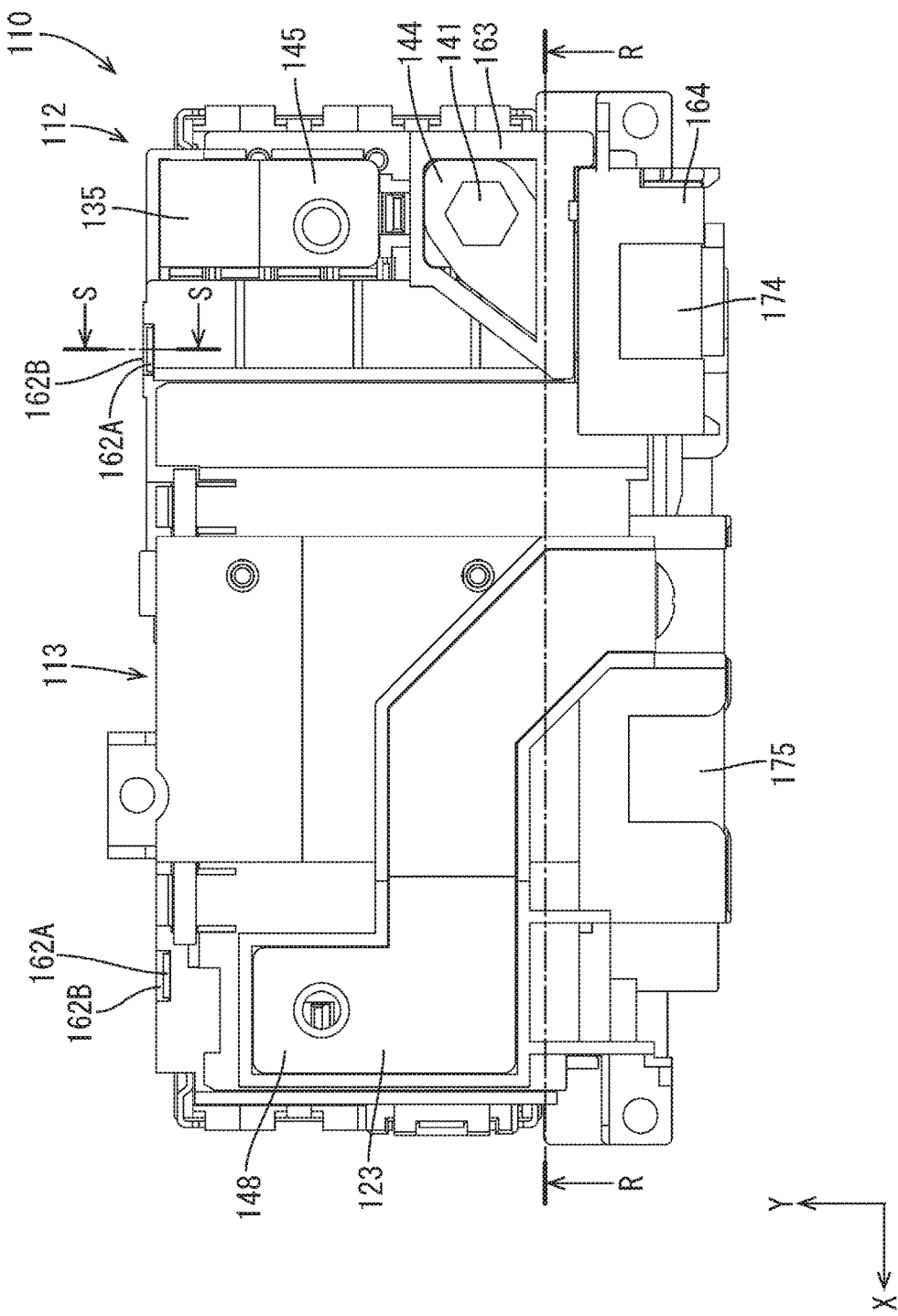
FIG. 58 is a plan view illustrating the state in which the electrical storage units and the circuit unit are assembled.
Figure 59:
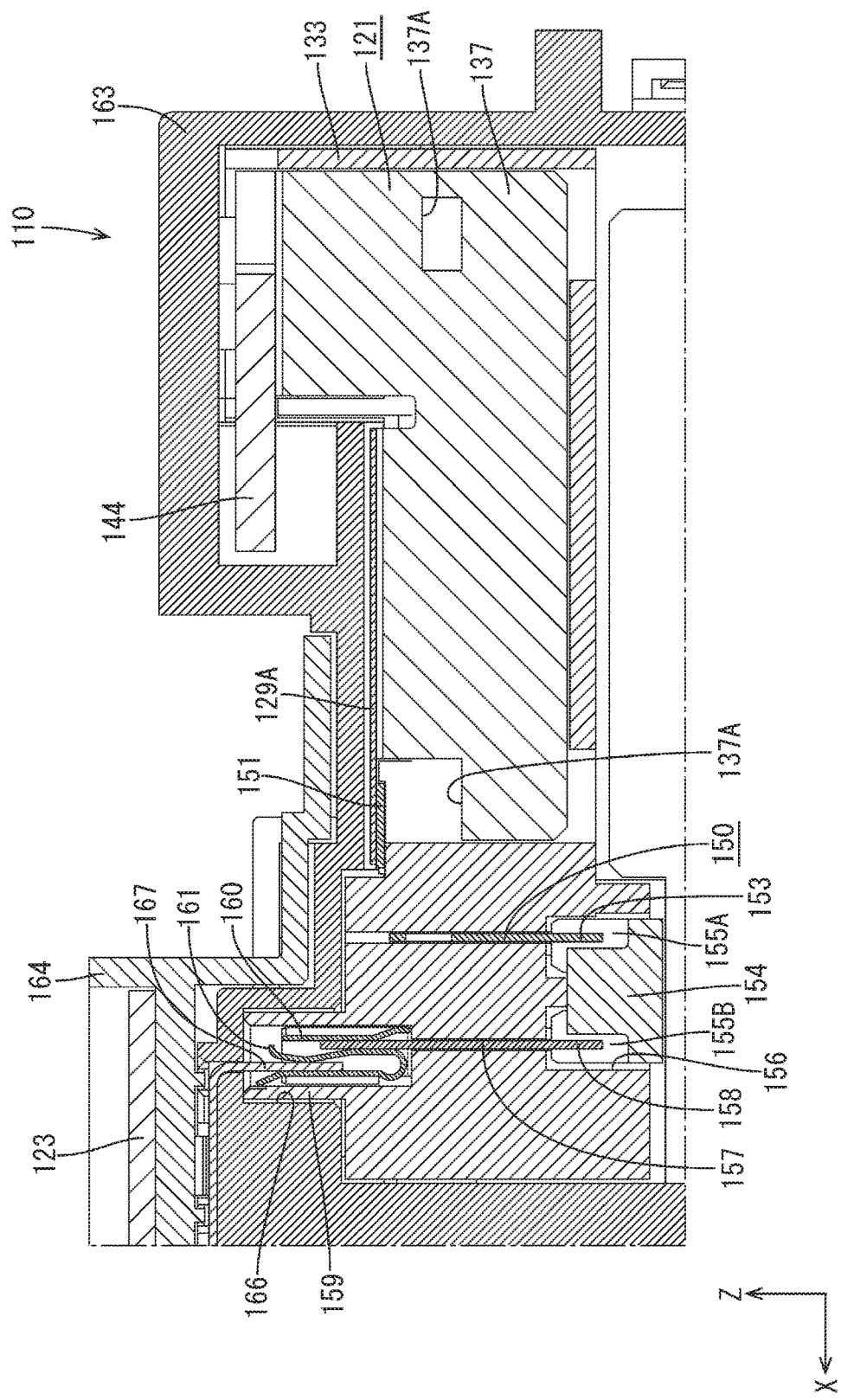
FIG. 59 is a cross-sectional view taken along a line R-R of FIG. 58.
Figure 60:
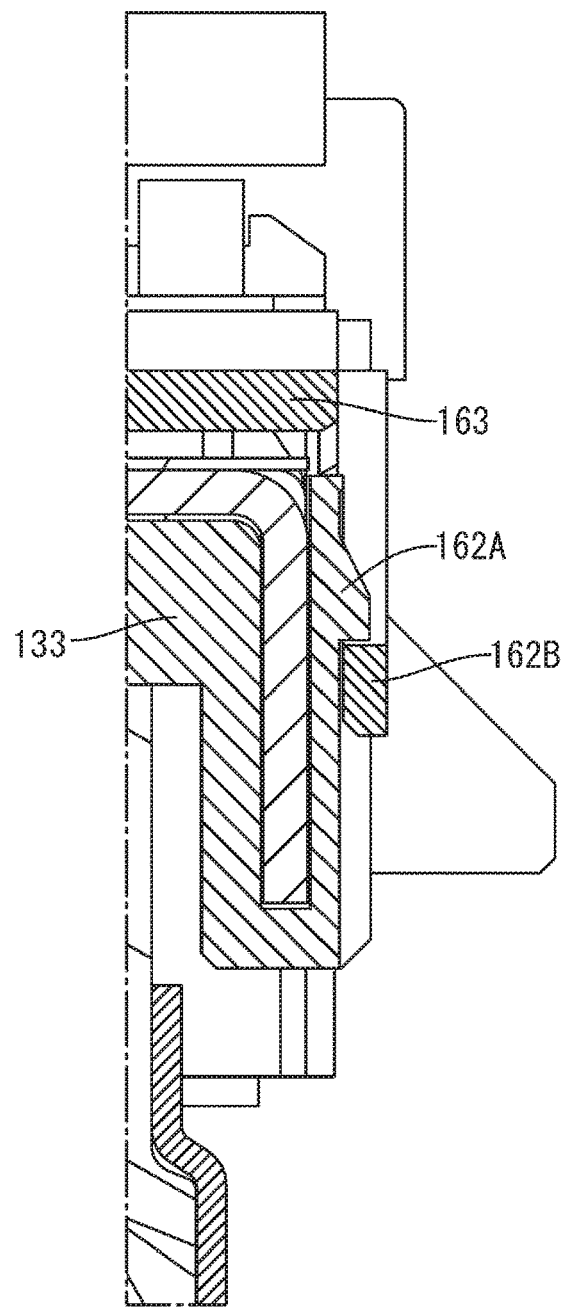
FIG. 60 is a cross-sectional view taken along a line S-S of FIG. 58.

The electrical storage unit 112 and the circuit unit 113 are assembled, by elastically engaging the lock parts 162A formed on the electrical storage unit 112 with the lock receiving parts 162B formed on the circuit unit 113 at the positions that correspond to the lock parts 162A (see FIGS. 57 and 60).

Figure 44:
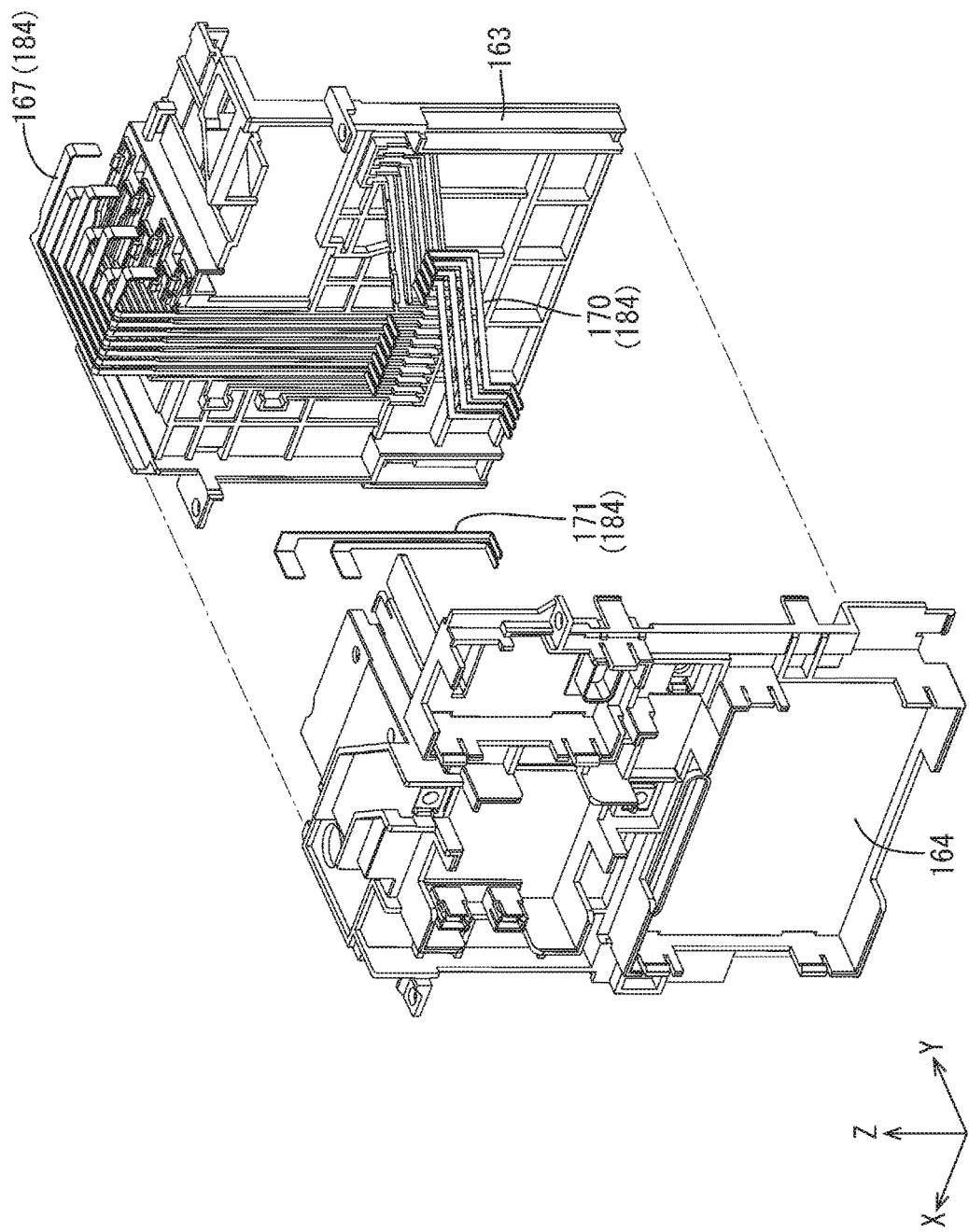
FIG. 44 is an exploded perspective view illustrating a circuit unit.

The circuit unit 113 includes: a lower case 163; and an upper case 164 that is attached to the upper side of the lower case 163 (see FIG. 44). The lower case 163 and the upper case 164 are made of an insulating synthetic resin.

Figure 53:
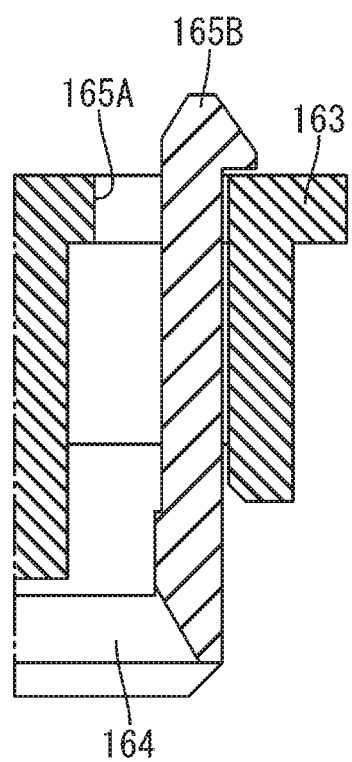
FIG. 53 is a cross-sectional view taken along a line Q-Q of FIG. 52.
Figure 55:
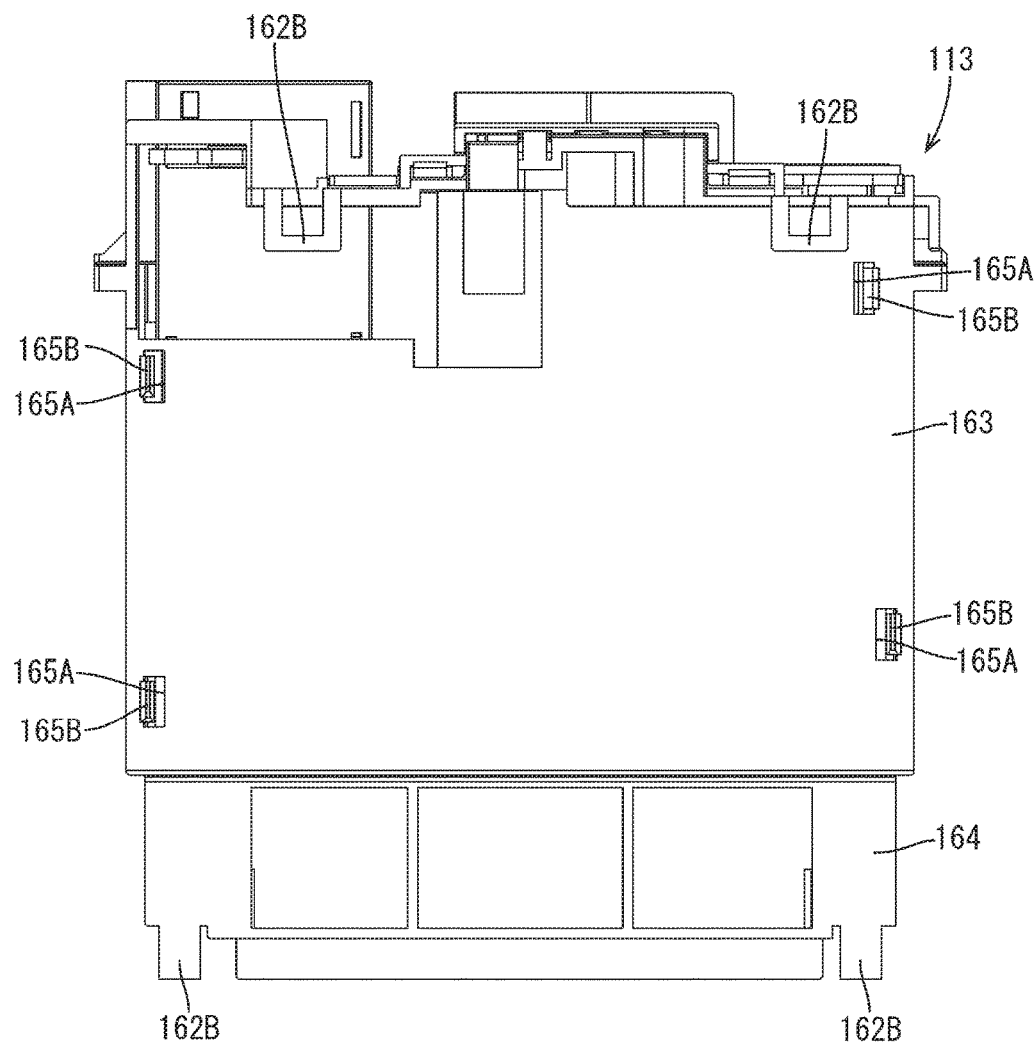
FIG. 55 is a front view illustrating the circuit unit.
Figure 56:
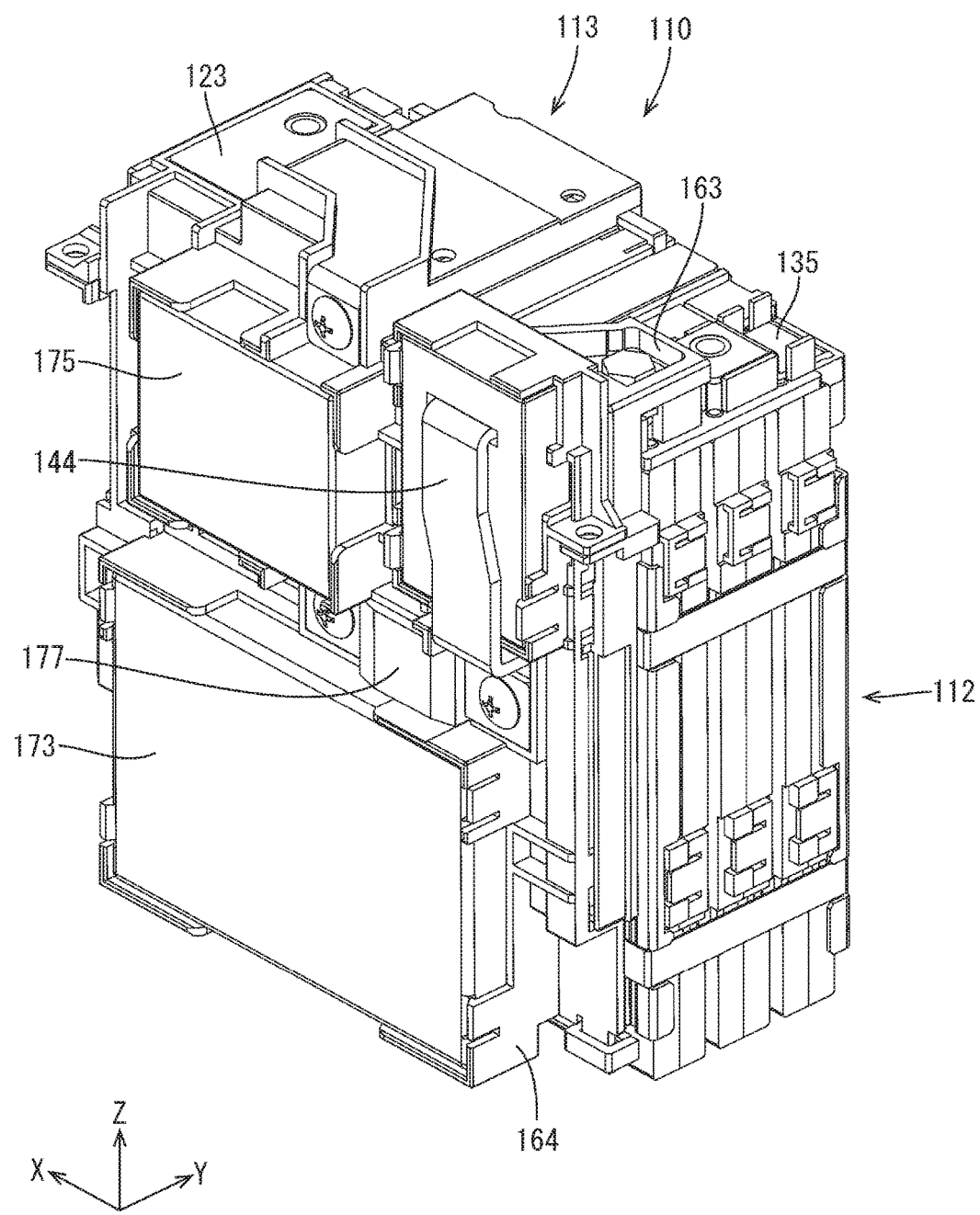
FIG. 56 is a perspective view illustrating a state in which the electrical storage units and the circuit unit are assembled.

The lower case 163 and the upper case 164 are assembled by elastically engaging lock parts 165A formed on the lower case 163 with lock receiving parts 165B formed on the upper case 164 at the positions that correspond to the lock parts 165A (see FIGS. 53 and 55).

Figure 45:
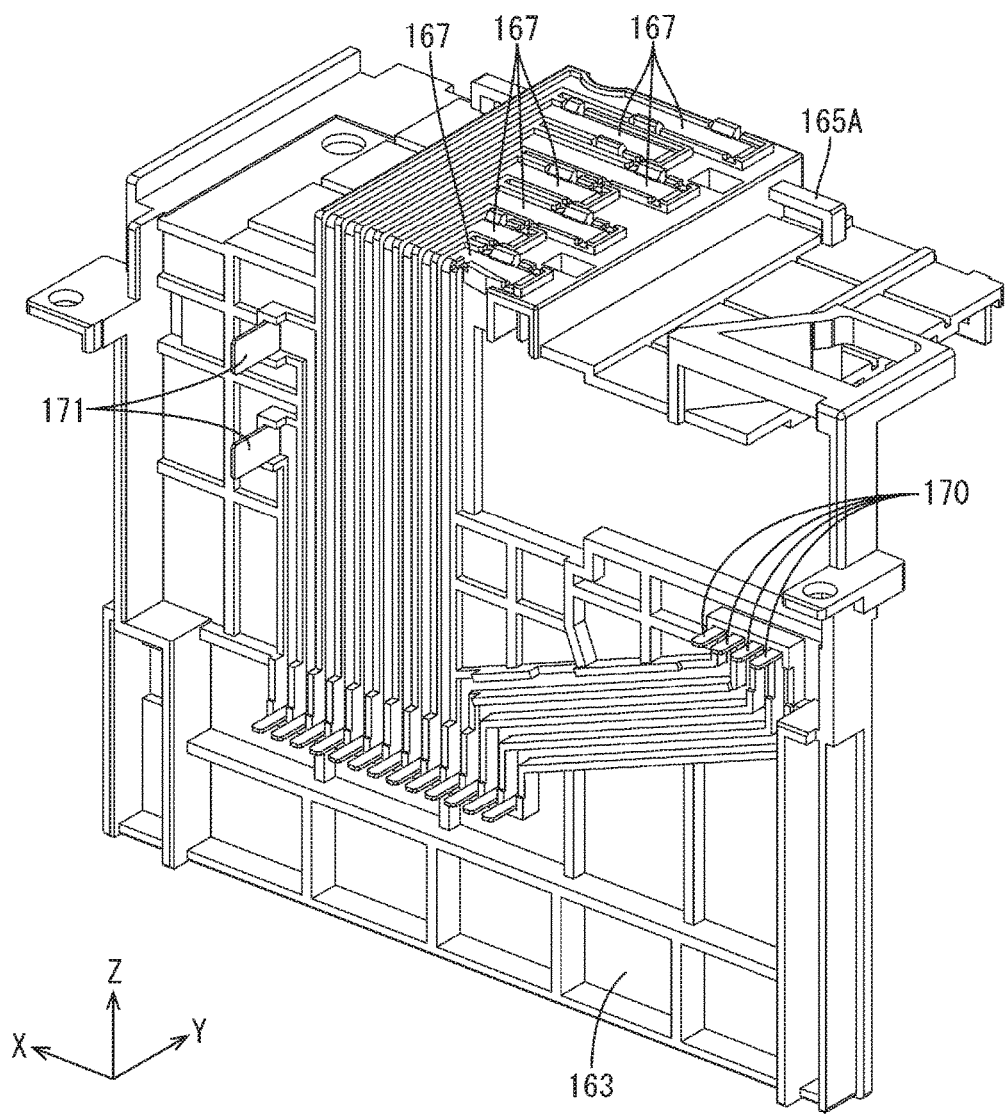
FIG. 45 is a perspective view illustrating a lower case and low-current components.

The lower case 163 is provided with: a side wall that extends in the vertical direction; and an upper wall that is bent at substantially a right angle from the upper end of the side wall in the front-rear direction (see FIG. 45).

Figure 46:
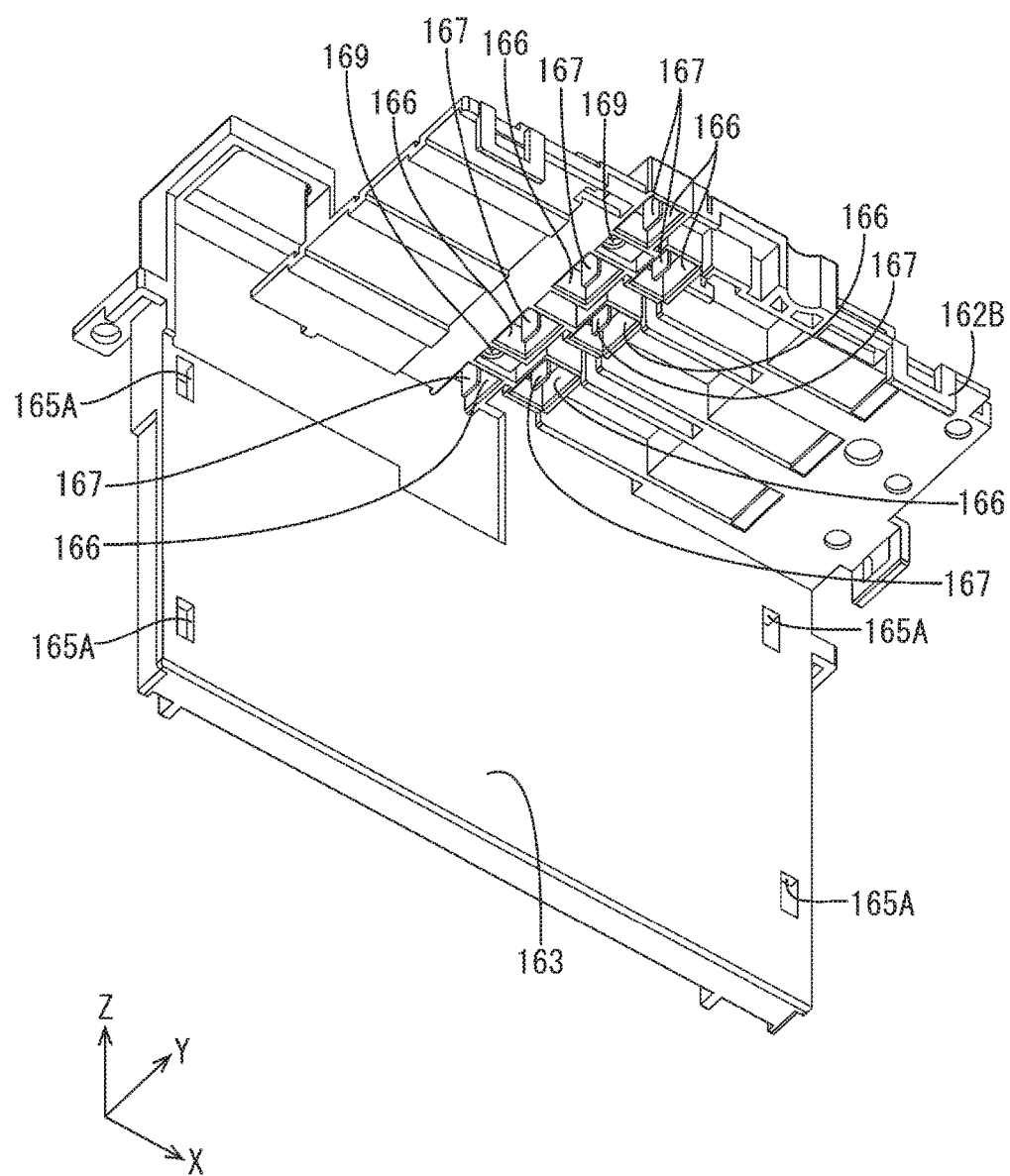
FIG. 46 is a perspective view illustrating the lower case viewed in a direction different from the direction of FIG. 45.

The lower surface of the upper wall of the lower case 163 is provided with circuit unit-side connectors 165 at positions that are in the vicinity of the central portion in the left-right direction and correspond to the standby connectors 159 of the insulating protector 133 (see FIG. 46). The circuit unit-side connectors 165 have the shape of a square tube that opens downward. Ends of first low-current busbars 167 (an example of the busbars and an example of the low-current components 184) that will be described later protrude into the circuit unit-side connectors 165 from above. The ends of the first low-current busbars 167 are fitted to the relay terminals 160 of the standby connectors 159 from above (see FIG. 59).

On the upper surface of the insulating protector 133 of the electrical storage unit 112, guide parts 168 that protrude upward are formed in the vicinity of the standby connectors 159. In the present embodiment, two guide parts 168 are formed. One of the two guide parts 168 is formed at the position on the left side of the second standby connector 159 from the rear end. Furthermore, the other one of the guide parts 168 is formed on the left side of the second standby connector 159 from the front end.

The lower surface of the upper wall of the lower case 163 is provided with, at the positions that correspond to the guide parts 168, guide-target parts 169 that are recessed upward and into which the guide parts 168 are inserted. By inserting the guide parts 168 into the guide-target parts 169, it is possible to perform relative positioning of the electrical storage unit 112 and the circuit unit 113.

The upper surface of the upper wall of the lower case 163 and the surface of the side wall of the lower case 163 that faces away from the electrical storage unit 112 are provided with: a plurality of (seven in the present embodiment) first low-current busbars 167 (an example of the low-current components 184); a plurality of (four in the present embodiment) second low-current busbars 170 (an example of the low-current components 184); and a plurality of (two in the present embodiment) third low-current busbars 171 (an example of the low-current components 184) (see FIG. 45).

In a state in which the lower case 163 and the upper case 164 are assembled, the first low-current busbars 167, the second low-current busbars 170, and the third low-current busbars 171 are arranged between the lower case 163 and the upper case 164.

The first low-current busbars 167, the second low-current busbars 170, and the third low-current busbars 171 are obtained by pressing metal plate members into predetermined shapes. Any metal such as copper, a copper alloy, aluminum, or an aluminum alloy can be selected for the metal constituting the first low-current busbars 167, the second low-current busbars 170, and the third low-current busbars 171, as needed. The surfaces of the first low-current busbars 167, the second low-current busbars 170, and the third low-current busbars 171 may each be provided with a plated layer made of metal such as tin or nickel.

The first low-current busbars 167 are arranged on the upper surface of the upper wall of the lower case 163 and the rear surface of the side wall of the lower case 163 (see FIG. 45). The ends of the portions of the first low-current busbars 167 that are provided on the upper surface of the upper wall of the lower case 163 are located inside of the above-described circuit unit-side connectors 165 while being bent downward, and are connected to the relay terminals 160. The lower ends of the first low-current busbars 167 are bent rearward, and thus are connected to a BSU 173 (Battery Sensing Unit) that will be descried later. The BSU 173 is configured to calculate a voltage value of each electrical storage element 127 based on a minute electric current that flows to the BSU 173 via the first low-current bulbar 167.

The second low-current busbars 170 are arranged on the rear surface of the side wall of the lower case 163 (see FIG. 45). The lower ends of the second low-current busbars 170 are bent rearward, and are connected to the BSU 173. The upper ends of the second low-current busbars 170 are bent rearward, and are connected to a current sensor 174 that will be described later. The BSU 173 is configured to calculate values of currents that flow through the first high-current busbar 144 (an example of the high-current components 183) that will be described later, based on current signals that are transferred from the current sensor 174 to the MU 173 via the second low-current busbars 170.

The third low-current busbars 171 are arranged on the rear surface of the lower case 163 (see FIG. 45). The lower ends of the third low-current busbars 171 are bent rearward, and are connected to the BSU 173. The upper ends of the third low-current busbars 171 are bent rearward, and are connected to a relay 175 (an example of the high-current components 183) that will be described later. The relay 175 is configured to be energized or deenergized in response to a switching signal that is transferred from the BSU 173 to the relay 175 via the third low-current busbars 171.

Figure 47:
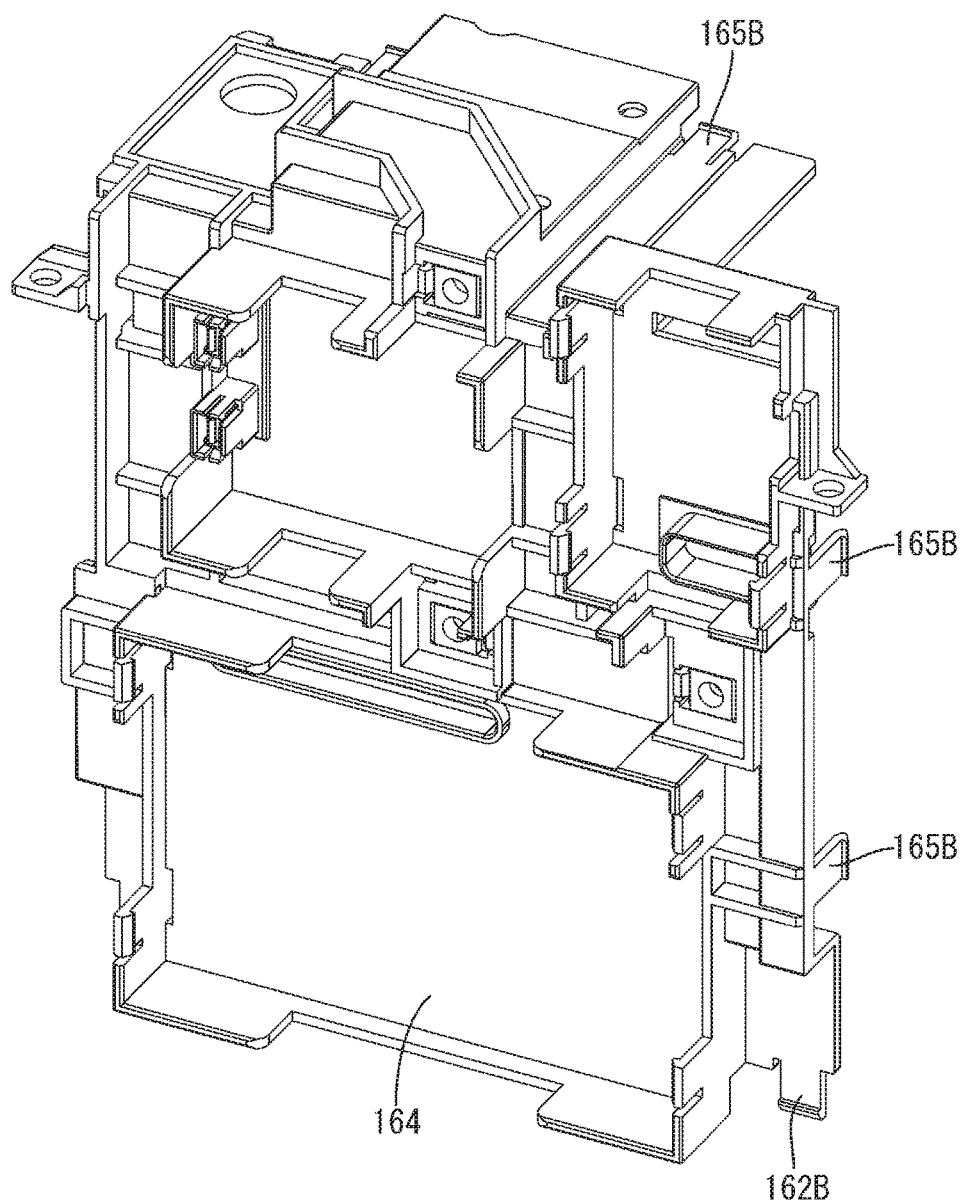
FIG. 47 is a perspective view illustrating an upper case.
Figure 48:
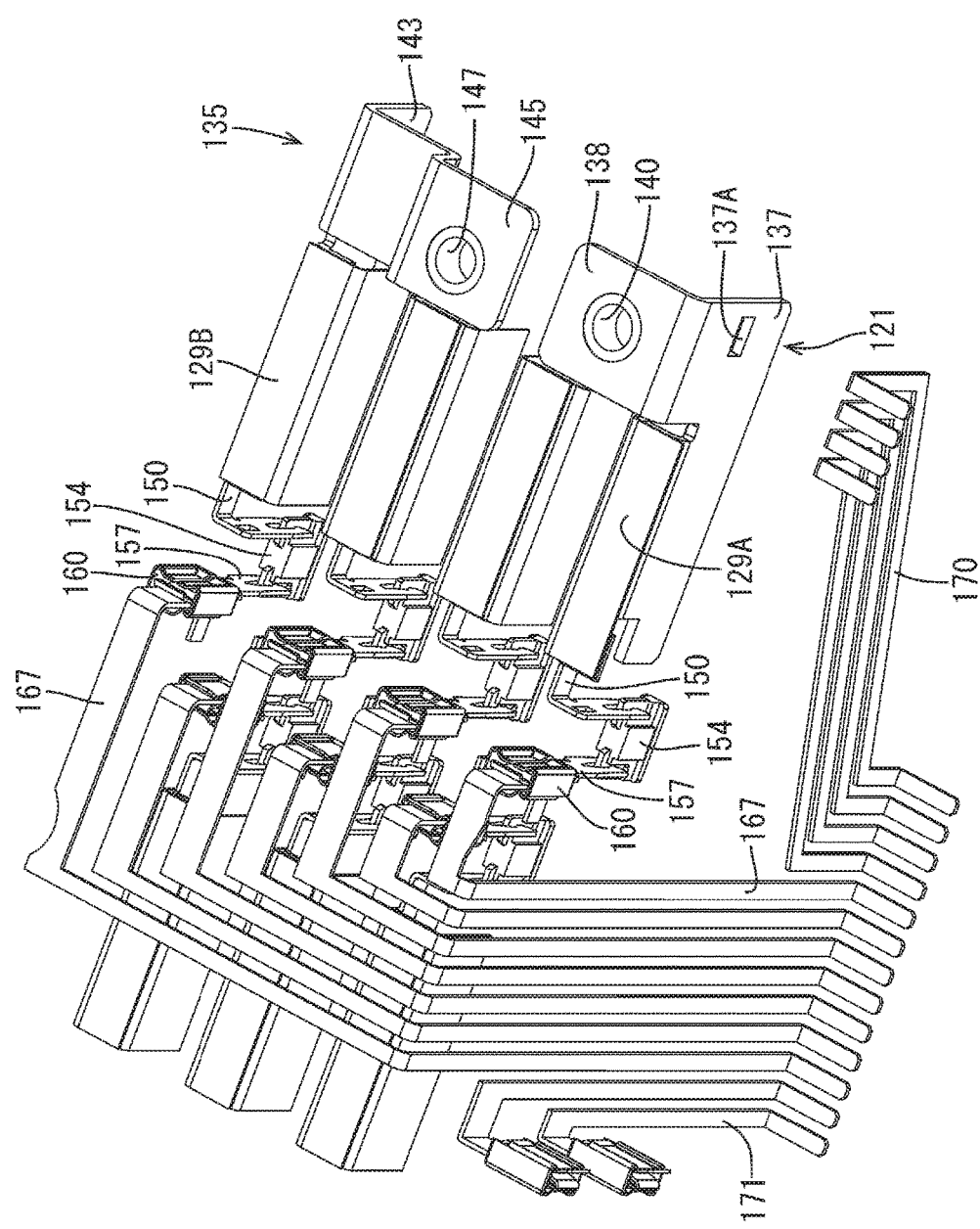
FIG. 48 is a perspective view illustrating the electric connection structure between the electrical storage units and the circuit unit.
Figure 49:
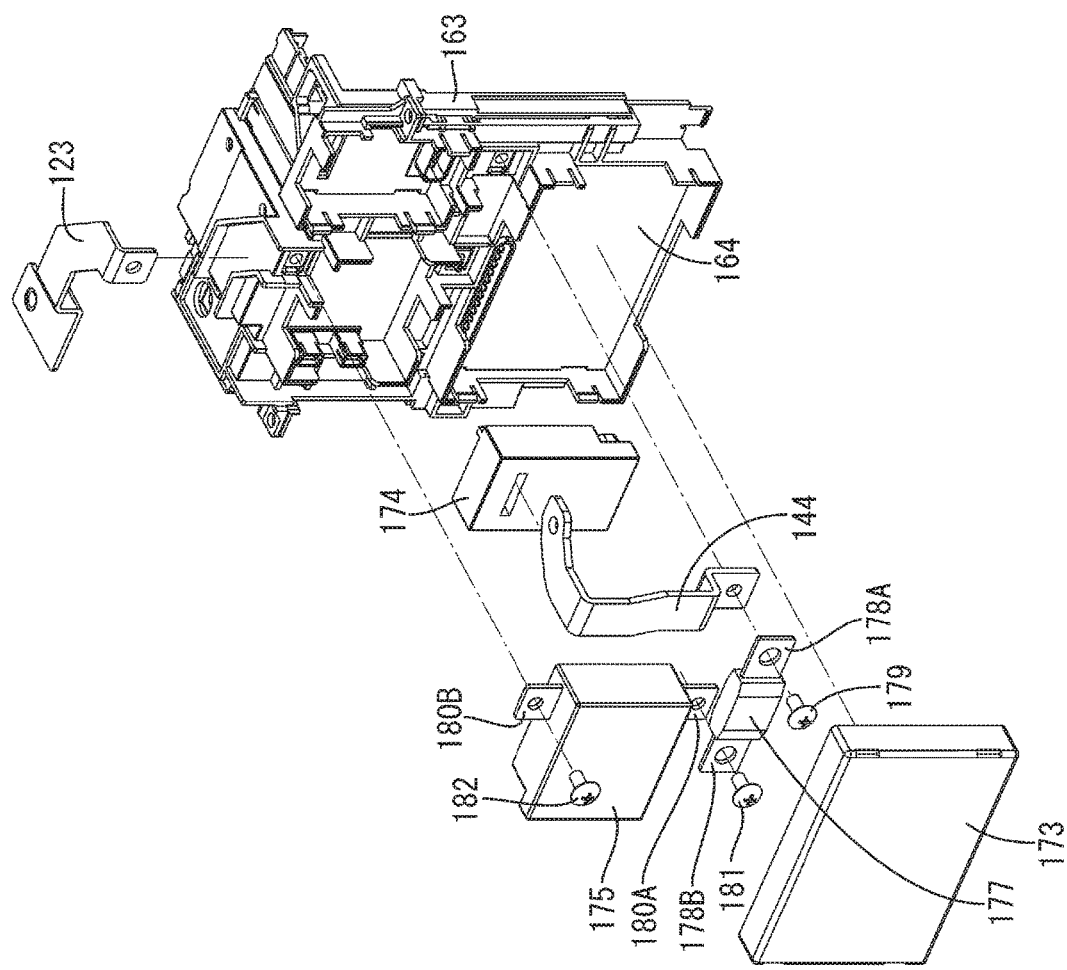
FIG. 49 is an exploded perspective view illustrating the upper case and high-current components.
Figure 50:
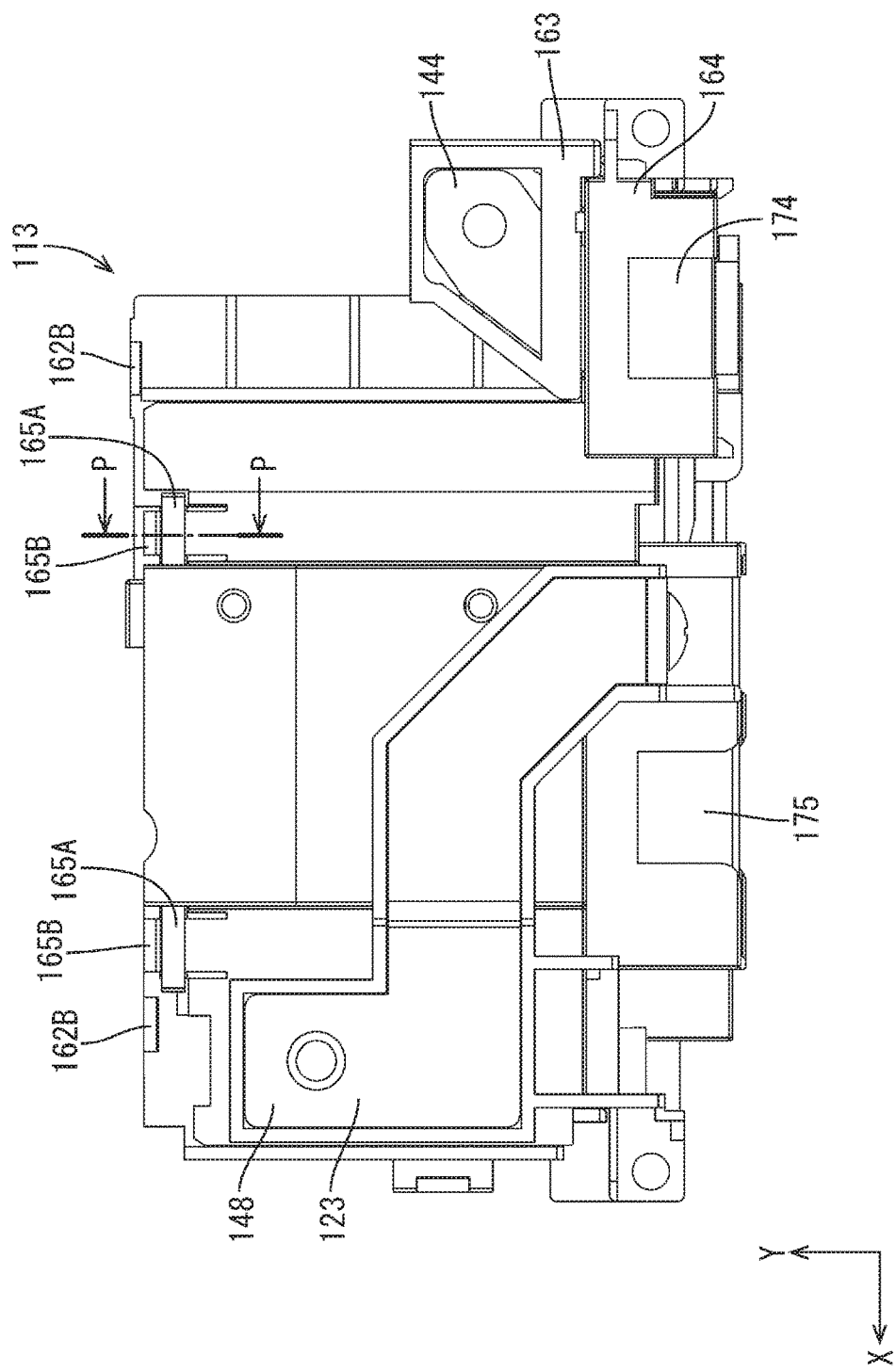
FIG. 50 is a plan view illustrating the circuit unit.
Figure 52:
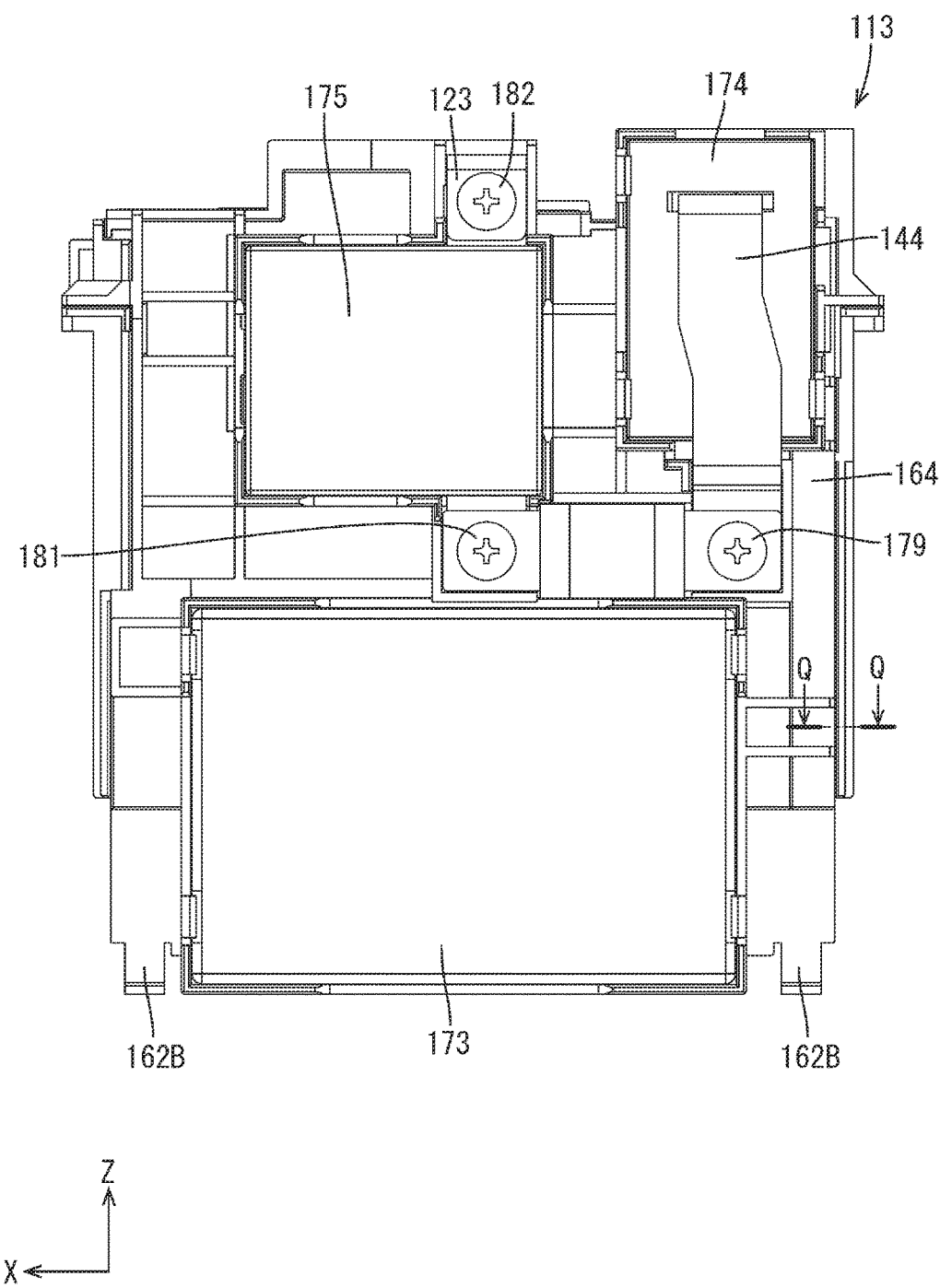
FIG. 52 is a rear view illustrating the circuit unit.

The upper case 164 is provided with: a side wall that extend in the vertical direction; and an upper wall that is bent at substantially a right angle from the upper end of the side wall in the front-rear direction (see FIG. 47). The first high-current busbar 144 is provided on the upper surface of the upper wall of the upper case 164 and the rear surface of the side wall of the upper case 164 (see FIG. 35). The first high-current busbar 144 is obtained by pressing a metal plate member into a predetermined shape. Any metal such as copper, a copper alloy, aluminum, or an aluminum alloy can be selected for the metal constituting the first high-current busbar 144, as needed. The surface of the first high-current busbar 144 may be provided with a plated layer made of metal such as tin or nickel.

The end of the first high-current busbar 144 that is arranged on the upper surface of the upper wall of the upper case 164 is fixed to the positive electrode terminal connection part 138 of the positive electrode busbar 121 with the bolt 141. The portion of the first high-current busbar 144 that is arranged on the rear surface of the side wall of the upper case 164 penetrates the current sensor 174 (see FIG. 49). The current sensor 174 detects a current flowing through the first high-current busbar 144 with a well-known method. The current sensor 174 transmits a current signal to the BSU 173 via the second low-current busbars 170. Note that the current sensor 174 may be configured to transmit a current signal to an ECU via a connector and an external circuit-side connector.

Furthermore, the lower end of the first high-current bulbar 144 is connected to a lead terminal 178A of a high-current fuse 177 (an example of the high-current component 183) with the bolt 179.

The high-current fuse 177 has a pair of lead terminals 178A and 178B. The lead terminal 178A, which is one of the pair of lead terminals, is connected to the lower end of the above-described first high-current busbar 144. The other lead terminal 178B is connected to one lead terminal 180A of the relay 175 with a bolt 181.

The relay 175 is turned on and off in response to a signal transmitted from the BSU 173 via the third low-current busbars 171. The BSU 173 receives a current signal from the current sensor 174 via the second low-current busbars 170, and turns the relay 175 off when the current value calculated based on this current signal is larger than a predetermined threshold.

Another lead terminal 180B of the relay 175 is connected to a second high-current busbar 123 (an example of the high-current components 183) with a bolt 182.

The second high-current busbar 123 is arranged on the rear surface of the side wall of the upper case 164 and the upper surface of the upper wall of the upper case 164. The end of the second high-current busbar 123 that is arranged on the upper surface of the upper wall of the upper case 164 serves as an external positive electrode terminal 148.

Functions and Effects of the Present Embodiment

The following will describe functions and effects of the present embodiment. In the present embodiment, the voltage detection terminals 157 are connected to the first low-current busbars 167 via the relay terminals 160. Accordingly, it is possible to downsize the routing space as compared with the case where electric wires are connected to the voltage detection terminals 157. Furthermore, since it is possible to process the plurality of first low-current busbars 167 into predetermined shapes in the same process, the manufacturing process can be simplified.

Furthermore, according to the present embodiment, the circuit unit 113 is provided with the insulating lower case 163, and the insulating upper case 164, which is attached to the lower case 163, and the first low-current busbars 167, the second low-current busbars 170, and the third low-current busbars 171 are arranged between the lower case 163 and the upper case 164. Accordingly, the first low-current busbars 167, the second low-current busbars 170, and the third low-current busbars 171 are reliably insulated by the lower case 163 and the upper case 164.

Furthermore, according to the present embodiment, the electrical storage unit 112 is provided with the guide parts 168 by which relative positioning of the electrical storage unit 112 and the circuit unit 113 is performed. Accordingly, it is possible to improve the work efficiency when the electrical storage unit 112 and the circuit unit 113 are assembled with each other.

Furthermore, according to the present embodiment, the electrical storage unit 112 includes the standby connectors 159, and the circuit unit 113 includes the circuit unit-side connectors 166, which are fitted to the standby connectors 159. The guide parts 168 are formed in the vicinity of the standby connectors 159. Accordingly, it is possible to prevent the standby connectors 159 and the circuit unit-side connectors 166 from being erroneously fitted to each other.

Other Embodiments

The technique disclosed in the present description is not limited to the embodiments described in the description and illustrated in the drawings, and may encompass the following embodiments, for example.
(1) In the foregoing embodiment, the holding member 30 that has the fuse mounting part 42 and the terminal housing part 48, and holds the lead terminals 13 and the fuse connecting busbar 40 is shown, but the preferred embodiment is not limited to such an embodiment. The holding member may only have the function to hold the lead terminal.

(2) In the foregoing embodiment, by connecting the fuse connecting busbars 40 and the lead terminals 13 to each other, mounting the fuses 45, and disposing the detection terminals 50 in the terminal housing parts 48, a state is obtained in which the fuses 45 are mounted on the fuse mounting parts 42, the detection terminals 50 are housed in the terminal housing parts 48, and the fuse connecting busbars 40 and the lead terminals 13 are connected to each other, but the preferred embodiment is not limited to this.

It is also possible that the fuse connecting busbar and the lead terminal are connected and the detection terminals are housed, and then the fuses are mounted.

(3) In the foregoing embodiment, the electrical storage element group 11 in which four electrical storage elements 12 are stacked on one another is shown, but an electrical storage element group in which five or more electrical storage elements are stacked on one another, or an electrical storage element group in which two or three electrical storage elements are stacked on one another may be used.

(4) In the foregoing embodiment, the busbars 25, the external connection busbars 26, and the lead terminals 13 that are made of aluminum or an aluminum alloy are shown. They are preferably made of the same type of metal, but may be made of different metal materials. Examples of the metal material other than aluminum and an aluminum alloy include copper and a copper alloy.

(5) In the foregoing embodiment, the voltage detection terminals for detecting a voltage are shown as the detection terminals 50, but the detection terminals may be terminals for detecting a temperature.

(6) In the foregoing embodiment, an example is shown in which the lead terminals 13, and the connection members 25 and 26 are joined to each other by laser welding, and the lead terminals 13 and the fuse connecting busbars 40 are joined to each other by ultrasonic welding, but the welding method is not limited to those. Any suitable welding method may be used as long as it takes into consideration materials of members to be joined to each other, and the like.

REFERENCE SIGNS LIST

10, 110: Electrical storage module
11, 128: Electrical storage element group
12, 127: Electrical storage element
13: Lead terminal
13A: Positive lead terminal
13B: Negative lead terminal
20: Stacked body
21: Electrical storage unit
21A: First electrical storage unit
21B: Second electrical storage unit
21C: Third electrical storage unit
21D: Fourth electrical storage unit
25: Busbar
25A: Connection part
26: External connection busbar
30: Holding member
30A: First holding member
30B: Second holding member
30C: Third holding member
30D: Fourth holding member
30E: Fifth holding member
40: Fuse connecting busbar (detection member)
41A: Terminal connection part
41B: Extending part
41C: Tuning-fork terminal part
42: Fuse mounting part
43: Terminal insertion part
45: Fuse
45A, 45B: Connection part
48: Terminal housing part
50: Detection terminal
51: Fuse connection part
51A: Elastic contact piece
53: Voltage detection wire
150: Fuse connecting busbar
157: Voltage detection terminal
167: First low-current busbar
160: Relay terminal

The invention claimed is:

1. An electrical storage module comprising:
an electrical storage element group in which a plurality of electrical storage elements are stacked on one another, each electrical storage element having lead terminals that protrude from a side edge of the electrical storage element;
fuses, each of which configured with a disrupting part located between two connection parts, one of each respective connection part electrically connected to a respective lead terminal, and another of each respective connection part electrically connected to a respective detection terminal for detecting a state of the electrical storage elements; and
holding members that hold the lead terminals and fuse connecting busbars that electrically connect the fuses and the lead terminals, each holding member being provided with a fuse mounting part on which one of the fuses, including respective two connection parts and disrupting part, is mounted, and a terminal housing part in which a respective detection terminal is housed,
wherein the fuses are electrically connected between the respective detection terminal and the respective lead terminal of the electrical storage elements, by putting the electrical storage module into a state in which the fuses are mounted on the fuse mounting parts, the detection terminals are housed in the terminal housing parts, and the fuse connecting busbars and the lead terminals are connected to each other.

2. The electrical storage module according to claim 1, wherein the detection terminals are connected to busbars via relay terminals.

* * * * *